(12) United States Patent
Hattori et al.

(10) Patent No.: US 6,974,917 B2
(45) Date of Patent: Dec. 13, 2005

(54) INFORMATION RECORDING MEDIUM AND INFORMATION PROCESSING APPARATUS

(75) Inventors: Hitoshi Hattori, Kanagawa (JP); Toshiyuki Furuta, Kanagawa (JP); Tomohiko Beppu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 824 days.

(21) Appl. No.: 09/838,248

(22) Filed: Apr. 20, 2001

(65) Prior Publication Data

US 2002/0003726 A1 Jan. 10, 2002

(30) Foreign Application Priority Data

May 17, 2000 (JP) ....................................... 2000-145696

(51) Int. Cl.[7] .............................................. G08C 21/00
(52) U.S. Cl. ................................. 178/18.01; 178/18.03; 178/18.04; 178/18.06; 178/18.07; 178/19.01; 178/19.02; 178/19.03
(58) Field of Search ................................. 345/173–179; 178/18.01–18.06, 19.01–19.06, 18.07

(56) References Cited

U.S. PATENT DOCUMENTS 5,539,159 A * 7/1996 Protheroe et al. ........ 178/18.05
5,629,499 A    5/1997 Flickinger et al. ............ 178/18

FOREIGN PATENT DOCUMENTS

| GB | 2 281 994 | 3/1995 |
|---|---|---|
| JP | 7-200134 | 8/1995 |
| JP | 9-101864 | 4/1997 |
| WO | WO 01/61630 | 8/2001 |

OTHER PUBLICATIONS

U.S. Appl. No. 10/891,364, filed Jul. 15, 2004, Furuta et al.
U.S. Appl. No. 10/411,308, filed Apr. 11, 2003, Furuta et al.
U.S. Appl. No. 09/838,248, filed Apr. 20, 2001, Hattori et al.
U.S. Appl. No. 10/447,223, filed May 29, 2003, Takahashi et al.
V. P. Shibaev, et al., Eur. Polym. J., vol. 18, pp. 651–659, "Thermotropic Liquid–Crystalline Polymers–VI*", 1982.
H. Finkelmann, et al., Makromol. Chem., vol. 179, pp. 273–276, "Model Considerations and Examples of Enantiotropic Liquid Crystalline Polymers", 1978.
T. Nakamura, et al., Mol. Cryst. Liq. Cryst., vol. 169, pp. 167–192, "Application of Side Chain Type Liquid Crystal Polymer for Display and Recording Devices", 1989.

* cited by examiner

*Primary Examiner*—Vijay Shankar
(74) *Attorney, Agent, or Firm*—Oblon, Spivak, McClelland, Maier & Neustadt, P.C.

(57) ABSTRACT

An information processing apparatus is constructed to include a plurality of information recording media respectively having a generally paper shape with an image display surface for displaying various information, a holding part which holds a holding portion of each of the information recording media which are stacked, an input part for accepting an input of various information by handwriting on an arbitrary one of the information recording media, a recognizing part for recognizing the identification information recorded on the arbitrary information recording medium, a storing part for storing the various information accepted by the input part and the identification information recognized by the recognizing part in an information storage medium by linking corresponding various information and identification information, and an output part for outputting the various information stored in the information storage medium with respect to a storage which stores various information at storage locations specified in advance depending on the identification information.

69 Claims, 33 Drawing Sheets

| ID | ¥¥AA¥BB¥CC¥P1 | ¥¥AA¥BB¥CC¥P2 |
|---|---|---|
| ADDITIONAL WRITING DATA | Aaabbbcccc dddeeeffff gggghhhii jjjkkklll mmmnnnoooo .......zzz | |

209

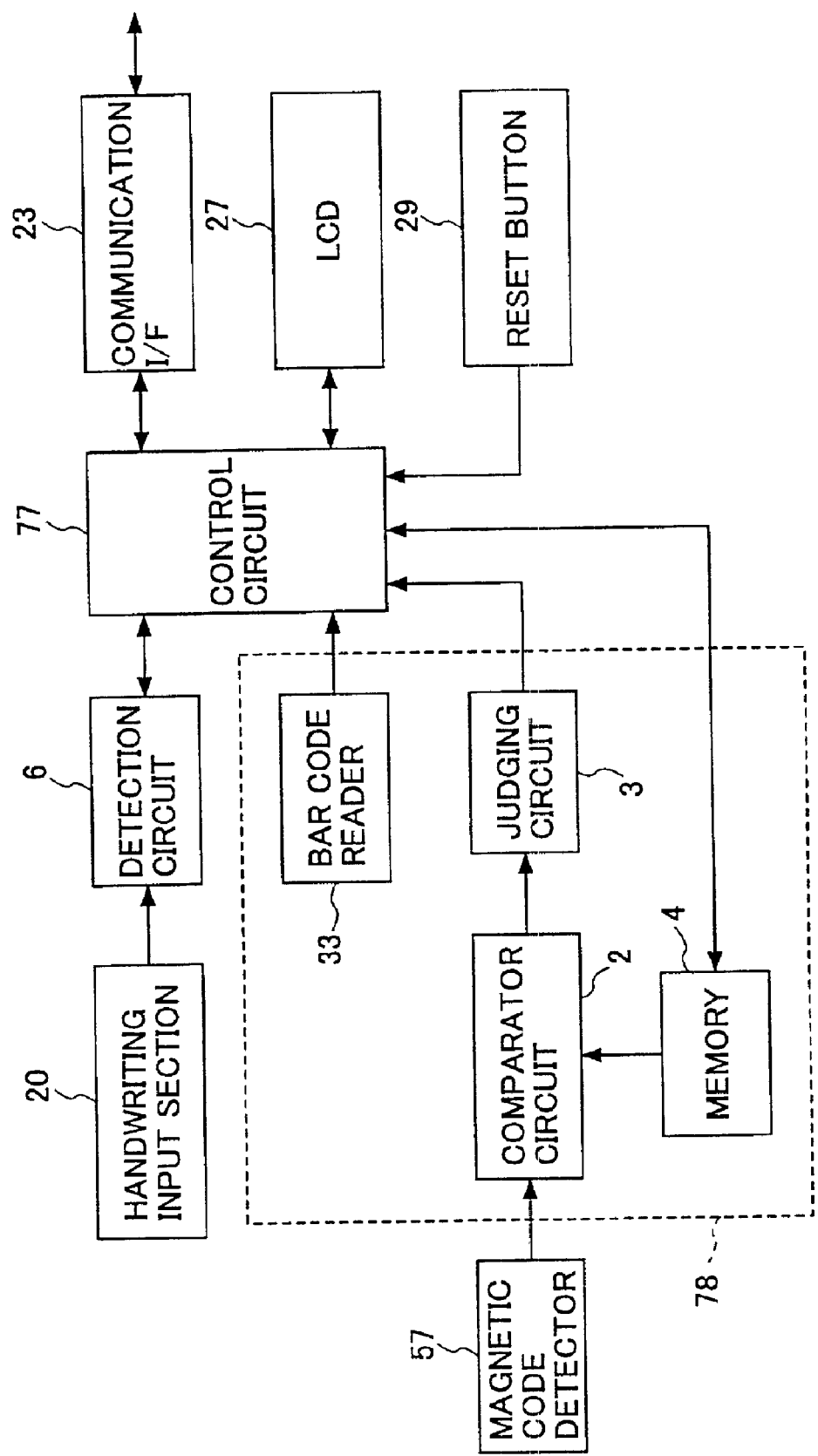

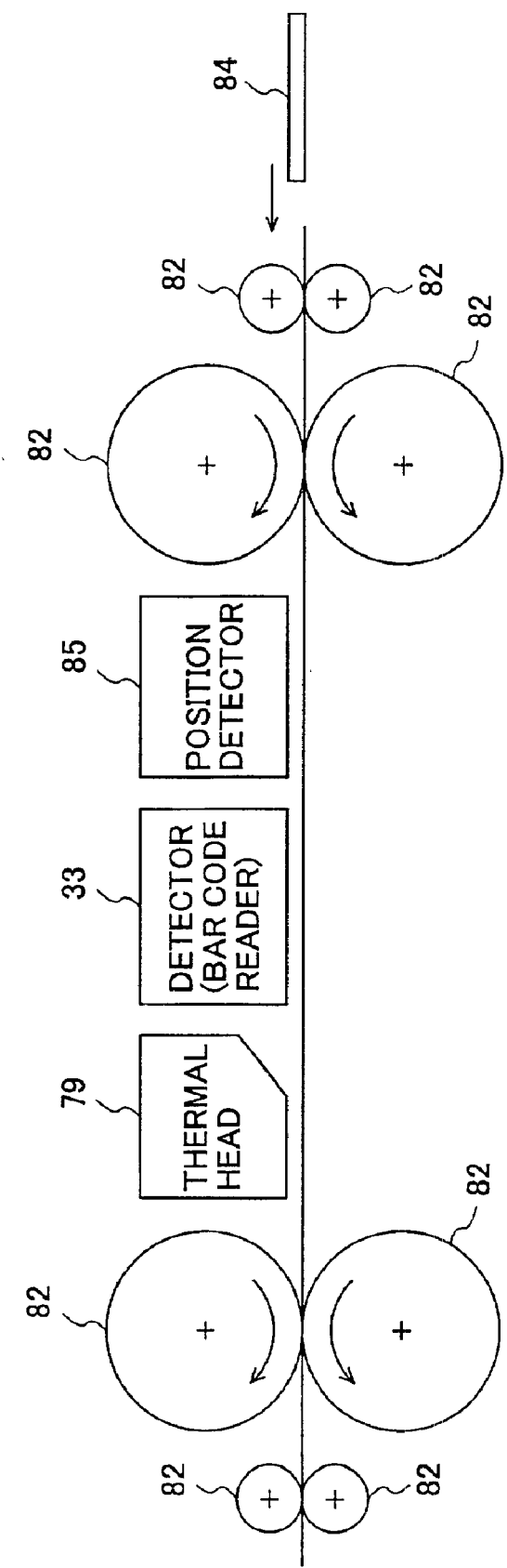

INFORMATION RECORDING MEDIUM AND INFORMATION PROCESSING APPARATUS

BACKGROUND OF THE INVENTION

This application claims the benefit of a Japanese Patent Application No.2000-145696 filed May 17, 2000, in the Japanese Patent Office, the disclosure of which is hereby incorporated by reference.

1. Field of the Invention

The present invention generally relates to information recording media and information processing apparatuses, and more particularly to an information recording medium which is printed with various information in advance, such as plain paper and predetermined paper having an image display layer for rewritably displaying various information using thermochromic or the like, and to an information processing apparatus which displays and processes various information using such an information recording medium.

2. Description of the Related Art

Recently, there is active research and development related to this type of information processing apparatus, and various proposals have been made. For example, an information processing apparatus was proposed in a Japanese Laid-Open Patent Application No.9-101864. As a technique for storing various information such as characters and images in a visual state, the proposed information processing apparatus utilizes the advantages of conventionally used plain paper and a computer which is made up of a display and a memory.

FIGS. 1 and 2 respectively are a perspective view and a side view showing a structure of this proposed information processing apparatus. The information processing apparatus includes a digitizer (tablet) 101 which is used in combination with a plurality of digital papers 100. Each digital paper 100 uses color thermochromic in an image display layer, and forms an information recording medium (or information display medium) in a generally paper form for rewritably displaying various information. The color thermochromic which forms the image display layer of the digital paper 100 is obtained by mixing a leuco dye and a developer. The color thermochromic is adjusted so as to undergo a reversible change between a transparent state and a black state depending on heating. In a transparent portion of the image display layer, a white base film is visible through the image display layer and a transparent protection film. On the other hand, in a portion of the image display layer which changed to black, this black portion is visible through the transparent protection film. For this reason, an image display surface 102 is formed on the entire surface region of the digital paper 100, and this image display surface 102 rewritably displays the various information. Since the image display on the image display surface 102 is realized by the change in state of the image display layer, energy is required to display and erase the image information, but no energy is required to maintain the displayed image information.

As shown in FIG. 1, the digitizer 101 includes a plate-shaped main body board 103, and a heat panel 104 is provided on the surface of this main body board 103. The heat panel 104 includes a plurality of heating elements (not shown) which are arranged vertically and horizontally in an array at a density of 400 dots per inch (dpi), for example, which is larger than A4 size. A transparent input film 105 is provided on one end of the main body board 103 in a manner free to open and close, and this input film 105 is positioned on the surface of the heat panel 104. A writing pen 106 is used to write the various information on the digital paper 100.

In other words, according to the proposed information processing apparatus, the various information created by the computer or input by handwriting can be rewritably written on the digital paper 100, without wasting paper. In addition, the various information can be treated as digital information which is stored in a memory, externally output, externally input or processed in the computer.

However, from the point of view of usability, in the case of a working process which additionally writes to the document on a plurality of digital papers 100 which are already written or printed with the various information and are stacked, the information processing apparatus shown in FIGS. 1 and 2 requires one digital paper 100 (one page) to be placed on the digitizer 101 to make the additional writing and/or input and output of information, the one digital paper 100 (one page) to be removed after the additional writing and another digital paper 100 (another page) to be placed on the digitizer 101 to make the additional writing and/or input and output of information. As a result, the additional writing requires an extremely troublesome operation when carrying out such a working process which is often encountered in when holding a conference, performing a document checking, performing creative activities and the like.

In addition, the proposed information processing apparatus uses a method of storing contents on the digital paper 100, both before and after the additional writing, into an information storage medium such as a memory chip. However, this method is not suited for an operation or work which requires the plurality of stacked digital papers 100 to be used as if turning the pages, because it is impossible to relate or link the information on the digital papers 100 before the additional writing, the information on the digital papers 100 after the additional writing, and the pages of the digital papers 100 where the additional writing was made. In other words, no means is provided to identify each of the digital papers 100 stacked on the digitizer 101.

On the other hand, a method of identifying the information recording medium loaded on the tablet is proposed in a Japanese Laid-Open Patent Application No.7-200134, for example. According to this proposed method, identification information such as a bar code is printed in a top peripheral portion of each information recording medium, and a detecting means for detecting the identification information is provided in a clip part which is provided at the top end of the tablet for holding the information recording medium. But from the practical point of view, only one information recording medium can be loaded on the tablet. Otherwise, if a plurality of information recording media were stacked on the tablet and the writing were made with respect to an arbitrary information recording medium by turning the information recording media, the detecting means would only be able to detect the identification information of the information recording medium located at the top of the stack, and it would be impossible to detect the identification information of the arbitrary information recording medium which is located at a position other than the top of the stack.

FIGS. 3 and 4 respectively are a perspective view and a side view of the information processing apparatus employing this proposed method. As shown in FIGS. 3 and 4, there are many situations where one of stacked information recording media 113 is turned halfway to write on a next information recording medium 113. But since a bar code 110 is printed in the top peripheral portion of each information recording medium 113 and the stacked information recording media 113 are held by a clip part 112 which is provided with a two-dimensional bar code reader 111, it is only possible to recognize the bar code 110 of the top information recording medium 113 even when the top information recording medium 113 is turned to write on the next information recording medium 113 which is located under the top information recording medium 113.

Therefore, the problems of the prior art can be summarized by (1) through (3), as follows.

(1) The Japanese Laid-Open Patent Application No.9-101864 proposes an information recording apparatus which reads written information as electronic data, an information storage medium which stores the electronic data, and an information processing apparatus which includes an information recording medium for displaying the electronic data. In the information processing apparatus, the electronic data read from the information storage medium by the information recording apparatus are also displayed on the information recording medium. In addition, the information displayed on the information recording medium can be freely erased or corrected. Accordingly, the above information processing apparatus can create and store documents without wasting paper.

The information processing apparatus is designed to employ advantages of both a computer which includes a display and a memory, and paper which is conventionally used as a means for displaying various kinds of information such as characters and images for a predetermined time, based on analysis results of the advantages and disadvantages of the computer and the paper. In other words, the information which is created by the computer or input by handwriting is rewritable a plurality of times with respect to the information recording medium which is used by the information processing apparatus, and it is possible to avoid wasting the information recording medium as in the case of paper. In addition, the information processing apparatus can store the information or exchange the information with an external apparatus, as digital information which can be processed in the computer.

However, in the above information processing apparatus, document processes such as additional writing and storage must be carried out one information recording medium at a time, even when the additional writing is to be made with respect to a plurality of information recording media which are already written or printed with information, thereby making it troublesome to use the information processing apparatus.

In addition, when successively carrying out the additional writing with respect to a plurality of pages while turning over the plurality of information recording media, for example, there is a problem in that it is impossible to identify the page with respect to which the information was input, that is, the additional writing was made.

(2) On the other hand, the Japanese Laid-Open Patent Application No.7-200134 proposes an information processing apparatus for inputting, storing and transferring data, and having a clip which holds the medium and is provided with a bar code reader for detecting identification (ID) information, in order to identify each medium placed on a board of the information processing apparatus.

But the bar code reader detects a bar code which is printed on the medium, from above the medium. Hence, when actually using the bar code reader, the media must be placed on the board one medium at a time. In other words, since a part of the medium printed with the bar code is held by the clip, there is a problem in that the bar code which is detected by the bar code reader provided in the clip remains unchanged even in a case where a plurality of media are placed on the board and one or more media are turned over, for example. Furthermore, although the Japanese Laid-Open Patent Application No.7-200134 proposes the detection and use of the identification information, no mention is made with regard to security.

(3) On the other hand, another information processing apparatus has been proposed which uses rewritable paper made of a reversible recording material, when inputting electronic data from written information. The demand for the rewritable paper is increasing recently, from the point of view of solving environmental problems.

However, there is a problem in that an erroneous erasure or rewriting with respect to the rewritable paper may be made by the user himself or by a third party.

SUMMARY OF THE INVENTION

Accordingly, it is a general object of the present invention to provide a novel and useful information recording medium and information processing apparatus, in which the problems described above are eliminated.

Another and more specific object of the present invention is to provide an information recording medium and an information processing apparatus which enable each of a plurality of information recording media stacked on a tablet to be positively identified, so that information indicating the information recording media on which additional writing is made is related or linked with respect to information before the additional writing, without requiring the user to be aware, under general circumstances where an operation or work requires the plurality of stacked information recording media to be used as if turning the pages, such as when holding a conference, performing a document checking, performing creative activities and the like.

Still another object of the present invention is to provide an information recording medium and an information processing apparatus which can realize the above specific object with respect to rewritable information recording media.

A further object of the present invention is to provide an information processing apparatus which can update an original document by appropriately overwriting additional writing contents with respect to an arbitrary information recording medium on the original document.

Another object of the present invention is to provide an information processing apparatus which can identify a large number information recording media by greatly increasing a storage capacity of identification information.

Still another object of the present invention is to provide an information recording medium and an information processing apparatus which can improve security of information.

A further object of the present invention is to provide an information processing apparatus which can improve the ease of operation while taking into account a power consumption and the like.

Another object of the present invention is to provide an information recording medium and an information processing apparatus which are easy and simple to use, and also capable of providing security with respect to document information.

Still another object of the present invention is to provide an information processing apparatus comprising a plurality of information recording media respectively having a generally paper shape with an image display surface for displaying various information, the image display surface of each of the information recording media having peripheral portions including a holding portion and recorded with identification information in one of the peripheral portions other than the holding portion, the identification information recorded on each of the information recording media indicating a storage location of one page of display image information written on the information recording medium and prestored in storage means; a holding part which holds the holding portion of each of the information recording media which are stacked; information input means for accepting an input of various information by handwriting on an arbitrary one of the information recording media which is used as a writing target; identification information recognizing means for recognizing the identification information recorded on the arbitrary information recording medium which is used as the writing target; information storing means for storing the various information accepted by the information input means and the identification information recognized by the identification information recognizing means in an information storage medium by linking corresponding various information and identification information; and information output means for outputting the various information stored in the information storage medium with respect to the storage means which stores various information at storage locations specified in advance depending on the identification information. According to the information processing apparatus of the present invention, it is possible to appropriately reproduce electronic data indicating what has been additionally written on which document. In addition, since the identification information is recorded in the peripheral portion other than the holding part of the information recording medium, it is possible to positively identify each information recording medium which is used as the writing target even during operation or work while the stacked information recording media are turned over as if turning the pages of a notebook.

A further object of the present invention is to provide an information processing apparatus comprising a plurality of information recording media respectively having a generally paper shape with an image display surface for rewritably displaying various information, the image display surface of each of the information recording media having peripheral portions including a holding portion and recorded with identification information in one of the peripheral portions other than the holding portion, the identification information recorded on each of the information recording media indicating a storage location of one page of display image information written on the information recording medium and prestored in storage means; a holding part which holds the holding portion of each of the information recording media which are stacked; information input means for accepting an input of various information by handwriting on the information recording media; additional writing means for additionally inputting desired various information by handwriting on an arbitrary one of the information recording media; identification information recognizing means for recognizing the identification information recorded on the arbitrary information recording medium which is used as the writing target; information storing means for storing the various information input by the additional writing means and accepted by the information input means and the identification information recognized by the identification information recognizing means in an information storage medium by linking corresponding various information and identification information; and information output means for outputting the various information stored in the information storage medium with respect to the storage means which stores various information at storage locations specified in advance depending on the identification information.

According to the information processing apparatus of the present invention, it is possible to appropriately reproduce electronic data indicating what has been additionally written on which document. In addition, since the identification information is recorded in the peripheral portion other than the holding part of the information recording medium, it is possible to positively identify each information recording medium which is used as the writing target even during operation or work while the stacked information recording media are turned over as if turning the pages of a notebook. Furthermore, since the information recording media are rewritable, it is possible to prevent paper from being wasted, and the resources can be used efficiently to prevent unwanted deterioration of the environment.

In the information processing apparatus, the storage means may be formed by an externally connected computer, the information storing means may link the various information input by handwriting on the arbitrary information recording medium to the identification information and store the various information and the identification information in the information storage medium after recognizing from the arbitrary information recording medium by the identification information recognizing means the identification information which corresponds one-to-one to one page of a document stored within the computer, and the information output means may transfer the various information stored in the information storage medium to the computer to overwrite the various information on display image information of one page of the document which corresponds one-to-one, based on the linked identification information. According to the information processing apparatus of the present invention, even in a case where the document stored within the external computer is printed and displayed on the arbitrary information recording medium and the additional writing is made with respect to the document on the arbitrary information recording medium, it is possible to appropriately update the original document within the computer to reflect the additional writing.

In the information processing apparatus, the storage means may be formed by the information storage medium, the information storing means may link the various information input by handwriting on the arbitrary information recording medium to the identification information and store the various information and the identification information in the information storage medium after recognizing from the arbitrary information recording medium by the identification information recognizing means the identification information which corresponds one-to-one to one page of a document stored within the information storage medium, and the information output means may transfer the various information stored in the information storage medium within the information storage medium to overwrite the various information on display image information of one page of the document which corresponds one-to-one, based on the linked identification information. According to the information processing apparatus of the present invention, even in a case where the document stored within the internal information storage medium is printed and displayed on the arbitrary information recording medium and the additional writing is made with respect to the document on the arbitrary information recording medium, it is possible to appropriately update the original document within the information storage medium to reflect the additional writing.

The information processing apparatus may further comprise additional writing detecting means for detecting a handwriting input operation on the arbitrary information recording medium; and an identification information recognizing operation control means for controlling the identification information recognizing means to recognize the identification information based on the handwriting input operation detected by the additional writing detecting means. According to the information processing apparatus of the present invention, the identification information recognizing means does not constantly carry out the recognizing operation but carries out the recognizing operation when the actual additional writing is made. For this reason, it is unnecessary to constantly maintain a light source ON within the identification information recognizing means, and a minimum required detecting operation can be made by avoiding unnecessary power consumption.

In the information processing apparatus, the identification information of the arbitrary information recording medium may be recorded on one of the peripheral portions of the image display surface confronting the holding portion. According to the information processing apparatus of the present invention, it is possible to positively identify the arbitrary information recording medium which is the writing target, even in a case where the information recording medium or media above the arbitrary information recording medium are slightly turned.

In the information processing apparatus, the identification information of the arbitrary information recording medium may be recorded on one of the peripheral portions of the image display surface adjacent to the holding portion. According to the information processing apparatus of the present invention, two adjacent sides of each information recording medium become continuously free in an L-shape, so that the both the writing to and the turning of the information recording medium are facilitated.

In the information processing apparatus, the identification information may include a two-dimensional code, and the identification information recognizing means may include a two-dimensional code reader. According to the information processing apparatus of the present invention, it is possible to increase the capacity of the identification information, and prevent the identification information of different information recording media from becoming the same.

In the information processing apparatus, the identification information may include a one-dimensional code, and the identification information recognizing means may include a one-dimensional code reader. According to the information processing apparatus of the present invention, it is possible to use a simple bar code or the like as the identification information.

In the information processing apparatus, the identification information may be recorded on the arbitrary information recording medium so as to reflect light in a region other than a visible region with respect to incident light having a specific wavelength. According to the information processing apparatus of the present invention, it is possible to improve the security of the identification information because the identification information is not visible to a third party.

The information processing apparatus may further comprise power starting means for starting a power supply when the holding part holds the information recording media. According to the information processing apparatus of the present invention, it is possible to improve the ease with which the information processing apparatus is operated and also reduce the power consumption, because the power supply is started automatically only when the holding part holds the information recording media and the information processing apparatus becomes usable.

A further object of the present invention is to provide an information recording medium comprising a member having a generally paper shape and an image display surface for displaying various information; and identification information recorded in one of peripheral portions of the image display surface other than a holding portion, and indicating a storage location of one page of display image information prestored in storage means. According to the information recording medium of the present invention, even in an application where the information recording media are turned as if turning over the pages of a notebook during operation or work during a conference, creative activities or the like, it is possible to obtain a correct correspondence between each information recording medium and the origin of the display image information on each information recording medium.

Another object of the present invention is to provide an information recording medium comprising a member having a generally paper shape and an image display surface for rewritably displaying and maintaining various information; and identification information recorded in one of peripheral portions of the image display surface other than a holding portion, and indicating a storage location of one page of display image information prestored in storage means. According to the information recording medium of the present invention, even in an application where the information recording media are turned as if turning over the pages of a notebook during operation or work during a conference, creative activities or the like, it is possible to obtain a correct correspondence between each information recording medium and the origin of the display image information on each information recording medium. Furthermore, since the information recording medium is rewritable, it is possible to prevent paper from being wasted, and the resources can be used efficiently to prevent unwanted deterioration of the environment.

In the information recording medium, the identification information may reflect light in a region other than a visible region with respect to incident light having a specific wavelength. According to the information recording medium of the present invention, it is possible to improve the security of the identification information because the identification information is not visible to a third party.

Another object of the present invention is to provide an information processing apparatus for generating data corresponding to characters written on an information recording medium, comprising storing means for storing the data, reading means for reading a first personal identification number recorded on the information recording medium, judging means for judging whether or not the first personal identification number read by the reading means matches a second personal identification number which is set in advance, and control means for storing the data in the storing means when the judging means judges that the first and second personal identification numbers match. According to the information processing apparatus of the present invention, it is possible to restrict people having the right to make an editing, by storing the data corresponding to the characters written on the information recording medium only when the first personal identification number matches the second personal identification number which is set in advance.

The control means may store the data in a region which is within the storing means and is indicated on the information recording medium. In this case, it is possible to store the data at a desired location.

The information processing apparatus may further comprise fixing means for fixing a first part forming a peripheral portion of the information recording medium, and the reading means may read the first personal identification number recorded on a second part of the peripheral portion different from the first part. In this case, it is possible to carry out an appropriate data processing for each page, even in a case where the additional writing is made with respect to a plurality of information recording media which are stacked.

Still another object of the present invention is to provide an information processing apparatus for generating data corresponding to characters written on an information recording medium, comprising reading means for reading a first personal identification number recorded on the information recording medium, judging means for judging whether or not the first personal identification number read by the reading means matches a second personal identification number which is set in advance, and control means for storing the data in an externally connected storage means when the judging means judges that the first and second personal identification numbers match. According to the information processing apparatus of the present invention, it is possible to update the data corresponding to the document stored in the externally connected storage means, by writing on the information recording medium.

The reading means may read from the information recording medium document specifying information which specifies a document stored in the storing means, and the control means may overwrite the data with respect to the document which is specified by the document specifying information read by the reading means.

In addition, the information recording medium may be recorded with additional writing enable/disable information which indicates whether or not an additional writing is possible with respect to a document which is already recorded on the information recording medium, the reading means may read the additional writing enable/disable information, and the control means may store the data in the storing means only when the additional writing enable/disable information read by the reading means indicates that an additional writing is possible. By such means, it is possible to improve security of the document by restricting people having the right to additionally write with respect to the document.

A further object of the present invention is to provide an information processing system for generating and processing data corresponding to characters written on an information recording medium, comprising storing means for storing the data, recording means for recording a first personal identification number on the information recording medium, reading means for reading the first personal identification number which is recorded on the information recording medium by the recording means, judging means for judging whether or not the first personal identification number read by the reading means matches a second personal identification number which is set in advance, and control means for storing the data in the storing means when the judging means judges that the first and second personal identification numbers match. According to the information processing system of the present invention, it is possible to authorize additional writing on the information recording medium only to specific people, by recording on the information recording medium the first personal identification number which matches the second personal identification number.

Another object of the present invention is to provide an information processing system for generating and processing data corresponding to characters recorded on an information recording medium which is recorded with print enable/disable information which indicates whether or not a printing is possible, comprising recording means for recording the print enable/disable information on the information recording medium, reading means for reading the print enable/disable information which is recorded on the information recording medium by the recording means, and printing means for printing the characters on the information recording medium depending on the data when the print enable/disable information read by the reading means indicates that the printing is possible. According to the information processing system of the present invention, it is possible to carry out a selective printing by using the information recording medium recorded with the print enable/disable information.

Still another object of the present invention is to provide an information recording medium which becomes a writing target when generating data corresponding to written characters, comprising a recording layer at least including a leuco dye and a developer and recorded with a first personal identification number, the first personal identification number being read by reading means, and characters being recorded with respect to the recording layer when the first personal identification number matches a second personal identification number which is set in advance. According to the information recording medium of the present invention, it is possible to easily rewrite the first personal identification number and the written characters.

The information recording medium described above may be provided with a recording layer made of a resin layer including organic compound grains and recorded with a first personal identification number. In other words, by providing a recording layer having an optical characteristic which changes reversibly with respect to temperature, it becomes possible to easily rewrite the first personal identification number and the written characters on the information recording medium.

Other objects and further features of the present invention will be apparent from the following detailed description when read in conjunction with the accompanying drawings.

BRIEF DESCRIPTION OF THE DRAWINGS

FIG. 31 is a system block diagram showing a hardware structure of the fifth embodiment of the information processing apparatus;

FIGS. 37A and 37B respectively are diagrams showing structures of the printer included in the sixth embodiment of the information processing apparatus;

DESCRIPTION OF THE PREFERRED EMBODIMENTS

Figure 5:
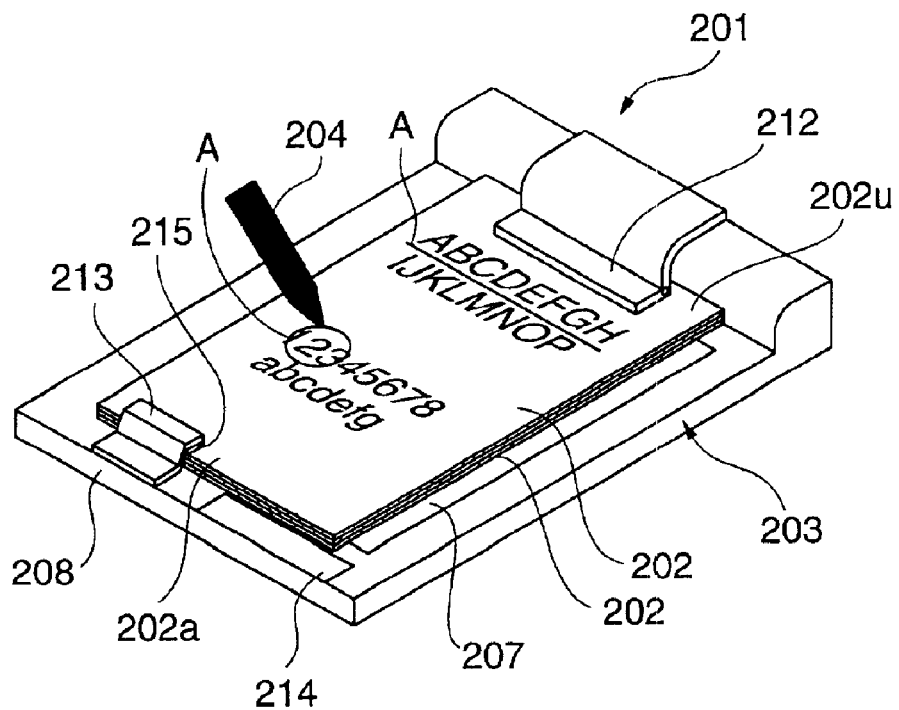
FIG. 5 is a perspective view showing a structure of a first embodiment of an information processing apparatus according to the present invention.
Figure 6:
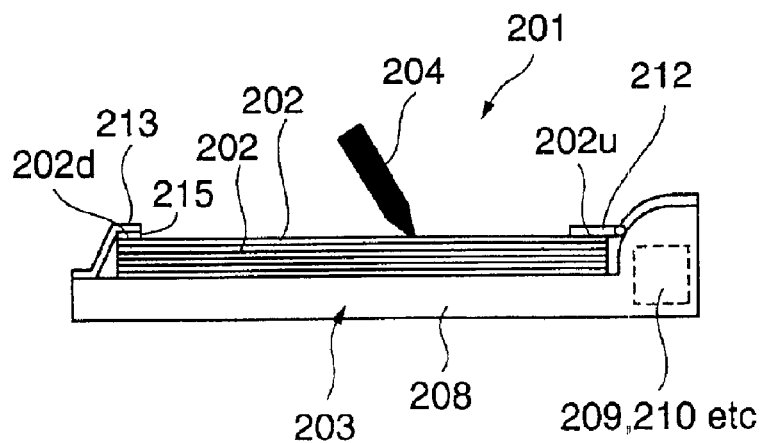
FIG. 6 is a side view showing the structure of the first embodiment of the information processing apparatus.
Figure 7:
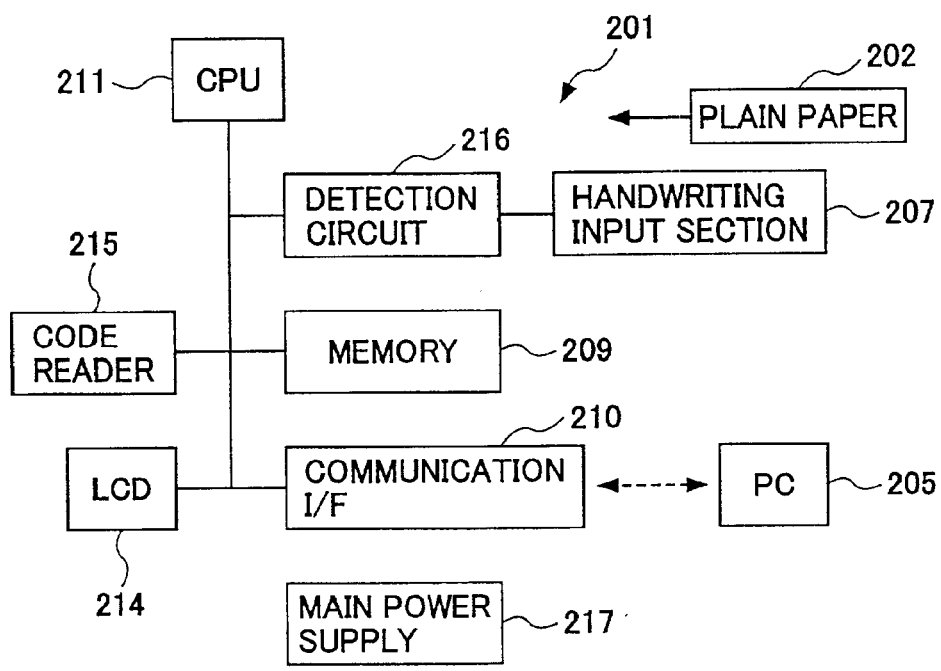
FIG. 7 is a system block diagram showing a hardware structure of the first embodiment of the information processing apparatus.

First, a description will be given of a first embodiment of an information processing apparatus according to the present invention, by referring to FIGS. 5 through 13C. FIG. 5 is a perspective view showing a structure of this first embodiment of the information processing apparatus according to the present invention. FIG. 6 is a side view showing the structure of this first embodiment of the information processing apparatus, and FIG. 7 is a system block diagram showing a hardware structure of this first embodiment of the information processing apparatus.

Figure 1:
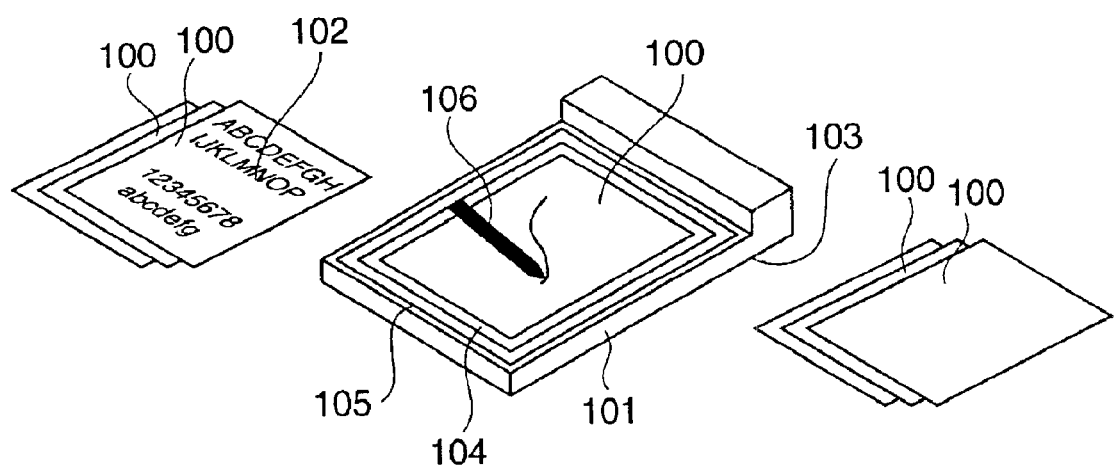
FIG. 1 is a perspective view showing a structure of a proposed information processing apparatus.
Figure 2:
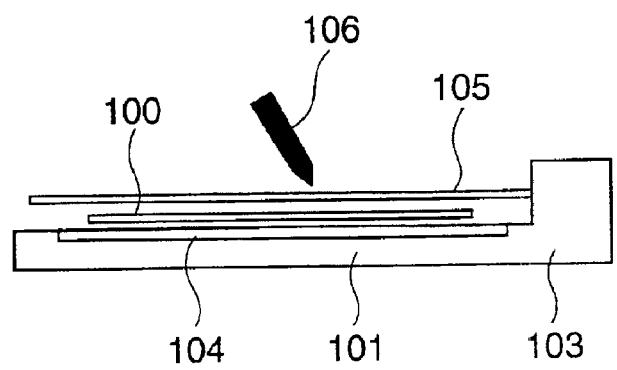
FIG. 2 is a side view showing the structure of the proposed information processing apparatus shown in FIG. 1.
Figure 3:
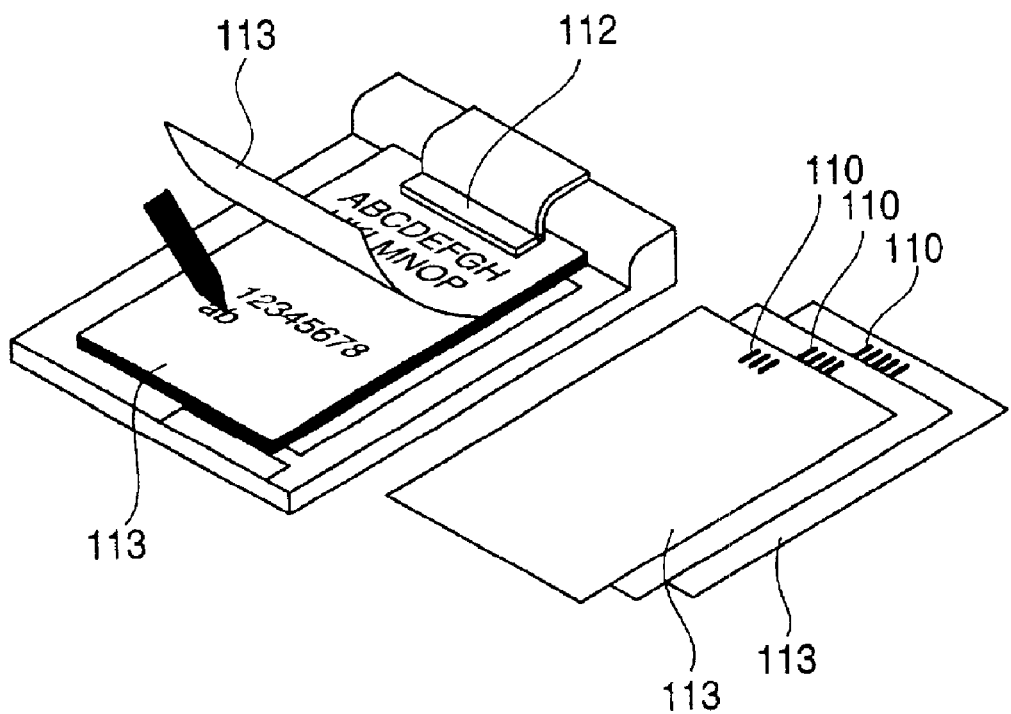
FIG. 3 is a perspective view showing a structure an information processing apparatus employing a proposed method.
Figure 4:
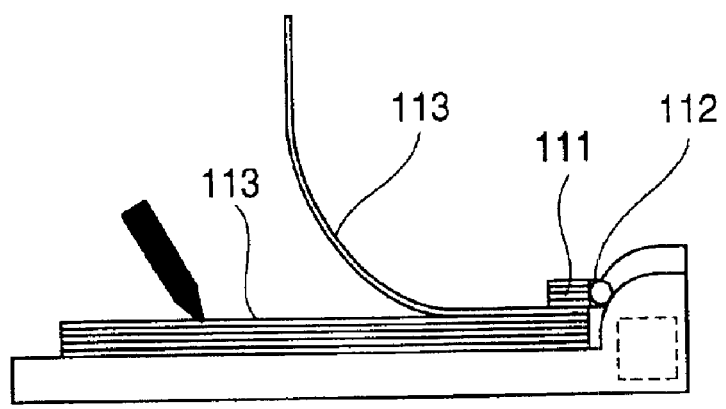
FIG. 4 is a side view showing the structure of the information processing apparatus shown in FIG. 3.

As shown in FIG. 5, an information processing system (paper system) 201 a plurality of plain papers 202 which form information recording media (or information display media) printed with document information in advance, a digitizer (tablet) 203 which forms an electromagnetic induction type information storage unit, and an electromagnetic pen 204 for making an input by handwriting. The information processing system 201 is connectable to an external personal computer (PC) 205 which is shown in FIG. 3 and forms an information storage means.

Each plain paper 202 is formed to a generally paper form having A4 size, for example. The plain papers 202 are printed in advance with various document data, in units of one picture or frame, stored in the personal computer 205. In addition, as will be described later, identification information which indicates that the document data form a portion of the document stored in the personal computer 205 is also printed on the plain paper 202 in the form of a two-dimensional code 206 shown in FIG. 8.

As shown in FIG. 5, the digitizer 203 has a handwriting input section 207 provided on the surface of a plate-shaped main body board 208. Further, as shown in FIG. 7, a memory 209 which forms an information storage medium, a communication interface (I/F) 210 for communicating with the personal computer 205, a 1-chip central processing unit (CPU) 211 and the like are built into the main body board 208 of the digitizer 203. A holding clip 212 is provided as a medium holding part for replaceably holding a central portion of a top peripheral portion (top holding end) 202u of each of the plain papers 202 which are stacked on the main body board 208. A storing clip 213 is provided to push a bottom peripheral portion (bottom pushing end) 202d of each of the stacked plain papers 202. A liquid crystal display (LCD) 214 is provided beside the storing clip 213 at the lower end of the main body board 208. In addition, a two-dimensional code reader 215 is provided at a lower surface of the storing clip 213 which pushes down on the stacked plain papers 202. The two-dimensional code reader 215 forms an ID recognizing means for optically reading the two-dimensional code 206 shown in FIG. 8.

In the digitizer 203, a detection circuit 216 of the handwriting input section 207, the memory 209, the communication interface 210, the two-dimensional code reader 215, the LCD 214 and the like are connected to the CPU 211. A main power supply 217 supplies power to various parts of the information processing apparatus. The CPU 211 carries out various kinds of information processing according to appropriate programs, so that the digitizer 203 can function as an information input means, an information storing means, an information output means and the like.

The information input means includes as hardware the handwriting input section 207, the CPU 211, the detection circuit 216 and the like, and accepts various information input by handwriting. In other words, when characters, lines and the like are input by handwriting to the handwriting input section 207 via the electromagnetic pen 204 on the plain papers 202 which are stacked on the main body board 208, the input pattern is detected (or accepted) by the detection circuit 216. The electromagnetic pen 204 radiates an electromagnetic field when active and making the input by handwriting. The electromagnetic induction type digitizer 203 detects the position coordinates of the electromagnetic pen 204 via the detection circuit 216 when the input by handwriting is made with respect to the handwriting input section 207. According to the electromagnetic induction type digitizer 203, the position coordinates of the electromagnetic pen 204 can be detected up to a paper thickness of approximately 5 mm. Hence, it is possible to recognize the contents which are input by handwriting with respect to the uppermost plain paper 202 by the electromagnetic pen 204, even when a number of plain papers 202 are stacked on the handwriting input section 207 of the digitizer 203.

The information storing means includes the memory 209 and the CPU 211. The various information input by handwriting and accepted by the information input means as described above is stored in the memory 209 under the control of the CPU 211 which relates or links the various information to the identification information which is recognized by the two-dimensional code reader 215, as will be described later. For example, a large-capacity flash memory, a hard disk or the like may be used as the memory 209.

The information output means includes the CPU 211, the communication interface 210 and the like. As will be described later, the information output means outputs the various information which is input by handwriting and stored in the memory 209 with respect to the personal computer 205 which stores various information by being specified of the information storage location in advance depending on the identification information. In this case, a general interface such as a RS232C port, an Ethernet port and a PCMCIA port may be used for the communication interface 210.

Next, a description will be given of the identification information, that is, the two-dimensional code 206, printed on the plain paper 202. As described above, the two-dimensional code 206 indicates that the display image information printed on the plain paper 202 form a portion of the document within the personal computer 205. For example, the two-dimensional code 206 indicates a document name, a page number, a personal computer name (PC name), an IP address of the personal computer (PC) or the like. By employing a directory structure such as "¥¥(PC name (or IP address of PC))¥(drive name)¥(folder name)¥(document name)¥page", it is possible to uniquely specify a location (information storage location) where the document amounting to a minimum of one page is stored.

Figure 8:
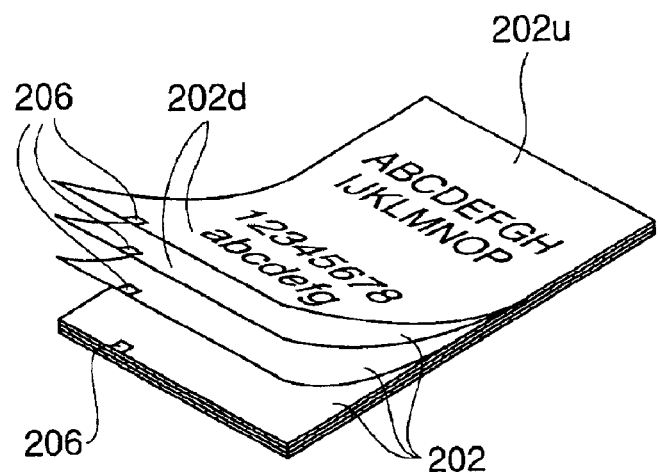
FIG. 8 is a perspective view showing two-dimensional codes printed on plain paper.

The two-dimensional code 206 is printed on each plain paper 202 at a portion in a vicinity of the peripheral edge of the plain paper 202 other than the top peripheral portion 202u. In this embodiment, the two-dimensional code 206 is printed on each plain paper 202 at the bottom peripheral portion 202d on a confronting end from the top peripheral portion 202u, that is, at a position corresponding to the two-dimensional code reader 215 as shown in FIG. 8.

A one-dimensional bar code or the like may be used for the identification information. However, considering the fact that a large variety of documents need to be categorized by using the identification information as a document ID and the number of categories may become insufficient when the one-dimensional bar code or the like is used, it is desirable to use, as in the case of this embodiment, the two-dimensional code 206 which has a considerably larger capacity compared to the one-dimensional bar code or the like. In other words, codes having approximately twenty digits can be generated by use of the two-dimensional code 206, so that it is possible to assign absolute identification numbers such as sequential numbers to the number of plain papers used world wide. That is, the document ID of the document which is once created becomes unique and fixed, so that each document is assigned a single document ID which is unique world wide.

In addition, in the case of the identification information such as the two-dimensional code 206, it is desirable to record the identification information on the plain paper 202 so as to reflect light in a region other than the visible region with respect to an incident light having a specific waveform. By making the reflected light exist in the region other than the visible region, the identification information becomes invisible to the human eye, and the security is improved in that the document ID cannot be immediately recognized by a third party.

Furthermore, even if the document on the original plain paper 202 is copied onto a plain paper having another document ID such as the two-dimensional code 206, the document ID on the copy becomes different from the document ID on the original plain paper 202. For this reason, even if additional writing is made with respect to the copy, the contents of the additional writing will not be overwritten on the document on the original plain paper 202, and the document data can be protected.

Moreover, it is also preferable from the appearance point of view to record the identification information on the plain paper 202 so as to reflect the light in the region other than the visible region with respect to the incident light having the specific wavelength.

Figure 9A:
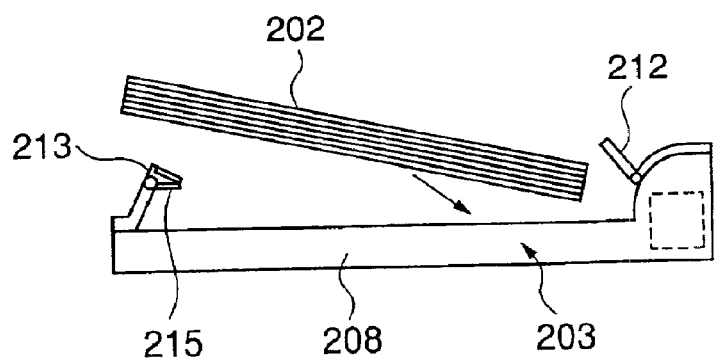
FIGS. 9A and 9B respectively are side views showing a power start structure.
Figure 9B:
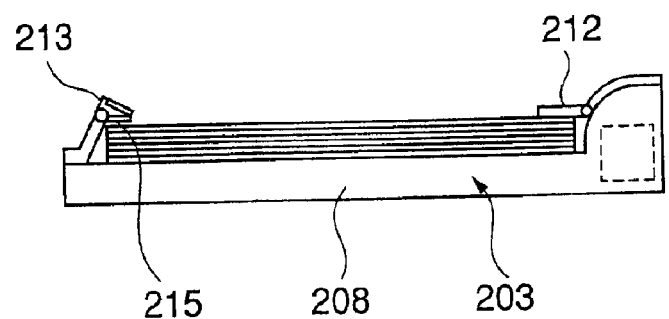

In this embodiment, the digitizer 203 is designed so as to allow the digitizer 203 to be carried and used at an arbitrary location. Hence, it is desirable to use as the main power supply 217 a rechargeable secondary battery which is built into the main body board 208. By considering the power consumption when using such a rechargeable secondary battery for the main power supply 217, the holding clip 212 also has a function of a power switch. As shown in FIGS. 9A and 9B, the main power supply 217 is started and set operable when a plurality of plain papers 202 are stacked on the main body board 208 and held by the holding clip 212. FIG. 9A shows a state where the plain papers 202 are being stacked, and FIG. 9B shows a state where the stacked plain papers 202 are held by the holding clip 212.

The main power supply 217 is started by a power starting means or structure, under the control of the CPU 211. FIG.

Figures 10, 11:
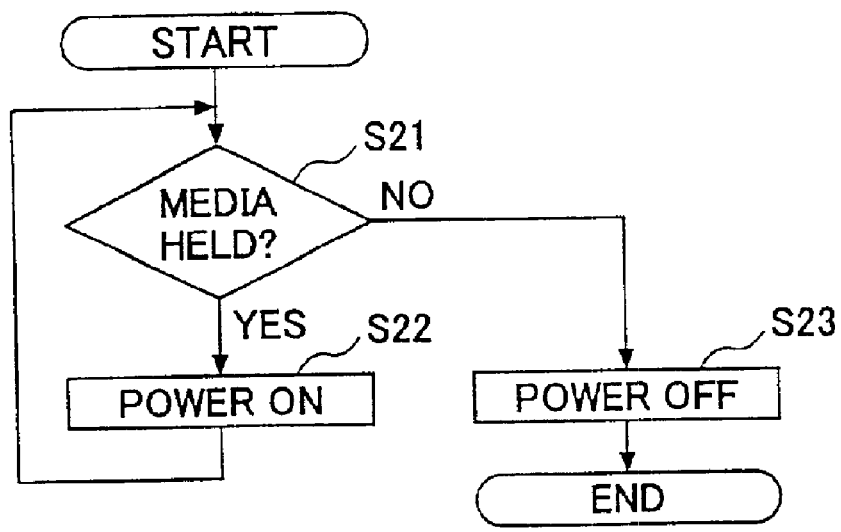
FIG. 10 is a flow chart for explaining an operation of the power start structure.
FIG. 11 is a diagram for explaining a memory map.

10 is a flow chart for explaining an operation of the power start structure. In FIG. 10, a step S21 decides whether or not the plain papers 202, that is, the information recording media, are held by the holding clip 212, based on a position of the holding clip 212. If the decision result in the step S21 is NO, the main power supply 217 is turned OFF, and the operation ends. On the other hand, if the decision result in the step S21 is YES, a step S22 turns ON the main power supply 217, and the operation returns to the step S21.

Next, a description will be given of a method of using this embodiment of the information processing system 201 having the structure described above. First, the plurality of plain papers 202 printed in advance with the various document data stored in the personal computer 205 are stacked and placed on the main body board 208. The top peripheral portions 202u of the plain papers 202 may be bound. In this state, the holding clip 212 securely holds the top peripheral portions 202u, and the storing clip 213 stops the bottom peripheral portions 202d. Hence, the main power supply 217 is started as described above, and the two-dimensional code reader 215 built into the lower surface of the storing clip 213 operates to read the information of the two-dimensional code 206 printed on the uppermost plain paper 202 of the stack, so as to recognize the identification information. Based on the recognized identification information, origin information or the like of the document information printed on the uppermost plain paper 202 is displayed on the LCD 214. Hence, the information displayed on the LCD 214 is useful in that the user can easily recognize the document printed on the uppermost plain paper 202 from the displayed information. Further, the recognized identification information is stored in the memory 209 under the control of the CPU 211.

When the user makes an additional writing in this state by handwriting on the plain paper 202 by the electromagnetic pen 204, the handwriting input section 207 detects the position information depending on the movement of the electromagnetic pen 204 by the detection circuit 216, and stores the position information in the memory 209 as additional writing data via the CPU 211. FIG. 5 shows a state where a circle and an underline are additionally written as additional writing information A. When carrying out this storage process, the additional writing data are stored in the memory 209 by relating or linking the additional writing data to the identification information described above.

FIG. 11 is a diagram for explaining a memory map of the memory 209. FIG. 11 shows a case where a first page P1 and a second page P2 of a document CC are related or linked to the respective additional writing data and stored in the memory 209. More particularly, ID="YYAAYBBYCCYP1" and ID="YYAAYBBYCCYP2" are related or linked to the respective additional writing data and stored in the memory 209. In the case shown in FIG. 11, the additional writing is not yet made with respect to the second page P2.

Next, a description will be given of a case where the additional writing is made with respect to the second page, that is, the plain paper 202 immediately under the uppermost plain paper 202 of the stack. In this case, the user turns the first page, that is, the uppermost plain paper 202. By this turning of the first page, the second page, that is, the second uppermost plain paper 202 becomes the uppermost plain paper at the bottom portion of the stack where the first page is turned. Hence, the bar code reader 215 in the storing clip 213 reads the two-dimensional code 206 printed on the plain paper 202 forming the second page. Processes such as recognizing the identification information of the second page and storing the identification information in the memory 209 are carried out similarly as in the case of the first page. At the same time, when the additional writing is made by the electromagnetic pen 204 with respect to the second page, the additional writing data is recognized by the detection circuit 216 of the handwriting input section 207, and the additional writing data are related or linked to the identification information of the second page and stored in the memory 209.

When all operations carried out on the information processing system 201 end, the information processing system 201 is connected to the personal computer 205 in which the document was originally stored. Hence, the additional writing data and the corresponding identification information stored in the memory 209 are output via the communication interface 210 to the personal computer 205. The additional writing data are overwritten on the original document if the identification information linked to the additional writing data and the identification information of the original document match, so as to update the data file of the personal computer 205 to a most recent data file. On the other hand, if the identification information linked to the additional writing data and the identification information of the original document do not match, the mismatch is notified to the user by making a display on the LCD 214, for example, because there is a high possibility that the additional writing data belongs to the document data within another personal computer.

Figure 12:
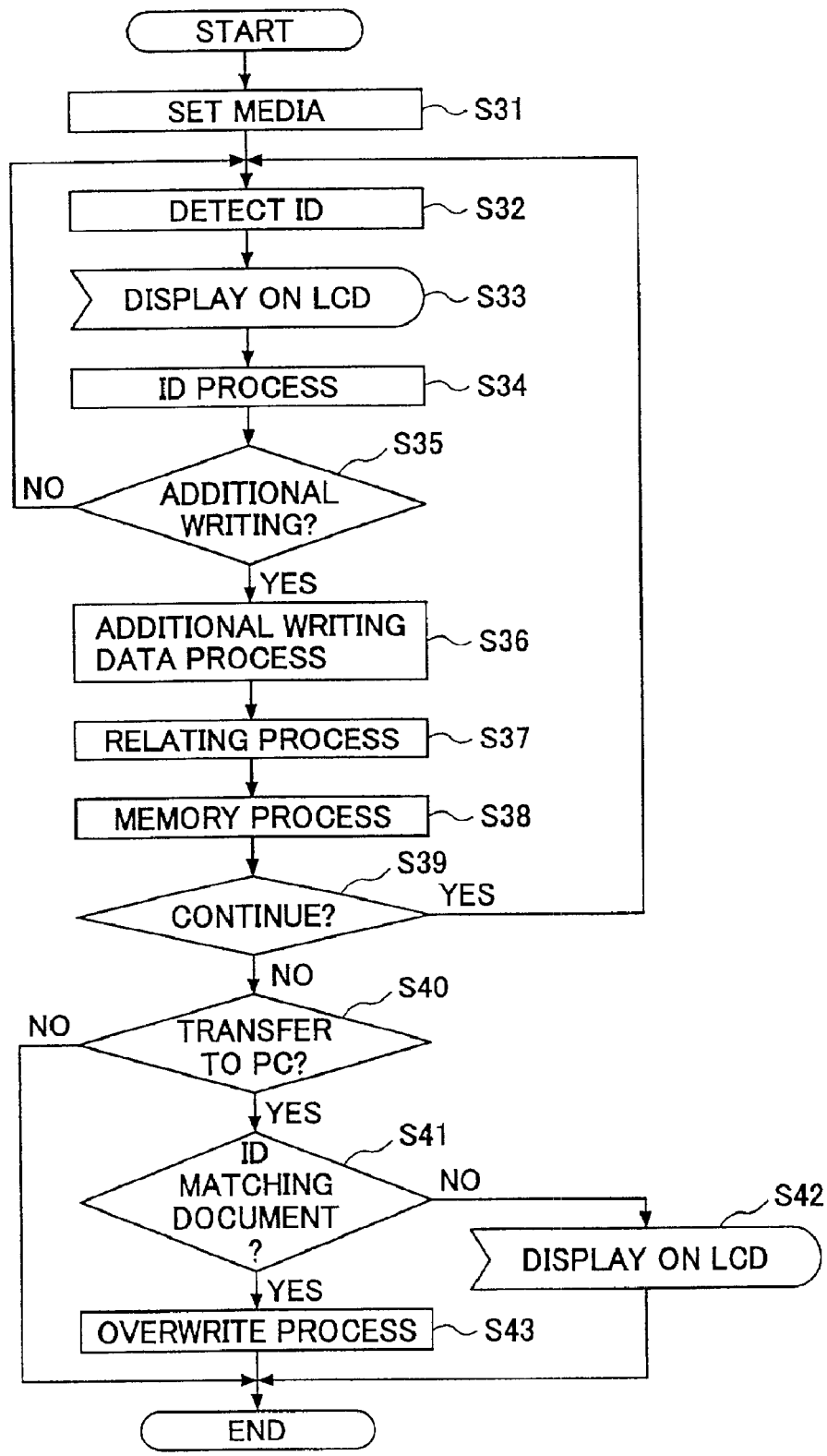
FIG. 12 is a flow chart for explaining a general process control of the first embodiment of the information processing apparatus.

FIG. 12 is a flow chart for explaining a general process control of this first embodiment of the information processing apparatus, from the time of setting the plain papers 202 on the main body board 208 to the overwriting of the document data within the personal computer 205.

In FIG. 12, a step S31 sets the plain papers 202 which are printed with the identification information related or linked to the document identification information with in the personal computer 205, on the main body board 208. A step S32 detects the identification information from the plain paper 202 forming the page which is being viewed by the user, and a step S33 displays the detected identification information on the LCD 214. A step S34 carries out an identification information process to store the detected identification information in the memory 209. A step S35 decides whether or not the additional writing is made by the electromagnetic pen 204 on the page which is being viewed by the user. The operation returns to the step S32 if the decision result in the step S35 is NO.

On the other hand, if the decision result in the step S35 is YES, a step S36 carries out an additional writing data process to detect and store the additional writing data in the memory 209. A step S37 carries out a relating process to relate or link the additional writing data to the detected identification information. A step S38 carries out a memory process to store the identification information and the additional writing data related or linked to the identification information in the memory 209. A step S39 decides whether or not to continue the operation on the information processing system 201, and the operation returns to the step S32 if the decision result in the step S39 is YES.

If the decision result in the step S39 is NO, a step S40 decides whether or not the additional writing data and the corresponding identification information are to be transferred to the personal computer 205. The operation ends if the decision result in the step S40 is NO. If the decision result in the step S40 is YES, a step S41 decides whether or not the personal computer 205 to which the information processing system 201 is connected for the data transfer stores a document with a document identification information matching the identification information transferred from the information processing system 201. If the decision result in the step S41 is NO, a step S42 displays the mismatch of the identification information on the LCD 214, and the operation ends. On the other hand, if the decision result in the step S41 is YES, a step S43 carries out an overwrite process to overwrite the additional writing data on the original document having the matching identification information within the personal computer 205, and the operation ends.

Of course, the original document may be stored in the information processing system 101 itself and not the personal computer 205. In a case where the original document is stored in the memory 209 such as the hard disk of the digitizer 203, the additional writing data stored in the memory 209 is output together with the corresponding identification information. The additional writing data are overwritten on the original document if the identification information linked to the additional writing data and the identification information of the original document match, so as to update the data file of the information processing system 201 to a most recent data file. On the other hand, if the identification information linked to the additional writing data and the identification information of the original document do not match, the mismatch is notified to the user by making a display on the LCD 214, for example, because there is a high possibility that the additional writing data belongs to the document data within another system or apparatus, such as a personal computer.

When the information processing system 101, that is, the digitizer 203, is carried and the data, characters and the like are to be written on the plain papers 202 which are stacked, the pages of the plain papers 202 are turned over to the rear of the main body board 208 and held by a conventional means or technique, so as to expose a desired page on which the writing is to be made. However, in actual practice, the pages of the plain papers 202 above the desired page may be turned over in various ways depending on the user. For example, as described above in conjunction with FIG. 3, the first page may be turned only halfway to write on the second page, and such a mode of use often occurs.

Figure 13A:
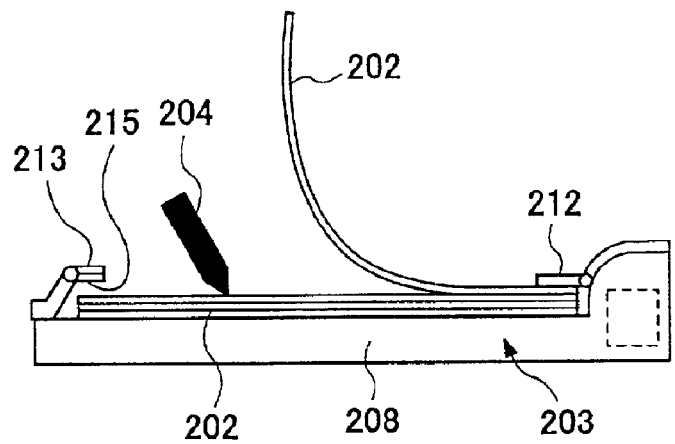
FIGS. 13A, 13B and 13C respectively are side views for explaining turning of the plain paper.
Figure 13B:
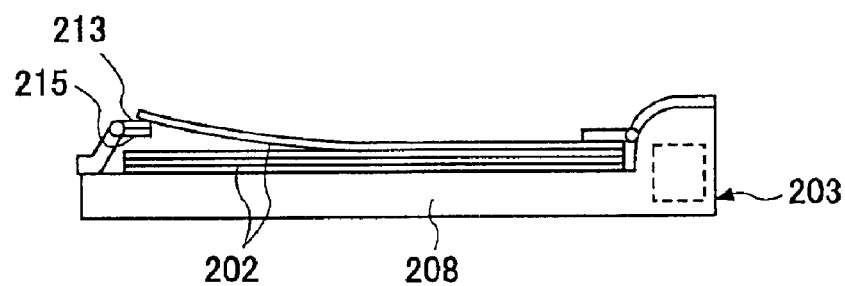
Figure 13C:
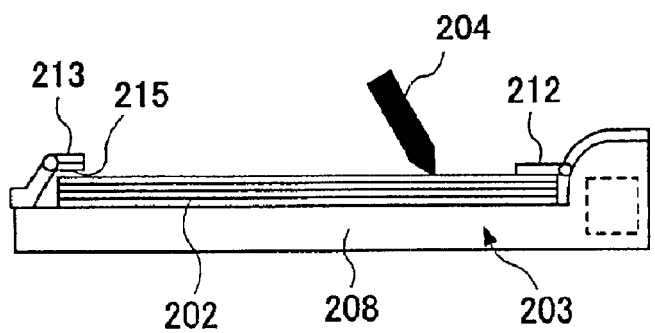

But according to this embodiment, it is possible to cope with the various modes of use of the information processing system 201, because the two-dimensional code reader 215 is positioned closer to the bottom peripheral portion 202d of the plain paper 202, and the two-dimensional code 206 is printed in a portion of the plain paper 202 other than the top peripheral portion 202u, more particularly, printed in the bottom peripheral portion 202d of the plain paper 202 confronting the top peripheral portion 202u. For this reason, even in a state where the first page of the plain paper 202 is turned only halfway as shown in FIG. 13A, it is possible to positively read and recognize the two-dimensional code 206 which is printed on the desired second page of the plain paper 202 which is the target of the additional writing. When returning the turned page of the plain paper 202, the storing clip 213 is pushed downwards by the user's finger tips as shown in FIG. 13B, so that the returned page of the plain paper 202 enters under the storing clip 213. Accordingly, it is desirable that a movable part of the storing clip 213 as a spring-loaded structure so that the storing clip 213 returns to a state shown in FIG. 13C after the storing clip 213 is pushed downwards to return the turned page of the plain paper 202 under the storing clip 213.

Figure 14A:
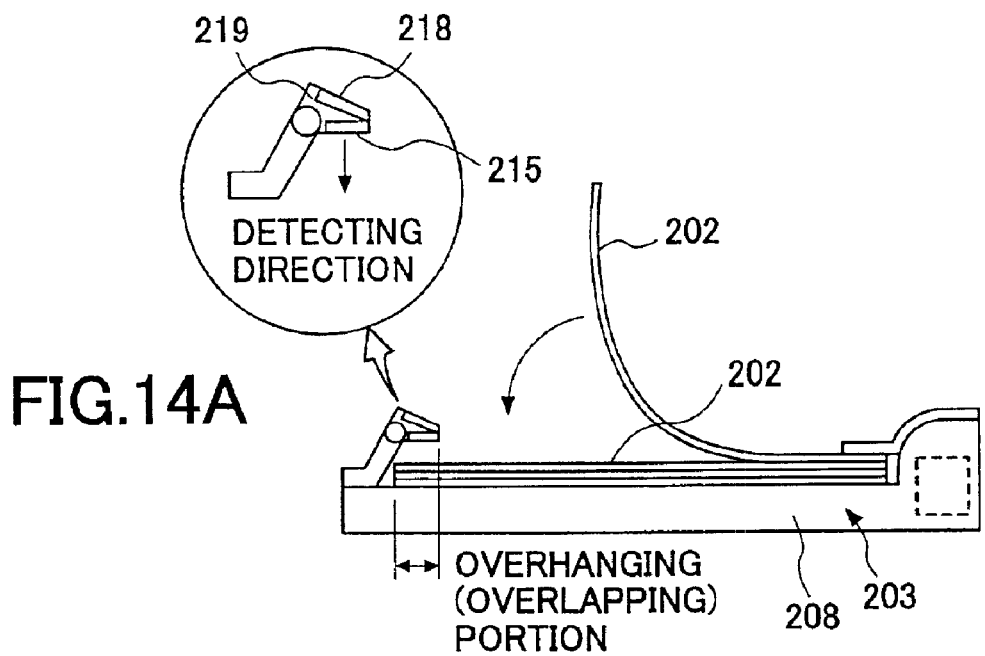
FIGS. 14A, 14B, 14C and 14D respectively are side views showing a structure of a modification of the first embodiment of the information processing apparatus.

FIGS. 14A, 14B, 14C and 14D respectively are side views showing a structure of a modification of the first embodiment of the information processing apparatus according to the present invention, in which the storing clip 213 is moved automatically. In this modification, a sloping surface which slopes slightly from a horizontal surface towards a tip end is provided on the upper surface of the storing clip 213, as shown partially enlarged in FIG. 14A, and a pressure sensor 218 is provided on this upper sloping surface of the storing clip 213 to function as a medium detecting means. The two-dimensional code reader 215 is provided on the lower surface of the storing clip 213 at a position corresponding to the position of the pressure sensor 218. A movable part 219 of the storing clip 213, which is provided with the pressure sensor 218 and the two-dimensional code reader 215, is moved in response to a detection signal from the pressure sensor 218 by a known driving means under the control of the CPU 211. As shown in FIG. 14A, the movable part 219 overhangs the bottom peripheral portion 202d of the plain paper 202 which is set on the digitizer 203. In addition, although not shown in FIGS. 14A through 14D, the storing clip 213 has a spring-loaded structure for automatically returning the movable part 219 to its original position.

Figure 14B:
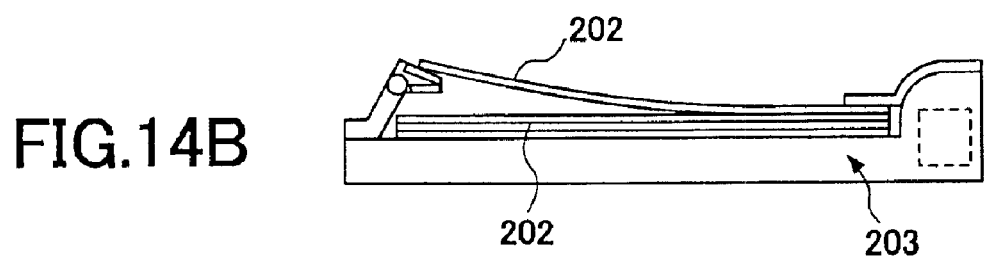
Figure 14C:
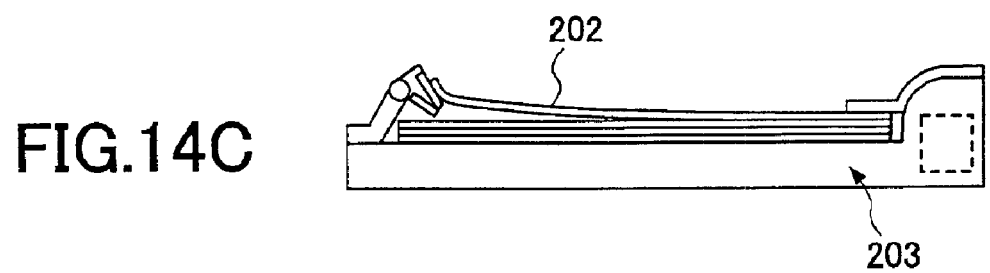
Figure 14D:
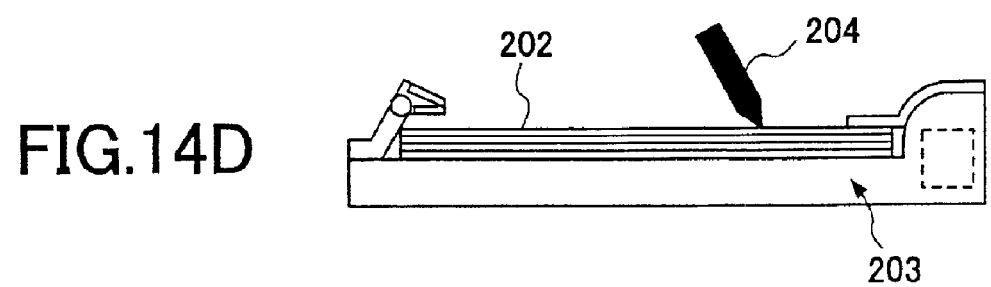

Thus, when returning the turned first page of the plain paper 202 from the state shown in FIG. 14A, the first page of the plain paper 202 is detected by the pressure sensor 218 of the movable part 219 by being interfered by the bottom end of this first page, as shown in FIG. 14B. Hence, the movable part 219 is moved in a direction away from the first page of the plain paper 202 by the known driving means in response to the detection signal from the pressure sensor 218 as shown in FIG. 14C, so as to facilitate the return of the first page on top of the second page of the plain paper 202 in the stack. When the first page of the plain paper 202 is no longer detected by the pressure sensor 218, the driving means releases the moving part 219 and the moving part 219 is automatically returned to the original position shown in FIG. 14D by the action of the spring-loaded structure. In this original position, the two-dimensional code reader 215 can read the two-dimensional code 206 on the first page of the plain paper 202.

Figure 15:
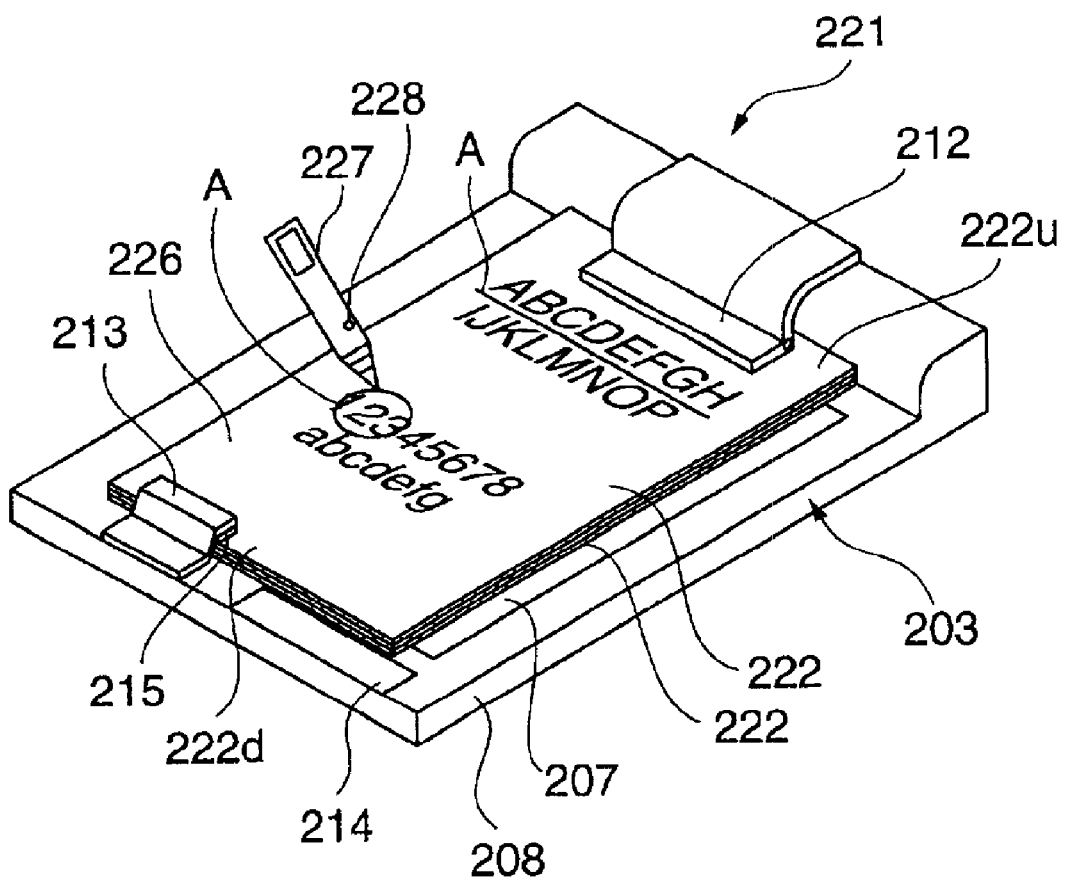
FIG. 15 is a perspective view showing a structure of a second embodiment of the information processing apparatus according to the present invention.
Figure 16:
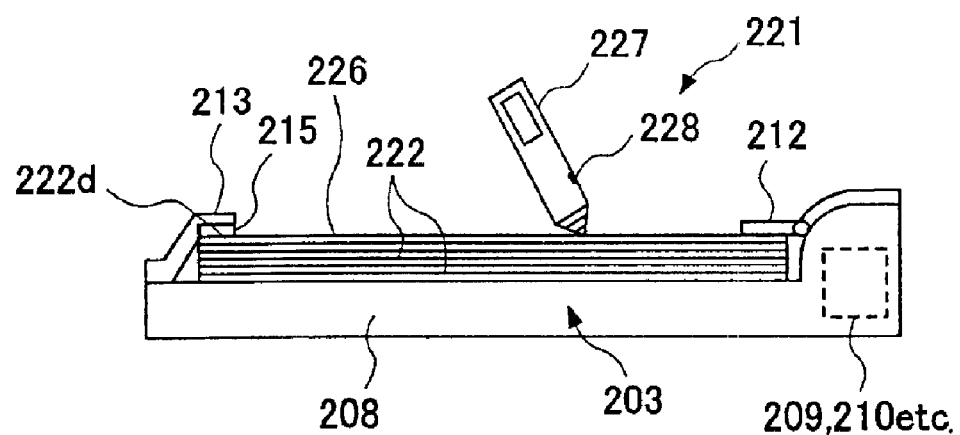
FIG. 16 is a side view showing the structure of the second embodiment of the information processing apparatus.
Figure 17:
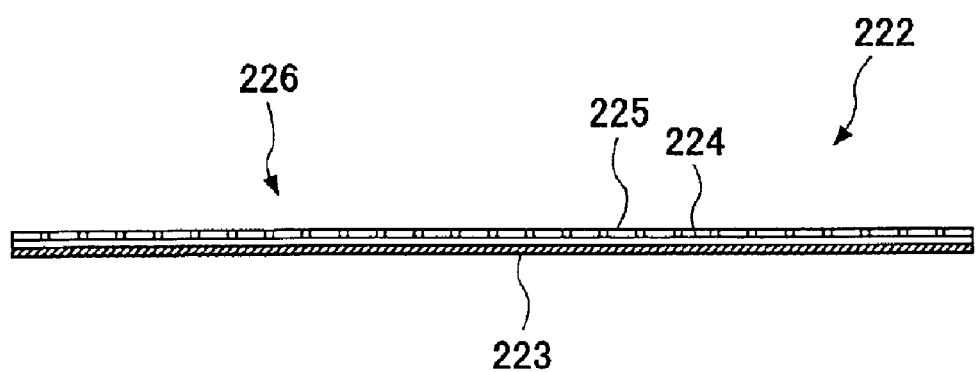
FIG. 17 is a cross sectional view showing a structure of digital paper.
Figure 18:
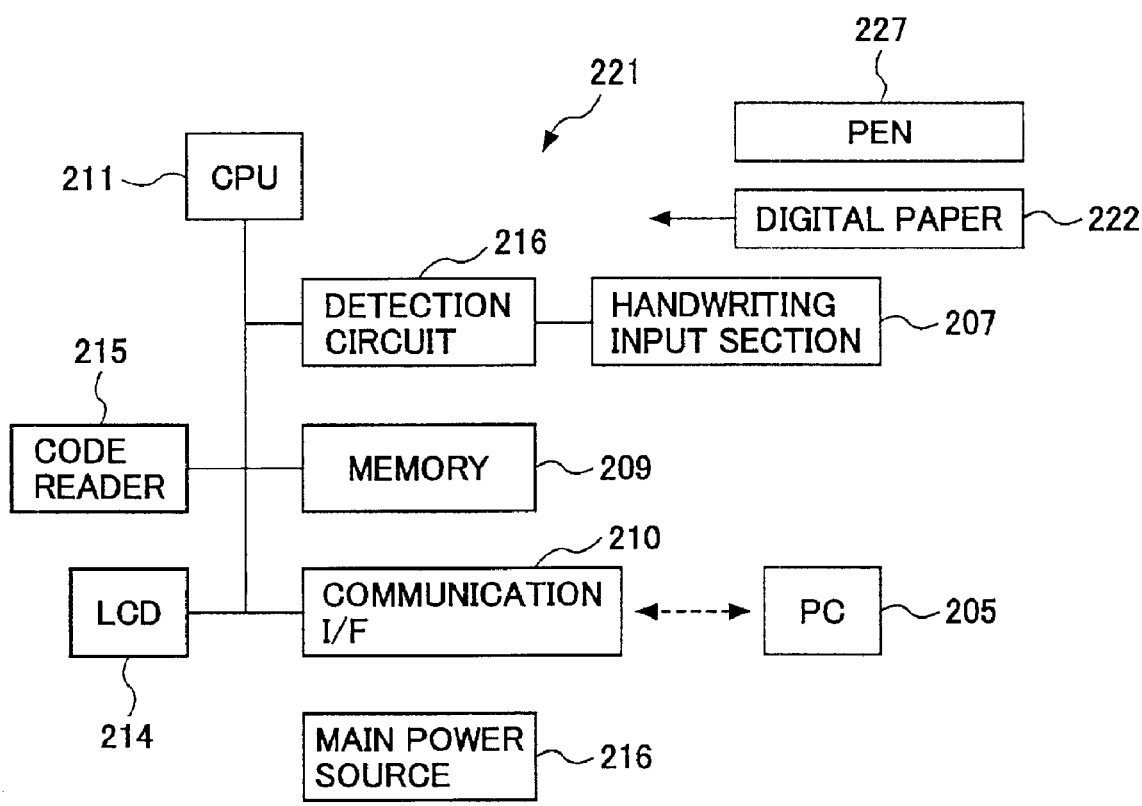
FIG. 18 is a system block diagram showing a hardware structure of the second embodiment of the information processing apparatus.

Next, a description will be given of a second embodiment of the information processing apparatus according to the present invention, by referring to FIGS. 15 through 18. FIG. 15 is a perspective view showing a structure of this second embodiment of the information processing apparatus. FIG. 16 is a side view showing the structure of this second embodiment of the information processing apparatus. FIG. 17 is a cross sectional view showing a structure of digital paper. Further, FIG. 18 is a system block diagram showing a hardware structure of this second embodiment of the information processing apparatus. In FIGS. 15 through 18, those parts which are the same as those corresponding parts in FIGS. 5 through 14D are designated by the same reference numerals, and a description thereof will be omitted.

In this second embodiment, an information processing system (paper system) 221 has a structure which is basically similar to that of the information processing system 201 of the first embodiment, but uses digital papers 222 as the information recording media in place of the plain papers 202. Similarly as in the case of the plain paper 202, the document information is printed on the digital paper 222 in advance, and this document information can be rewritten.

The digital paper 222 has a generally paper form, and has a thickness of approximately 0.2 mm and A4 size, for example. As shown in FIG. 17, each digital paper 222 includes a base film 223, and an image display layer 224 and a protection film 225 are successively stacked on the base film 223. The base film 225 is made of a colorless resin having a good light transmittance. The image display layer 224 is made of color thermochromic which is obtained by mixing a leuco dye and a developer. The color thermochromic is adjusted so as to undergo a reversible change between a transparent state and a black state depending on heating.

In a transparent portion of the image display layer 24, the white base film 23 is visible through the image display layer 24 and the transparent protection film 25. On the other hand, in a portion of the image display layer 24 which changed to black, this black portion is visible through the transparent protection film 25. For this reason, an image display surface 226 is formed on the entire surface region of the digital paper 222, and this image display surface 226 rewritably displays the various information. By utilizing these characteristics of the digital paper 222, the various document data stored in the personal computer 205 are printed by a thermal printer or the like in advance, in a visible state, in units of one picture or frame. Since the image display on the image display surface 226 is realized by the change in state of the image display layer 224, energy is required to display and erase the image information, but no energy is required to maintain the displayed image information.

Although not shown in FIGS. 15 through 17, the identification information, such as the two-dimensional code, is recorded on the digital paper 222 at a portion similar to that of the plain paper 202, that is, at a portion in a vicinity of the peripheral portion of the digital paper 222 other than a top peripheral portion 222c which is held by the holding clip 212. For example, the identification information is recorded in a bottom peripheral portion 222d of the digital paper 222.

Furthermore, in this second embodiment, an electromagnetic/heating pen 227 is used as an additional writing means, in place of the electromagnetic pen 204. This electromagnetic/heating pen 227 is used to make a desired additional writing on the digital paper 222 by handwriting, and to obtain additional writing data made thereby. In other words, the electromagnetic/heating pen 227 not only has a function of radiating electromagnetic waves but also has a function of generating heat. But in order to prevent the electromagnetic/heating pen 227 from unnecessarily generating heat during times other than making the additional writing, an operation switch 228 is provided at a position where the electromagnetic/heating pen 227 held by the user. The electromagnetic/heating pen 227 generates heat when the operation switch 228 is pushed. When the electromagnetic/heating pen 227 having these functions is used to make the additional writing on the digital paper 222, it is possible to simultaneously obtain the actual additional writing in print and the electronic data thereof. Regardless of which one of the stacked digital papers 222 is subjected to the additional writing, it is possible to make an appropriate overwriting since the two-dimensional code of the digital paper 222 subjected to the additional writing is read by the two-dimensional code reader 215 and the additional writing data are related or linked to the read two-dimensional code.

The digital paper 222 can be reused a plurality of times by applying heat. Therefore, according to this second embodiment, it is possible to prevent paper from being wasted by using the digital paper 222 as the information recording medium.

Figure 19A:
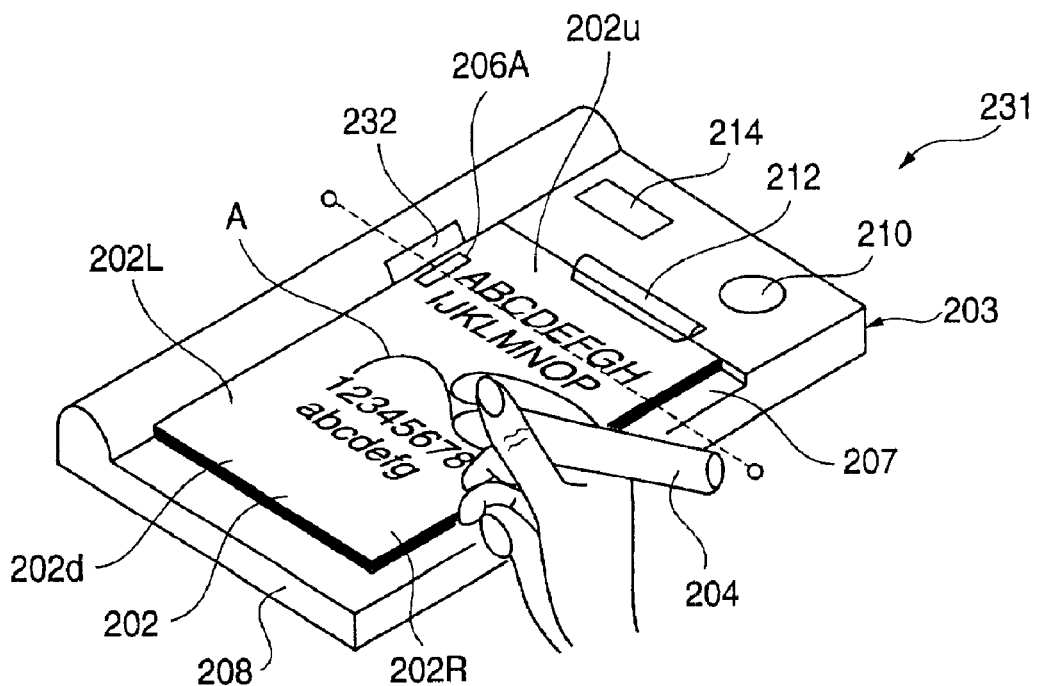
FIGS. 19A and 19B respectively are perspective views showing a structure of a third embodiment of the information processing apparatus according to the present invention.
Figure 19B:
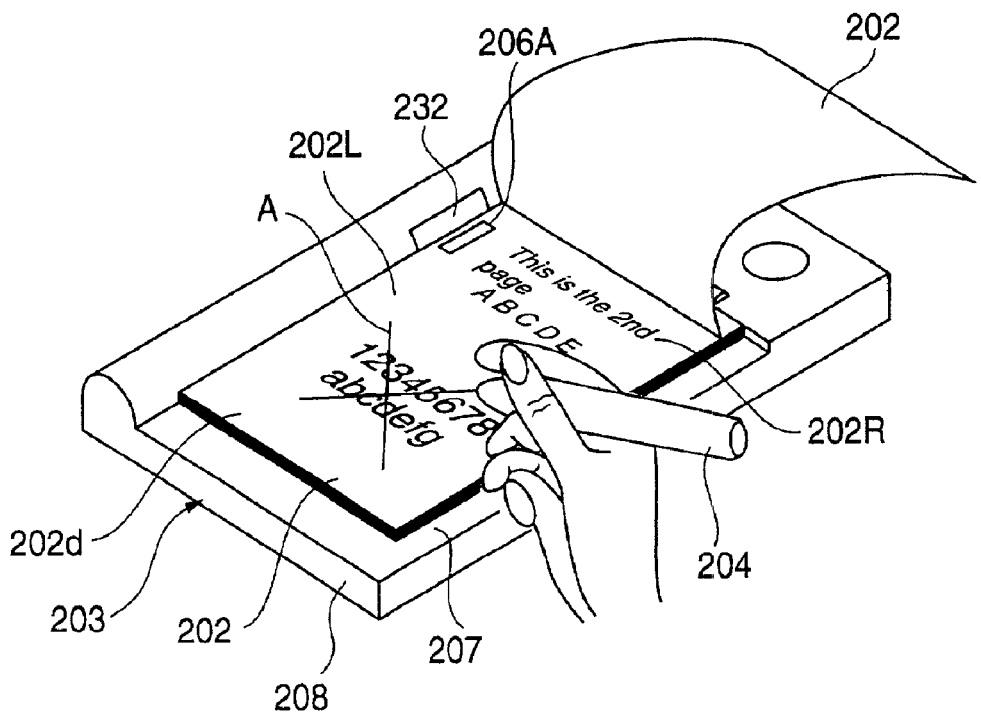
Figure 20:
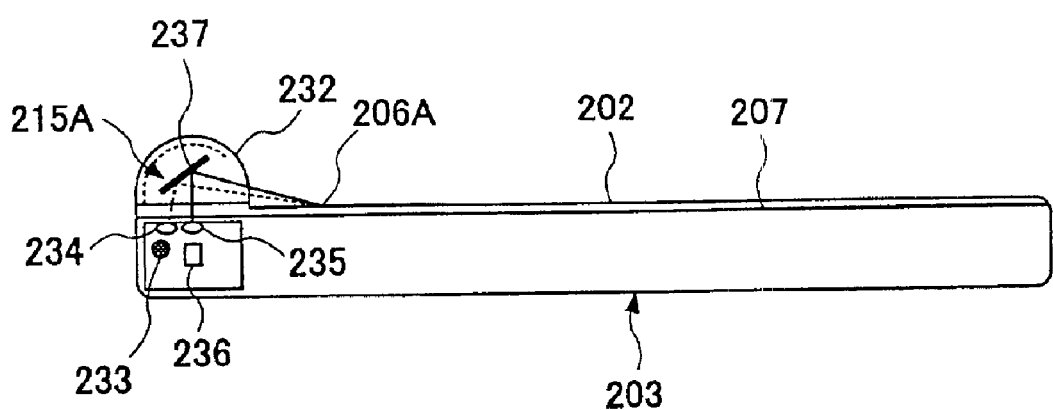
FIG. 20 is a cross sectional view taken along a line a—a in FIG. 19A.
Figure 21A:
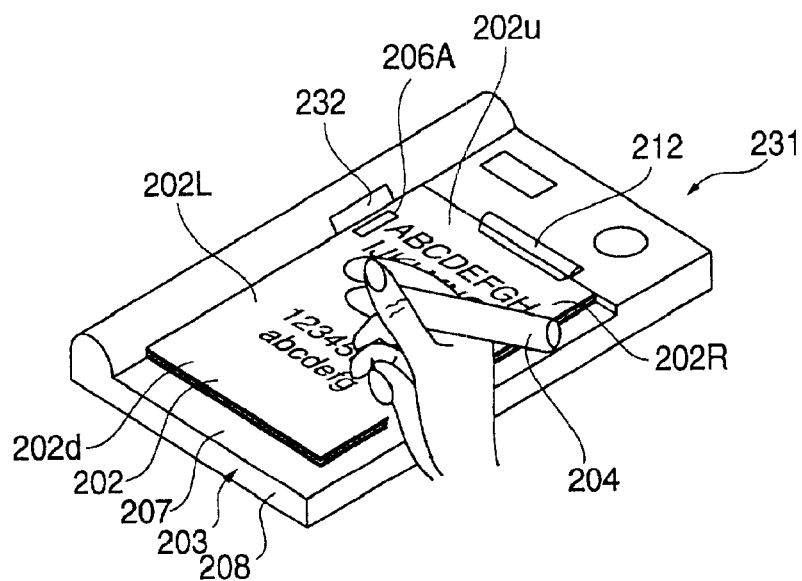
FIGS. 21A, 21B and 21C respectively are perspective views for explaining the third embodiment of the information processing apparatus in use.
Figure 21B:
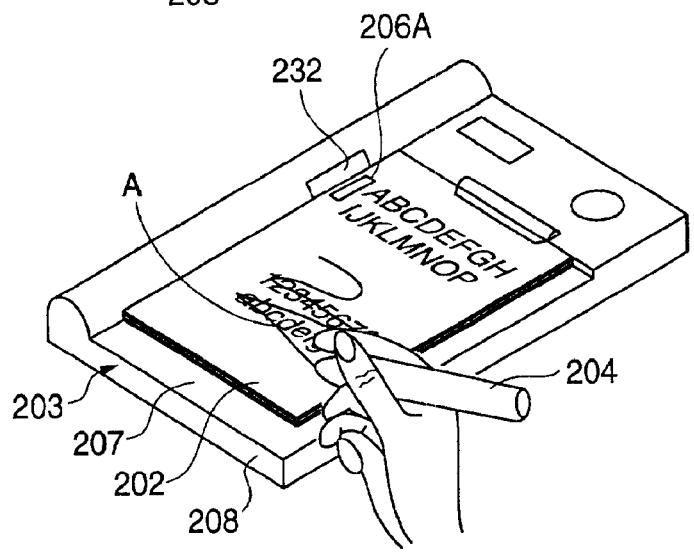
Figure 21C:
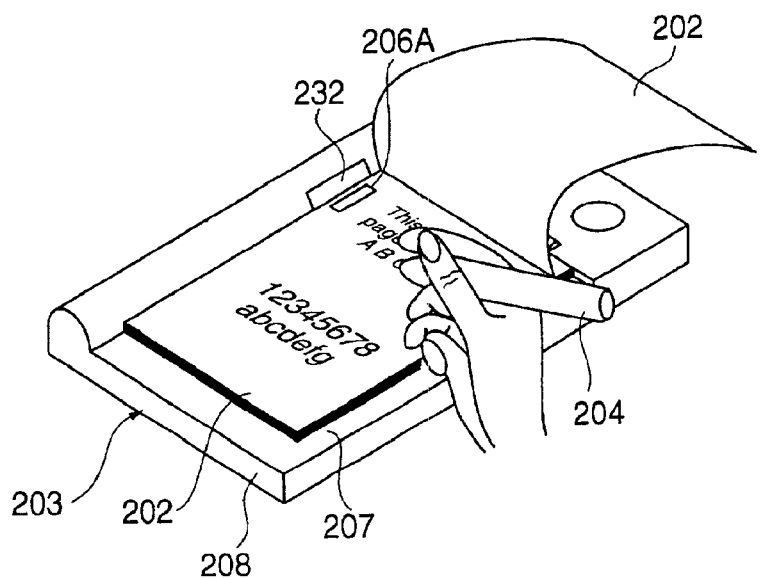
Figure 22:
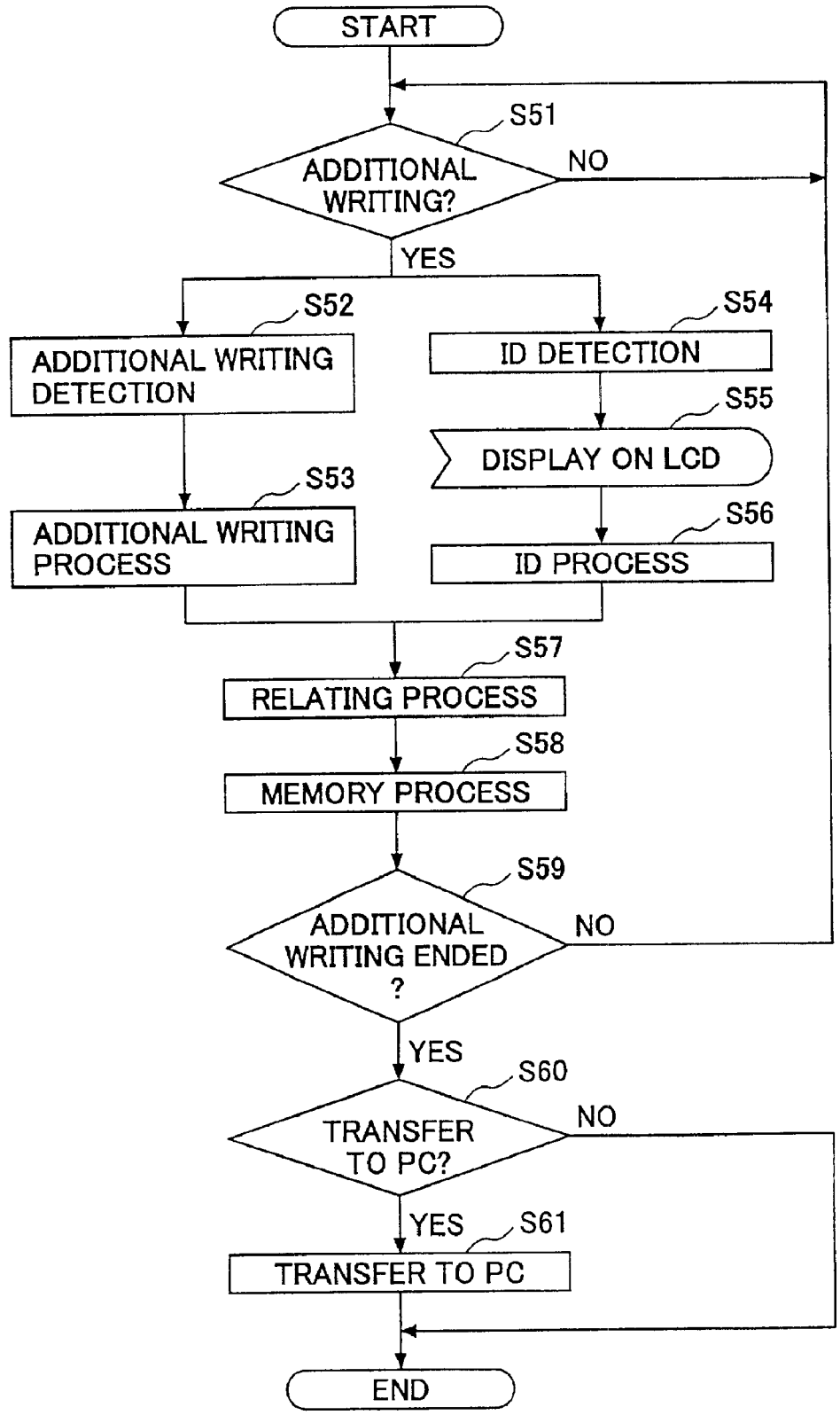
FIG. 22 is a flow chart for explaining a general process control of the third embodiment of the information processing apparatus.
Figure 23:
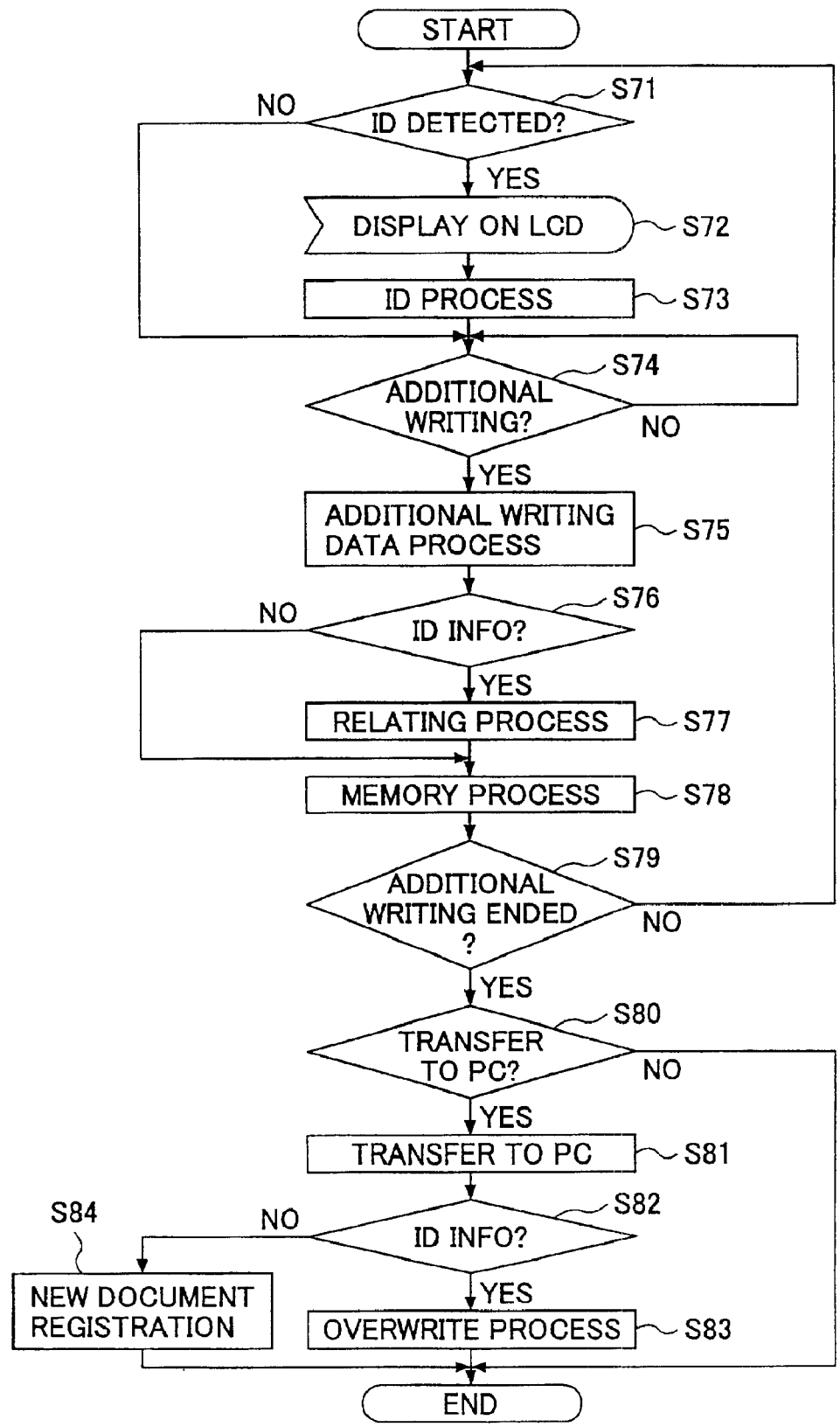
FIG. 23 is a flow chart for explaining a general process control of the third embodiment of the information processing apparatus for a case where blank plain paper is included.

Next, a description will be given of a third embodiment of the information processing apparatus according to the present invention, by referring to FIGS. 19A through 23. FIGS. 19A and 19B respectively are perspective views showing a structure of this third embodiment of the information processing apparatus. FIG. 20 is a cross sectional view taken along a line a-a in FIG. 19A. FIGS. 21A, 21B and 21C respectively are perspective views for explaining this third embodiment of the information processing apparatus in use. FIG. 22 is a flow chart for explaining a general process control of this third embodiment of the information processing apparatus. Further, FIG. 23 is a flow chart for explaining a general process control of this third embodiment of the information processing apparatus for a case where blank plain paper is included. In FIGS. 19A through 21C, those parts which are the same as those corresponding parts in FIGS. 5, 6, 8, 9A, 9B and 13A through 14D are designated by the same reference numerals, and a description thereof will be omitted.

In this third embodiment, an information processing system (paper system) 231 has a structure which is basically similar to that of the information processing system 201 of the first embodiment, but each of the plain papers 202 which is printed with the document information in advance has a one-dimensional code 206A recorded in a left peripheral portion 202L adjacent to the top peripheral portion 202u. In addition, a one-dimensional code reader 215A having a reading window 232 at a position corresponding to the one-dimensional code 206A is provided on the left side of the digitizer 203.

As shown in FIG. 20, this one-dimensional code reader 215A includes a LED 233 which forms a light source for emitting a near-infrared reading light, a lens 234, a lens 235, a CCD line sensor 236 which carries out a photoelectric read operation based on the reflected light from the one-dimensional code 206A, and a mirror 237 for reflecting the light from the LED 233 towards the one-dimensional code 206A on the plain paper 202 placed on the digitizer 203 and directing the reflected light from the one-dimensional code 206A towards the CCD line sensor 236, which form a scan type code reader. Of course, it is possible to use a laser scan type code reader for the one-dimensional code reader 215A, and if the identification information is recorded in the form of a two-dimensional code, a two-dimensional code reader 215 may be used in place of the one-dimensional code reader 215A.

In this third embodiment, the communication interface 210 and the LCD 214 are arranged on the upper end of the digitizer 203. Moreover, in addition to the functions of the information input means, the information storing means and the information output means described above, the digitizer 203 also has the functions of an additional writing detecting means, an identification information recognizing operation control means which will be described later, by carrying out various information processes by the CPU 211 according to appropriate programs. Otherwise, the basic structure of this third embodiment is the same as that of the first embodiment described above.

The additional writing detecting means utilizes the functions of the information input means, to detect a handwriting input operation with respect to the plain paper 202 on the digitizer 203. More particularly, the additional writing detecting means is realized by the functions of the digitizer 203 which detects the coordinate information by detecting contact with the electromagnetic pen 204. The identification information recognizing operation control means controls a start timing or the like of a recognizing operation of the one-dimensional code reader 215A which recognizes the one-dimensional code 206A, based on the detection of the handwriting input operation by the additional writing detecting means. In this embodiment, the "recognizing operation" of the one-dimensional code reader 215A refers to the operation of turning ON the LED 233 in order to recognize the one-dimensional code 206A, and not to the turning ON or OFF of the power supply of the one-dimensional code reader 215A.

This embodiment takes into account the fact that the timing and the manner in which the plain papers 202 are turned and the writing is made with respect to the plain papers 202 depend on the user, the situation and the document used. When the one-dimensional code reader 215A is operated instantaneously from the time when the plurality of information recording media printed with the document, that is, the plain papers 202, are set on the digitizer 203 and used, it is possible to detect and process the identification information and the writing coordinate information regardless of when and which plain paper 202 is turned.

In this embodiment, the one-dimensional code reader 215A does not constantly carry out the recognizing operation. Instead, the additional writing detecting means and the identification information recognizing operation control means are utilized, so as to make the one-dimensional code reader 215A carry out the recognizing operation to recognize the one-dimensional code 206A by turning ON the LED 233 only in a necessary situation. The "necessary situation" refers to a case where the writing is actually made on a desired plain paper 202. It is necessary to know the identification information of only the plain paper 202 on which the writing is actually made by a writing operation amounting to a minimum of one stroke, and the one-dimensional code reader 215A is made to carry out the recognizing operation instantaneously when the writing is detected. The "necessary situation" can thus be detected when the electromagnetic pen 204 writes on the plain paper 202, that is, the digitizer 203 for making the coordinate direction detects the contact of the electromagnetic pen 204 by the additional writing detecting means. Desirably, the one-dimensional code reader 215A is made to carry out the recognizing operation by the identification information recognizing operation control means immediately after the contact of the electromagnetic pen 204 is detected. Once the recognizing operation is started, the power consumption can be reduced thereafter by carrying out a control to repeat the recognizing operation for every predetermined time or, to stop the recognizing operation if the writing operation is not made for more than a predetermined time. Even in such cases, the one-dimensional code reader 215A again starts the recognizing operation immediately after the next writing operation is generated. Accordingly, "one writing operation" in this specification refers to a writing operation amounting to one stroke from a time when the writing is started by contacting the electromagnetic pen 204 on the plain paper 202 up to a time when the writing is ended by lifting the electromagnetic pen 204 from the plain paper 202.

Next, a description will be given of the usage of the information processing system 231 of this embodiment, by referring to FIGS. 21A through 21C and FIG. 22. First, as shown in FIG. 21A, by turning ON the LED 233 immediately after the additional writing on the first page of the plain paper 202 is started by the electromagnetic pen 204, the recognizing operation of the one-dimensional code reader 215A to recognize the one-dimensional code 206A is carried out once. One scan of the one-dimensional code 206A can be made in approximately 1/500 second, for example, and the recognition accuracy improves by increasing the number of scans. By carrying out such a recognizing operation by the scanning, it is possible to detect the identification information which indicates the document on the plain paper 202 on which the additional writing is presently being made. Thereafter, if the writing operation is continued, the writing information which indicates what is being written is detected by the information input means, and both the identification information and the writing information (additional writing information) are stored in the memory 209 through a relating process described above.

FIG. 21B shows a state where the stroke of the additional writing operation by the electromagnetic pen 204 is longer than a predetermined length. In this case, the LED 233 of the one-dimensional code reader 215A is turned OFF even during the additional writing operation, so as to stop the identification information recognizing operation. On the other hand, it is possible to control the one-dimensional code reader 215A to intermittently carry out the scan at 20-second-intervals for one minute, and to automatically stop and turn OFF the LED 233 after this one minute. Even in such a case, the identification information recognizing operation of the one-dimensional code reader 215A is resumed if the additional writing operation is detected again before the 20-second-interval elapses.

FIG. 21C shows a state where the additional writing operation with respect to the first page of the plain paper 202 is ended and the first page is turned over, so as to carry out the additional writing operation with respect to a next, second page of the plain paper 202. In this case, when the start of the additional writing operation with respect to the second page of the plain paper 202 is detected by the additional writing detecting means, the identification information recognizing operation control means operates similarly as described above. More particularly, the identification information recognizing operation control means turns ON the LED 233 to start the identification information recognizing operation of the one-dimensional code reader 215A, and the second page of the plain paper 202 is detected by recognizing the one-dimensional code 206A which presently appears via the reading window 232. Even after the second page of the plain paper 202 is ready to be written as shown in FIG. 21C, the user may pause and not immediately start the actual additional writing operation by the electromagnetic pens 204 with respect to the second page. In such a case where the user pauses, the additional writing detecting means will not detect the additional writing operation, and the information processing system 231 assumes a standby state, because the LED 233 of the one-dimensional code reader 215A will not be turned ON and the one-dimensional code reader 215A will not start the identification information recognizing operation.

FIG. 22 is a flow chart for explaining the general process control of this third embodiment of the information processing apparatus, from the time after the setting of the plain papers 202 on the main body board 208 to the transfer of the additional writing data to the personal computer 205.

In FIG. 22, a step S51 decides whether or not an additional writing is made, and the operation returns to the step S51 if the decision result in the step S51 is NO. On the other hand, if the decision result in the step S51 is YES, the operation advances simultaneously to steps S52 and S54. The step S52 detects the additional writing data, and a step S54 carries out an additional writing data process to detect and store the additional writing data amounting to one stroke, for example, in the memory 209, and the operation advances to a step S57. On the other hand, the step S54 detects the identification information from the plain paper 202 forming the page which is being viewed or written on by the user, and a step S55 displays the detected identification information on the LCD 214. A step S56 carries out an identification information process to store the detected identification information in the memory 209, and the process advances to the step S57.

The step S57 carries out a relating process to relate or link the additional writing data to the detected identification information. A step S58 carries out a memory process to store the identification information and the additional writing data related or linked to the identification information in the memory 209. A step S59 decides whether or not the additional writing operation is ended, and the operation returns to the step S51 if the decision result in the step S59 is NO.

If the decision result in the step S59 is YES, a step S60 decides whether or not the additional writing data and the corresponding identification information are to be transferred to the personal computer 205. The operation ends if the decision result in the step S60 is NO. If the decision result in the step S60 is YES, a step S61 transfers the additional writing data and the corresponding identification information to the personal computer 205, and the operation ends.

Of course, the control of the identification information recognizing operation as done in this third embodiment is also similarly applicable to the second embodiment described above.

In this third embodiment, the one-dimensional code reader 215A is arranged on the left side adjacent to the holding clip 212, and the one-dimensional code 206A is printed in the left peripheral portion 202L of the plain paper 202 adjacent to the top peripheral portion 202u which is held by the holding clip 212. For this reason, the bottom peripheral portion 202d and a right peripheral portion 202R of the plain paper 202 are continuously free in an L-shape, without being interfered by the one-dimensional code reader 215A or the like. Therefore, as may be seen from FIGS. 19A and 19B and FIGS. 21A through 21C, it is easy to turn over the plain paper 202 by the bottom peripheral portion 202d thereof, and it is also easy to make the additional writing operation with respect to the plain paper 202 by effectively utilizing of the L-shaped continuously free region of the plain paper 202.

In the description given heretofore, it is assumed for the sake of convenience that the various information is already printed on the plain paper 202, and that the additional writing is made with respect to such plain paper 202. However, the writing with respect to blank plain paper 202 can be carried out similarly to the additional writing with respect to the plain paper 202 which is already printed with various information. In this case, the blank plain paper 202 is not recorded with a one-dimensional code indicating the address information (identification information) indicating the storage location of the document because no document is printed on the blank plain paper 202. Hence, in the case of the blank plain paper 202, it is unnecessary to detect the identification information. Accordingly, when the plain paper 202 is set on the digitizer 203 and the writing operation is started, the one-dimensional code reader 215A carries out the recognizing operation to recognize the one-dimensional code 206A, and the relating process and the like are carried out when the identification information is recognized. In the case of the blank plain paper 202, however, the one-dimensional code reader 215A does not detect the one-dimensional code 206, and consequently, no identification information process is carried out to detect the identification information, and the coordinate information recognizing process and the like are carried out only with respect to the additional writing information. Thereafter, no relating process is carried out since there is no identification information, and the additional writing data is stored in the memory 209. When finally transferring the additional writing data to the personal computer 205, only the additional information stored in the memory 209 is automatically saved and registered as a new file (document file) by making the personal computer 205 recognize the additional writing data as a new document. Hence, a new document registration can be made with respect to the personal computer 205 when creating a new document on the blank plain paper 202.

FIG. 23 is a flow chart for explaining the general process control of this third embodiment of the information processing apparatus for a case where blank plain paper is included. In FIG. 23, a step S71 decides whether or not the identification information is detected from the plain paper 202 forming the page which is being viewed or used by the user. If the decision result in the step S71 is YES, a step S72 displays the detected identification information on the LCD 214. A step S73 carries out an identification information process to store the detected identification information in the memory 209. After the step S73 or if the decision result in the step S71 is NO, a step S74 decides whether or not the additional writing is made by the electromagnetic pen 204 on the page which is being viewed or used by the user. The operation returns to the step S74 if the decision result in the step S74 is NO. On the other hand, if the decision result in the step S74 is YES, a step S75 carries out an additional writing data process to detect and store the additional writing data in the memory 209.

A step S76 decides whether or not the identification information exists. If the decision result in the step S6 is YES, a step S77 carries out a relating process to relate or link the additional writing data to the detected identification information. After the step S77 or if the decision result in the step S76 is NO, a step S78 carries out a memory process to store the identification information and the additional writing data related or linked to the identification information in the memory 209. Of course, if no identification information exists, the step S78 simply stores the additional writing data in the memory 209.

A step S79 decides whether or not the additional writing is ended, and the operation returns to the step S71 if the decision result in the step S79 is NO. If the decision result in the step S79 is YES, a step S80 decides whether or not the additional writing data, and the corresponding identification information if any, are to be transferred to the personal computer 205. The operation ends if the decision result in the step S80 is NO. If the decision result in the step S80 is YES, a step S81 transfers the additional writing data, and the corresponding identification information if any, to the personal computer 205. A step S82 decides whether or not the personal computer 205 to which the information processing system 231 is connected for the data transfer stores a document with a document identification information matching the identification information transferred from the information processing system 231. If the decision result in the step S82 is YES, a step S83 carries out an overwrite process to overwrite the additional writing data on the original document having the matching identification information within the personal computer 205, and the operation ends. On the other hand, if the decision result in the step S82 is NO, a step S84 registers the additional writing data from the information processing system 231 as a new document file in the personal computer 205, and the operation ends.

Of course, the present invention is not limited to the first through third embodiments described above and various modifications are possible. For example, the information recording medium (or information display medium) is not limited to the digital paper 222 which displays the image by color thermochromic, and any suitable medium may be used as long as the medium can rewritably display the images repeatedly, can maintain the displayed image without consuming power, and can be shaped in a form similar to paper. Display materials for use in such media include thermochromic, electrochromic, polymer liquid crystal, ferroelectric liquid crystal, bistable pneumatic liquid crystal, phase transition type liquid crystal, liquid crystal photoconductive light bulb, magnetophilic display element, and electrophilic display element. Such display materials are known, and a detailed description thereof will be omitted. When using such display materials to form the digital paper 222, the digitizer 203 and the electromagnetic/heating pen 227 (additional writing means) are of course fabricated in forms corresponding to the image displayable on the digital paper 222.

In the first through third embodiments, the identification information in the form of the two-dimensional code, one-dimensional code or the like is recorded in a portion in the vicinity of the bottom peripheral portion 202$d$ of the plain paper 202 or in a portion in the vicinity of the bottom peripheral portion 222$d$ of the digital paper 222. However, it is possible to record the identification information in any portion of the plain paper 202 or digital paper 222 other than the top peripheral portion 202$u$ or 222$u$ which is held by the holding clip 212. Hence, the identification information may be recorded in a side peripheral portion of the plain paper 202 or digital paper 222, for example. In addition, the two-dimensional code reader 215, the one-dimensional code reader 215A or the like which function as the identification information recognizing means may be arranged at an appropriate position depending on the position on the plain paper 202 or digital paper 222 where the identification information is recorded. Further, the identification information recognizing means may be arranged freely movable so as to allow position adjustment to suit the recorded position of the identification information on the information recording medium used. Moreover, the identification information itself may be made in the form of a watermark on the plain paper 202 or digital paper 222.

Figure 24A:
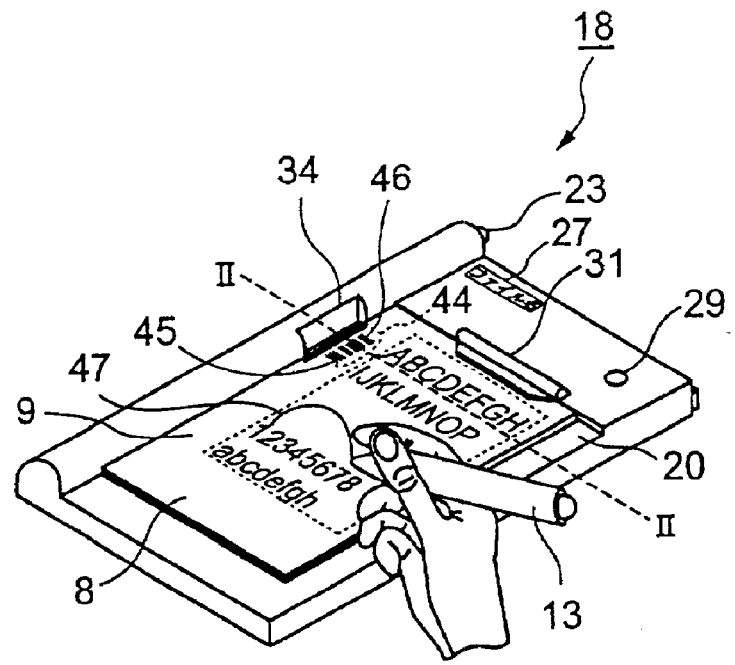
FIGS. 24A, 24B and 24C respectively are a perspective view, a cross sectional view and a perspective view showing a structure of a fourth embodiment of the information processing apparatus according to the present invention.
Figure 24B:
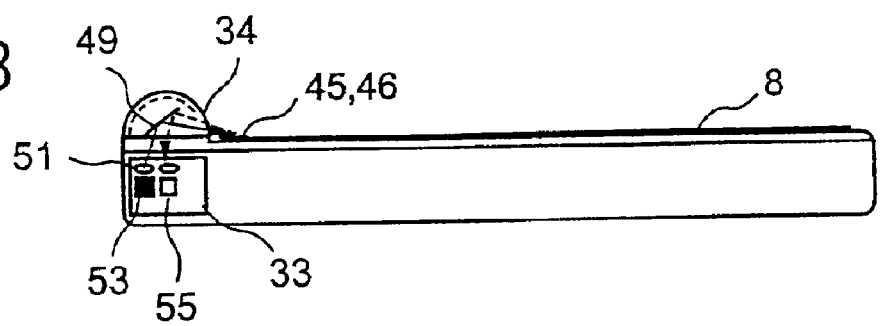
Figure 24C:
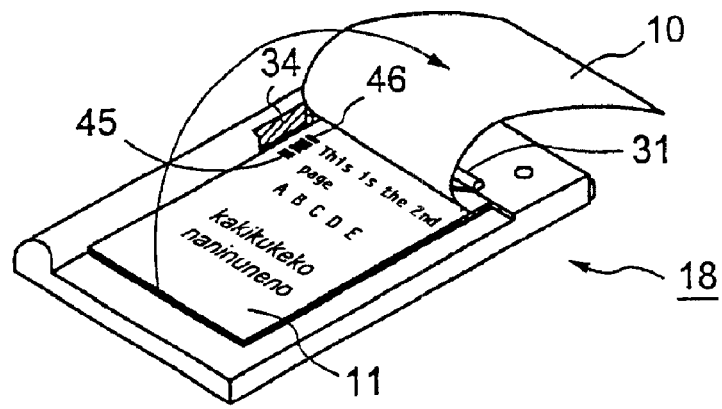

Next, a description will be given of a fourth embodiment of the information processing apparatus according to the present invention, by referring to FIGS. 24A through 24C. FIGS. 24A, 24B and 24C respectively are a perspective view, a cross sectional view and a perspective view showing a structure of a fourth embodiment of the information processing apparatus according to the present invention. FIG. 24A shows a perspective view of the entire structure, FIG. 24B shows a cross sectional view cut along a broken line II—II in FIG. 24A, and FIG. 24C shows a perspective view of the information processing apparatus in a used state.

As shown in FIGS. 24A through 24C, an information processing apparatus 18 includes a handwriting input section (electromagnetic induction type digitizer) 20, a communication interface (communication I/F) 23, a liquid crystal display (LCD) 27 for displaying a "file name" and the like, a reset button 29, a clip 31, and a code reader window 34.

As shown in FIG. 24B, a bar code reader 33 is built into the information processing apparatus 18 shown in FIG. 24A. In a case where the bar code reader 33 is designed to read a one-dimensional code, the bar code reader 33 is formed by a laser scanning type line sensor or, a scan type line sensor which irradiates light from an near infrared light emitting diode (LED) 33 on both a personal identification number code 45 and an identification code 46 via a lens 51 and a mirror 49 and detects the light received via the code reader window 34 and the mirror 49 by a line CCD 55. On the other hand, in a case where the bar code reader 33 is designed to read a two-dimensional code, the bar code reader 33 is formed by an area sensor made up of CCD, CMOS and the like.

In addition, FIG. 24C shows a state where a plurality of sheets of paper 8 are placed on the handwriting input section 20 and held by the clip 31, and a first page 10 is turned over.

Figure 25:
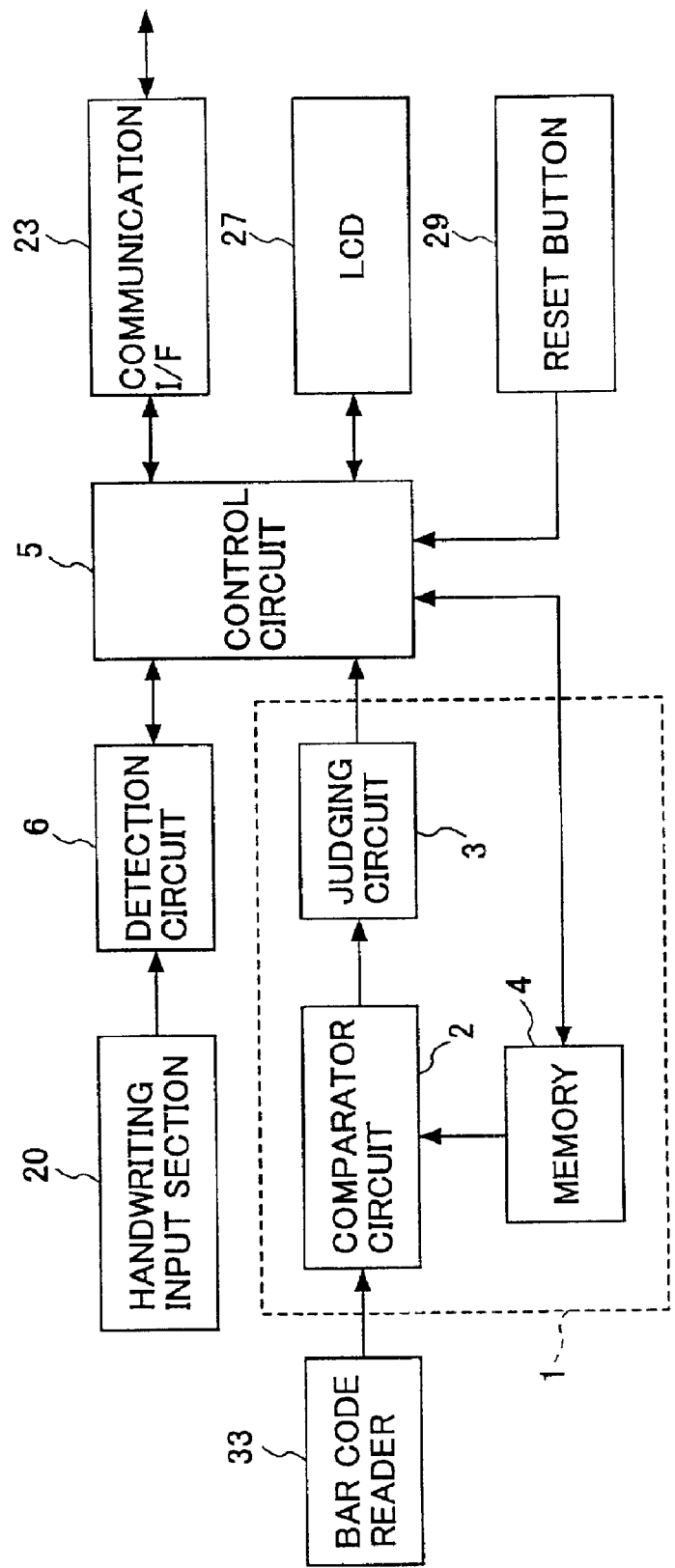
FIG. 25 is a system block diagram showing a hardware structure of the fourth embodiment of the information processing apparatus.

FIG. 25 is a system block diagram showing a hardware structure of the information processing apparatus shown in FIGS. 24A through 24C. As shown in FIG. 25, the information processing apparatus 18 of this embodiment includes the bar code reader 33, an information processor 1, a control circuit 5, the handwriting input section 20, a detection circuit 6, the communication interface 23, the LCD 27 and the reset button 29. The information processor 1 includes a comparator circuit 2, a judging circuit 3 and a memory 4.

The comparator circuit 2 is connected to the memory 4 and the bar code reader 33, and the judging circuit 3 is connected to the comparator circuit 2. In addition, the detection circuit 6 is connected to the handwriting input section 20. The control circuit 5 is connected to the judging circuit 3, the memory 4, the detection circuit 6, the communication interface 23, the LCD 27 and the reset button 29.

In the information processing apparatus 18 having the structure described above, the paper 8 is placed on the handwriting input section 20 as shown in FIG. 24A. And when characters, lines and the like are written on the paper 8 by an electromagnetic pen 13, additional writing information 47 generated by the writing is detected by the detection circuit 6 of the electromagnetic induction type digitizer to generate corresponding additional writing data. The additional writing data are stored in the memory 4 by the control circuit 5. The electromagnetic pen 13 which is used for the writing is provided with writing ink, but is also an active pen which radiates an electromagnetic field during the writing. When the writing is made on the paper 8 by the electromagnetic pen 13, coordinates of writing positions are detected by the detection circuit 6. In this particular system, it is possible to detect the electromagnetic field radiated from the electromagnetic pen 13 by the detection circuit 6 up to a thickness of the paper 8 on the order of approximately 5 mm. For this reason, the writing can be made in a state where a number of sheets of paper 8 are stacked on the handwriting input section 20.

For example, the memory 4 is formed by a large-capacity flash memory or a hard disk, and stores in a rewritable state the identification information of the document read by the bar code reader 33 and the additional writing data. The memory 4 may be connected to an external personal computer, so that a personal identification number which will be described later is transferred from the external personal computer to the memory 4 and stored in the memory 4. Furthermore, it is possible to store in the memory 4 the personal identification number which is input from an input interface such as a ten-key.

On the other hand, the communication interface 23 is made of a RS232C port, an Ethernet port, a PCMCIA card port or the like. A wireless communication interface is an optimum choice for the communication interface 23, and in this case, it is possible to use IrDA using infrared ray, Bluetooth using radio wave or the like.

Moreover, as shown in FIG. 24A, the paper 8 is printed with characters and the like corresponding to certain document data stored in a certain personal computer. The paper 8 is further printed with the identification code 46 and the personal identification number code 45, in bar code, for example, within a bar code part 44 of a peripheral portion 9.

The identification code 46 indicates identification information indicating the document data to which the characters and the like belong, and the personal identification number code 45 is used to prohibit processing of the document by a person other than the user, for example.

For example, the identification code 46 indicates a document name, a page number, a name of the personal computer (PC), an IP address of the personal computer (PC), and the like. By employing a directory structure such as "¥¥(PC name (or IP address of PC))¥(drive name)¥(folder name)¥(document name)¥page", the identification code 46 can indicate identification information (ID information) which uniquely determines a location where the document data (minimum unit of one page) are stored.

In a case where the above identification information cannot be encoded directly into the identification code 46, it is possible to encode a certain numerical value and to prepare a table which indicates a correspondence of the identification information and the identification code 46. In such a case, it is possible to make a reference to the table by executing an operation program.

On the other hand, in a case where the above identification information can be encoded directly into the identification code 46, it is possible to employ a two-dimensional code such as the QR code and the data matrix code. In this case, a large data capacity can be obtained, and both the identification information and the personal identification number may be input by a single code. In addition, an area sensor is used for the bar code reader 33.

Figure 27:
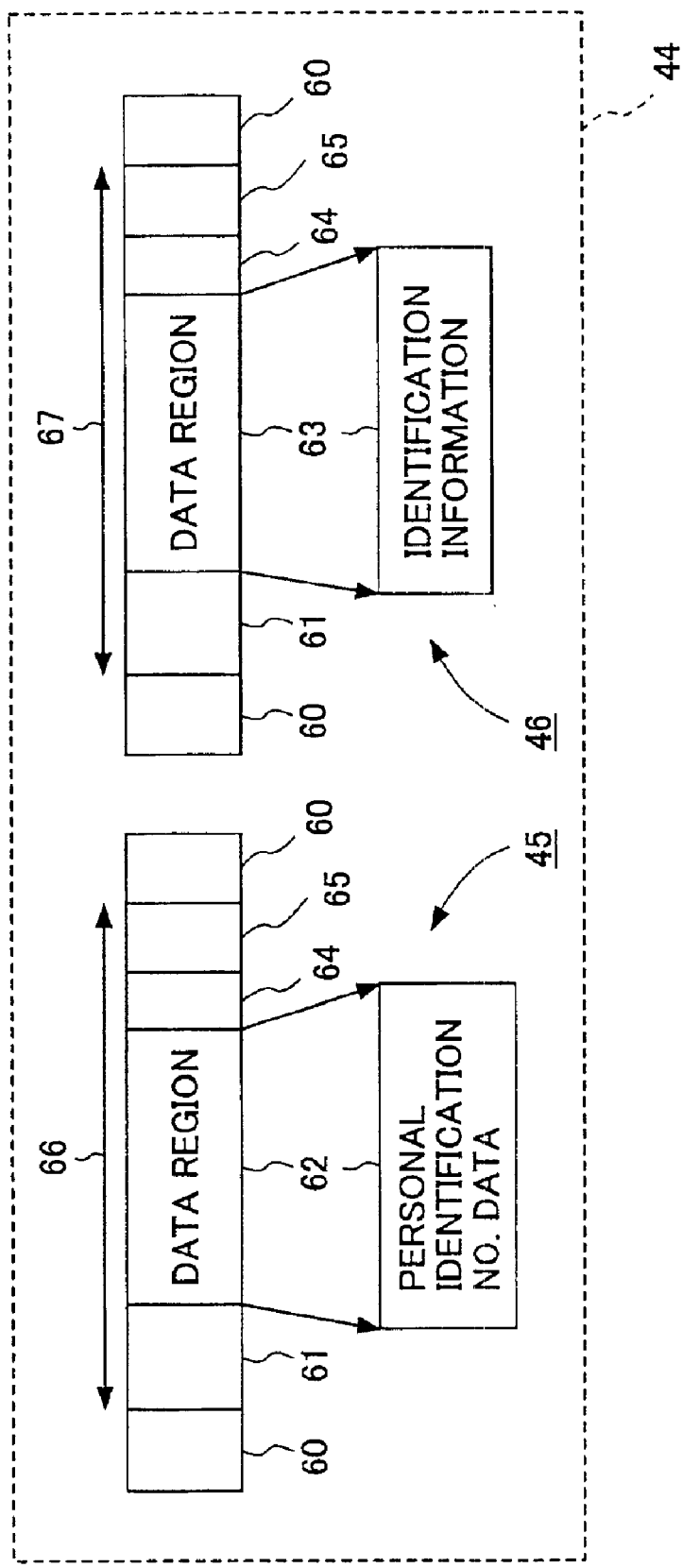
FIG. 27 is a diagram showing a structure of a bar code part shown in FIG. 24A.

As shown in FIG. 27, the personal identification number code 45 is arranged next to the identification code 46, and has a data structure similar to that of the identification code 46. In other words, the personal identification number code 45 is made up of a bar code symbol part 66 and margins 60. The identification code 46 is made up of a bar code symbol part 67 and margins 60. The bar code symbol part 66 includes a data region 62, a start character 61, a stop character 65, and a check digit 64. The bar code symbol part 67 includes a data region 63, a start character 61, a stop character 65, and a check digit 64. The personal identification number data is stored in the data region 62 of the personal identification number code 45, and the identification information is stored in the data region 63 of the identification code 46. The start character 61 and the stop character 65 are codes respectively indicating the start and the end of the corresponding bar code symbol part 66 or 67. The check digit 64 is a code for correcting an error in the data stored in the corresponding data region 62 or 63.

The recording medium which becomes the writing target is not limited to the paper 8. For example, a rewritable medium having a rewritable image display surface may be used in place of the paper 8, but such a rewritable medium will be described later.

When the paper 8 is used as the recording medium, a write head employing the electrophotography system or the ink-jet system is used to print the characters on the paper 8, and the written characters, the identification information and the personal identification number can be printed on the paper 8 by a single head. In addition, when using a thermal type rewritable medium which will be described later as the recording medium, the written characters and the like are printed by a printer employing the thermal head system.

Because the information processing apparatus 18 is carried and used in many cases, it is preferable to use a rechargeable secondary battery which is accommodated within the information processing apparatus 18 as a power supply for the main body thereof.

Figure 26:
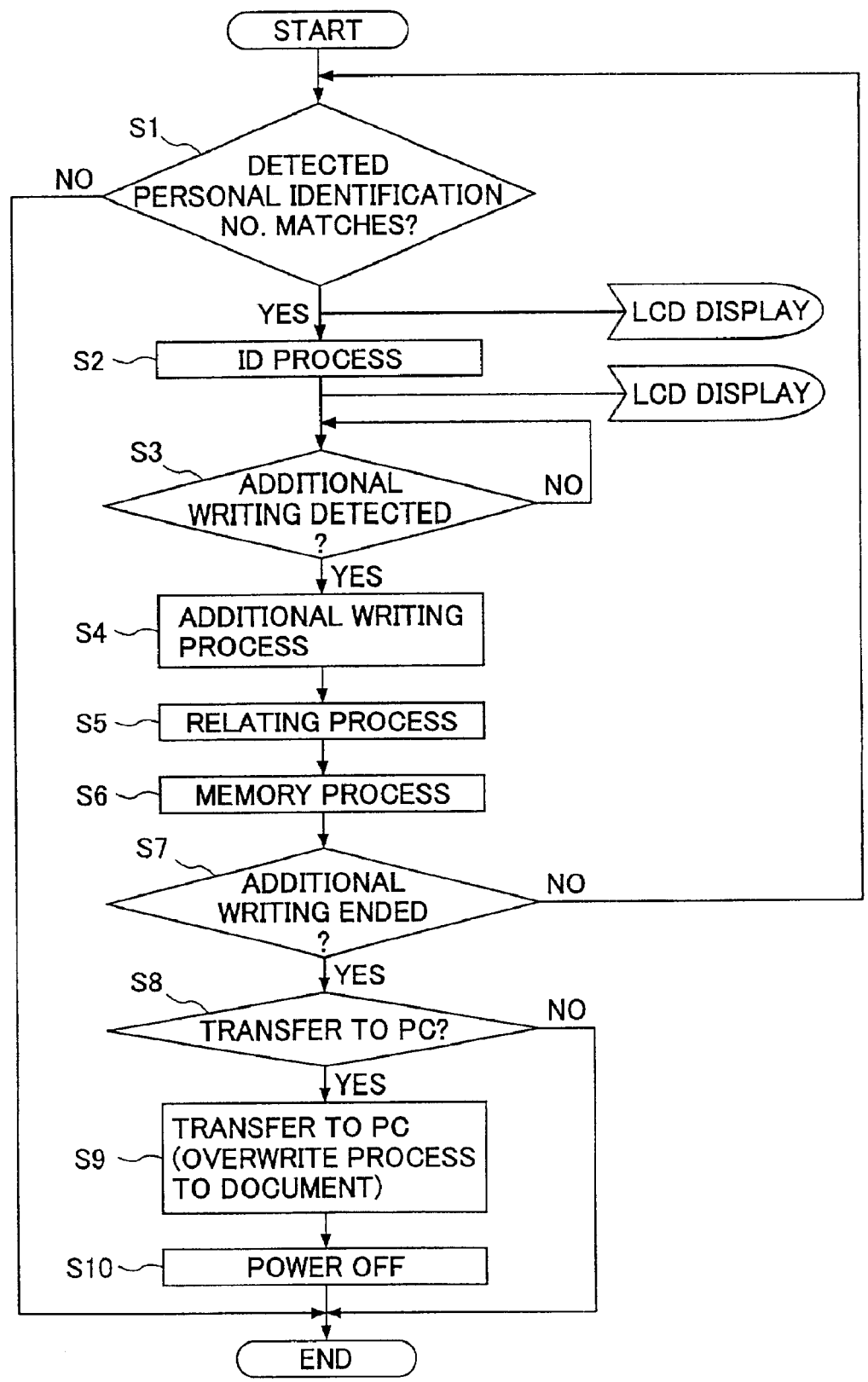
FIG. 26 is a flow chart for explaining an operation of the fourth embodiment of the information processing apparatus.

Next, a description will be given of the operation of the information processing apparatus 18 of this fourth embodiment having the structure described above, by referring to a flow chart shown in FIG. 26. First, in a state where the power supply is turned ON and the user wishes to print a document created by the user on the paper 8, the user sets a personal identification number and prints this personal identification number in the bar code part 44 together with the identification information. This printing of the personal identification number can be realized by building into a commercially available word processing software a bar code creating software in the form of a module.

As shown in FIG. 24A, when an additional writing is made by the electromagnetic pen 13 on the paper 8 which is held by the clip 31, the handwriting input section 20 senses the approaching electromagnetic pen 13 by electromagnetic induction, and the bar code reader 33 is driven. The bar code reader 33 measures a change in reflected light intensity from the bar code part 44, so as to read the personal identification number code 45 and the identification code 46. In this state, a step S1 decides, by the judging circuit 3, whether or not the personal identification number detected by the bar code reader 33 and the personal identification number prestored in the memory 4 compared by the comparator circuit 2 match. The operation ends if the decision result in the step S1 is NO. On the other hand, if the decision result in the step S1 is YES, a display such as "additional writing enabled" is displayed on the LCD part 27, for example, and the operation advances to a step S2. For example, the LCD part 27 may use blue and red light emitting diodes (LEDs) to indicate a state where the additional writing is possible by turning ON the blue LED and to indicate a state where the additional writing is not possible by turning ON the red LED.

The step S2 carries out an ID process to store, by the control circuit 5, the identification information detected by the bar code reader 33 into the memory 4.

Based on the identification information, that is, the identification code 46 which is printed on the first page of the paper 8 and is detected by the bar code reader 33, information for specifying the document, such as the document name and the number of pages to the additionally written, is displayed on the LCD part 27 and the operation advances to a step S3, to thereby activate the detection circuit 6 by the control circuit 5 and to decide whether an additional writing is detected. By making such a display, the user can quickly recognize the document and the page without having to read the document which is the target of the additional writing.

Accordingly, when additional writing position coordinates specified by the electromagnetic pen 13 are detected by electromagnetic induction, the operation advances to a step S4, and the control circuit 5 processes data indicating the coordinates as additional writing data. Further, in a step S5, the control circuit 5 carries out a relating process to link the identification information obtained in the step S2 and the additional writing data, and a step S6 carries out a memory process to overwrite and store the additional writing data at a storage location within the memory 4 specified by the identification information.

Next, in a step S7, the control circuit 6 decides whether or not the additional writing by the user has ended, and the operation returns to the step S1 if the decision result is NO. On the other hand, if the decision result in the step S7 is YES, the operation advances to a step S8 which decides whether or not to transfer the additional writing data to a personal computer (not shown) which is externally connected with respect to the memory 4. For example, in a case where the data with respect to the document before the additional writing is made are stored in the personal computer, the control circuit 5 judges that the additional writing data are to be transferred to the personal computer when the user instructs the additional writing data to be overwritten and stored at the original storage location, and in this case, a step S9 transfers the additional writing data to the personal computer via the communication interface 23. On the other hand, the operation ends if the control circuit 5 judges in the step S8 that there is no need to transfer the additional writing data to the personal computer.

When the user turns the power supply OFF in a step S10, the operation ends. During the above described operation, when it no longer becomes necessary for the user to make the additional writing, the user may push the reset button 29 to return the operation to the step S1.

Therefore, the additional writing information is detected by the detection circuit 6 only when the additional writing is made with respect to the document which is written with a personal identification number matching the preset personal identification number. As a result, it is possible to give the right to edit the document to only specific people by notifying the personal identification number to the specific people. Hence, this features is effective particularly when applied to conference materials used in conferences, for example, where only specific people are permitted to make additional writing, corrections, notes and the like with respect to the materials. In such a case, it is possible to prestore in the memory 4, as the personal identification number, an employee number or the like which can specify the people attending the conference.

Figure 28:
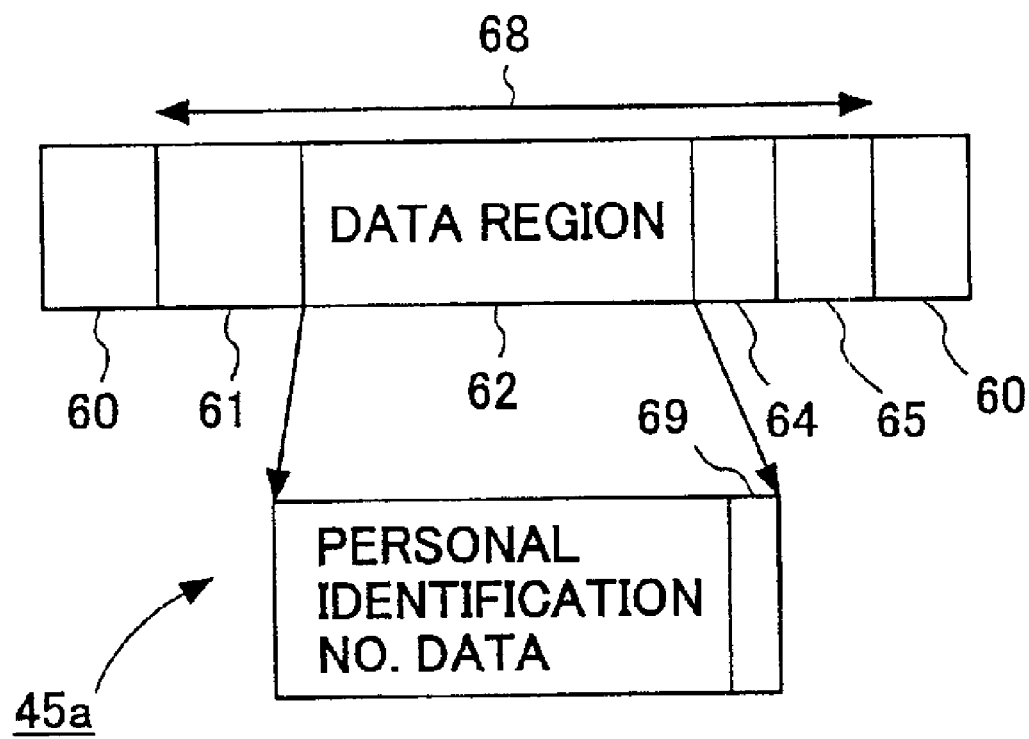
FIG. 28 is a diagram showing another structure of a personal identification number code shown in FIG. 27.

The personal identification number code may have a structure shown in FIG. 28. A personal identification number code 45a shown in FIG. 28 has a data region 62 including rewrite enable/disable information 69 in addition to the personal identification number data. In other words, a lower 1 bit of the data region 62 may be allocated to the rewrite enable/disable information 69, to indicate rewrite enable by "1" and rewrite disable by "0". Hence, when the control circuit 5 activates the detection circuit 6 only when the rewrite enable/disable information 69 is "1" so as to generate the additional writing data with respect to the document, it is possible to further improve the security of the document editing.

Figure 29A:
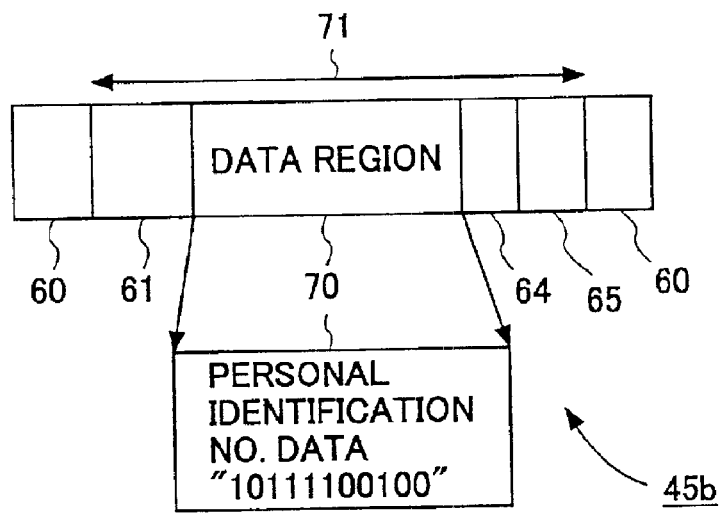
FIGS. 29A and 29B respectively are diagrams showing still other structures of the personal identification number code shown in FIG. 27.
Figure 29B:
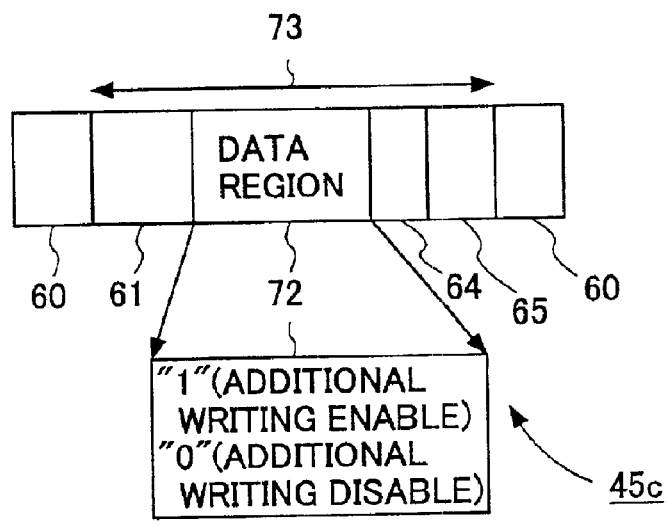

FIG. 29B shows still another structure of the personal identification number code. A personal identification number code 45c shown in FIG. 29B has a data region 72 including a binary data which simply indicates whether the additional writing is enabled or disabled. The binary data indicates additional writing enable by "1" and indicates additional writing disable by "0". In this case, the control circuit 5 activates the detection circuit 6 only when the bar code reader 33 detects the binary data which is "1". Accordingly, by using this personal identification number code 45c, it is possible to easily enable the additional writing with respect to an arbitrary information processing apparatus 18, regardless of the personal identification number prestored in the memory 4, and is effective when used in a situation where the conference is-held by arbitrary participants, for example.

In addition, FIG. 29A shows still another structure of the personal identification number code. A personal identification number code 45b shown in FIG. 29A has a data region 70 including a coded 11-bit personal identification number data. Compared to the personal identification number code 45b shown in FIG. 29A, however, the data scale can be made smaller in the case of the personal identification number code 45c shown in FIG. 29B.

Figure 30A:
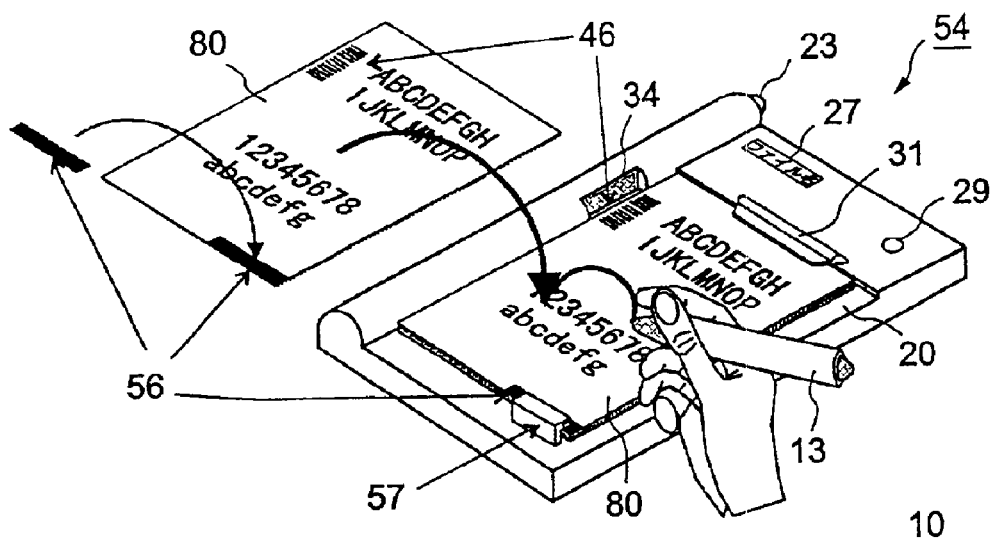
FIGS. 30A and 30B respectively are diagrams showing a fifth embodiment of the information processing apparatus according to the present invention.
Figure 30B:
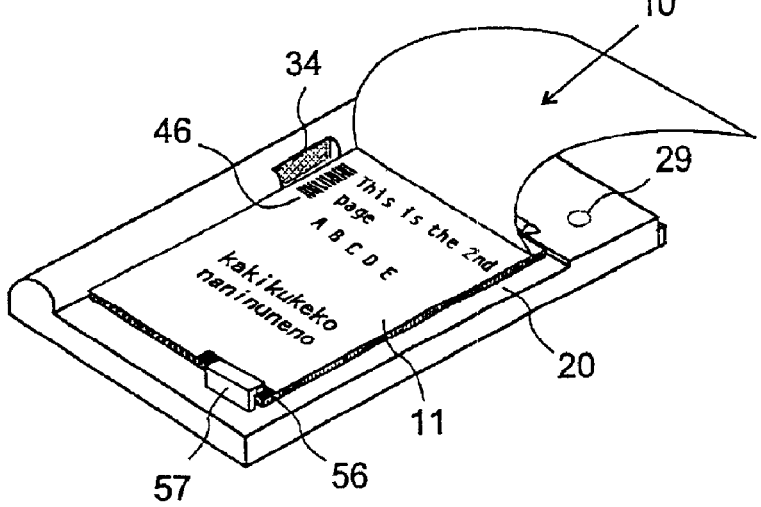

Next, a description will be given of a fifth embodiment of the information processing apparatus according to the present invention, by referring to FIGS. 30A and 30B. FIGS. 30A and 30B respectively are perspective views showing the fifth embodiment of the information processing apparatus according to the present invention. As shown in FIGS. 30A and 30B, an information processing apparatus 54 of this embodiment has a structure similar to that of the information processing apparatus 18 shown in FIGS. 24A through 24C, except that a magnetic code tape 56 recorded with the personal identification number information in the form of a magnetic code is provided at a lower part of a paper 80, and that the personal identification number information is read by a magnetic code detector 57 which is provided with a magnetic head. FIG. 30B corresponds to FIG. 24C, and shows a state where a first page 10 of a plurality of sheets of paper 80 stacked on the handwriting input section 20 is turned over.

In the information processing apparatus 54 of this embodiment, the identification information is detected by the bar code reader 33, and the personal identification number information is detected by the magnetic code detector 57. The magnetic code tape 56 is adhered at a predetermined position of the paper 80 which is used as the medium which is the target of the additional writing, when fabricating the paper 80. For example, the magnetic code tape 56 forms a writing-information processing system (hereinafter also simply referred to as an "information processing system") together with the information processing apparatus 54. The magnetic code tape 56 can be adhered to the predetermined position of the paper 80 by using a printer which will be described later and is provided with a magnetic tape adhering unit.

FIG. 31 is a system block diagram showing a hardware structure of the information processing apparatus 54 of this embodiment shown in FIGS. 30A and 30B. As shown in FIG. 31, the information processing apparatus 54 has a circuit structure similar to that of the information processing apparatus 18 shown in FIG. 25, but the magnetic code detector 57 is connected to the comparator circuit 2, and the bar code reader 33 is connected directly to a control circuit 77.

The information processing apparatus 54 of this embodiment having the above described structure operates similarly to the information processing apparatus 18 of the fourth embodiment, but the comparator circuit 2 compares the personal identification number information which is detected from the magnetic code tape 56 by the magnetic code detector 57 and the personal identification number prestored in the memory 4. When the judging circuit 3 judges that the two compared personal identification number information match, the control circuit 77 activates the detection circuit 6. In addition, the identification information which is read by the bar code reader 33 is supplied directly to the control circuit 77.

Figure 32:
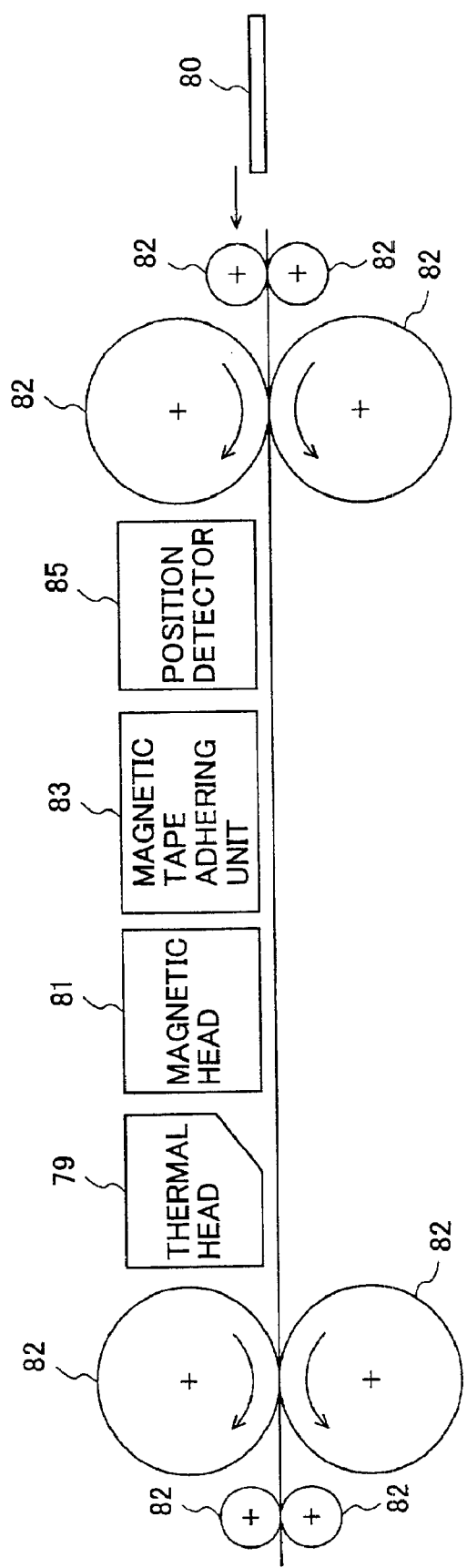
FIG. 32 is a diagram showing a structure of a printer included in the fifth embodiment of the information processing apparatus.

FIG. 32 is a diagram showing a structure of a printer which is included in the information processing system of this fifth embodiment according to the present invention. As shown in FIG. 32, the printer includes transport rollers 82 for transporting the paper 80, a thermal head 79, a magnetic head 81, a magnetic tape adhering unit 83, and a position detector 85. By employing such a structure, the printer detects the position of the paper 80 which is transported by the transport rollers 82 by the position detector 85, and obtains reference data for determining the position at an arbitrary time.

When the paper 80 is further transported, the magnetic code tape 56 is adhered onto the paper 80 by the magnetic tape adhering unit 83, and the magnetic head 81 records the personal identification number information on a magnetic layer of the magnetic code tape 56. It is possible to erase the recorded personal identification number information by heating the magnetic layer of the magnetic code tape 56 to a predetermined temperature or greater by the thermal head 79, and in this case, it is possible to re-record the personal identification number information.

Of course, the magnetic code tape 56 which is adhered onto the paper 80 may be prerecorded with the personal identification number information by a magnetic head.

According to the information processing system of this fifth embodiment, it is possible to obtain effects similar to those obtainable by the fourth embodiment described above, by using the paper 80 which is magnetically recorded with the personal identification number information. Furthermore, it is possible to easily reuse the paper 80, because the personal identification number information recorded on the paper 80 can easily by rewritten.

In the fourth and fifth embodiments described above, the papers 8 and 80 are kinds of information recording media used as targets of the writing. However, other information recording media may be used, such as an information recording medium which includes a thermally reversible recording layer. A description will be given of a sixth embodiment which uses such an information recording medium.

Figure 33:
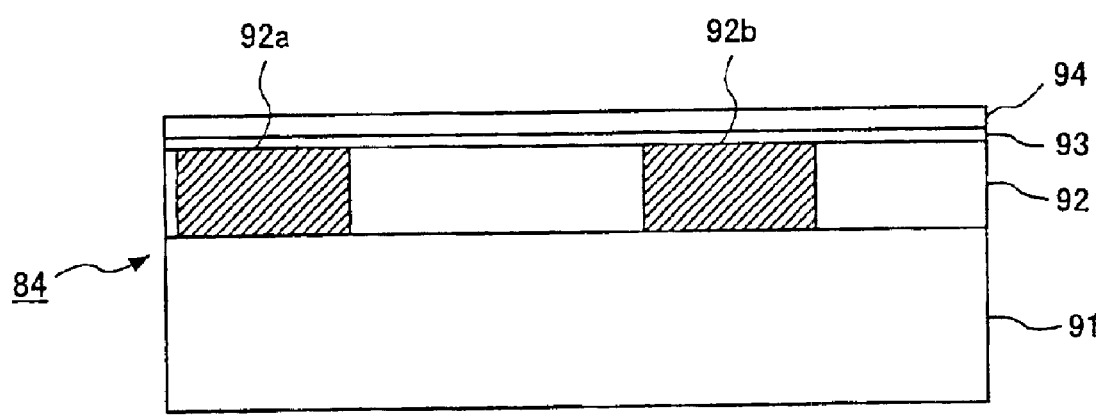
FIG. 33 is a diagram showing a structure of an information recording medium of a sixth embodiment of the information processing apparatus according to the present invention.

Next, a description will be given of the sixth embodiment of the information processing apparatus according to the present invention, by referring to FIG. 33. FIG. 33 is a diagram showing a structure of an information recording medium of the sixth embodiment of the information processing apparatus according to the present invention. As shown in FIG. 33, an information recording medium 84 of this sixth embodiment according to the present invention has a thermally reversible recording layer 92 formed on a support body (base film) 91, and further has an intermediate layer 93 and a protection layer 94 which are successively formed on the thermally reversible recording layer 92. The personal identification number information and the identification information are printed in a printing portion 92a of the thermally reversible recording layer 92, and document information is printed in a printing portion 92b of the thermally reversible recording layer 92. As will be described later in more detail, information can be written to and erased from the thermally reversible recording layer 92, repeatedly.

Figure 34:
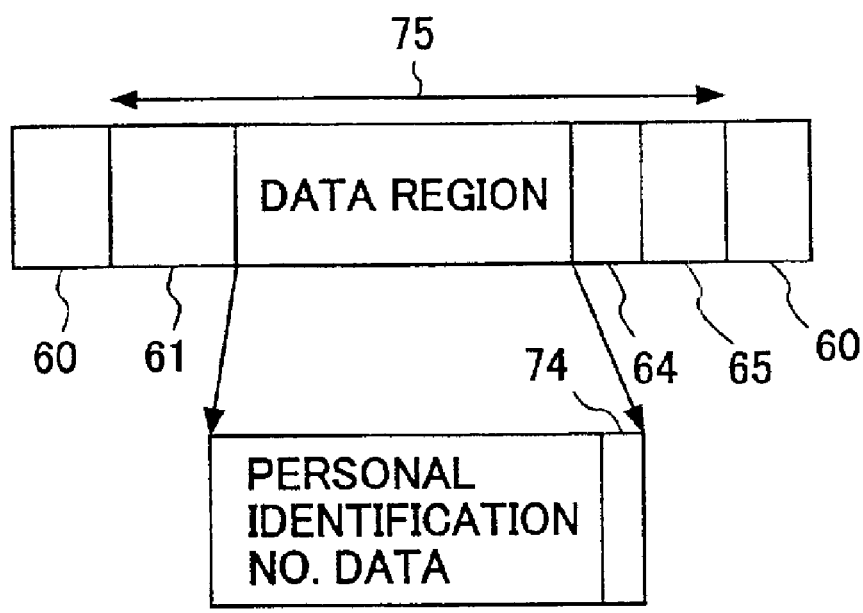
FIG. 34 is a diagram showing a structure of the personal identification number code used in the sixth embodiment of the information processing apparatus.

FIG. 34 is a diagram showing a structure of a personal identification number code of this sixth embodiment according to the present invention. As shown in FIG. 34, the personal identification number code of this sixth embodiment has a data structure similar to those of the personal identification number codes 45, 45a and 45b of the embodiments described above, but includes a 1-bit print enable/disable information 74, together with the personal identification number data, in a data region which is included in a bar code symbol part 75. For example, the print enable/disable information 74 is "1" when a reprinting is possible with respect to the document, and is "0" when the reprinting is not possible with respect to the document. The print enable/disable information 74 may be recorded using the bar code or the magnetic recording layer of the embodiments described above.

Figure 35:
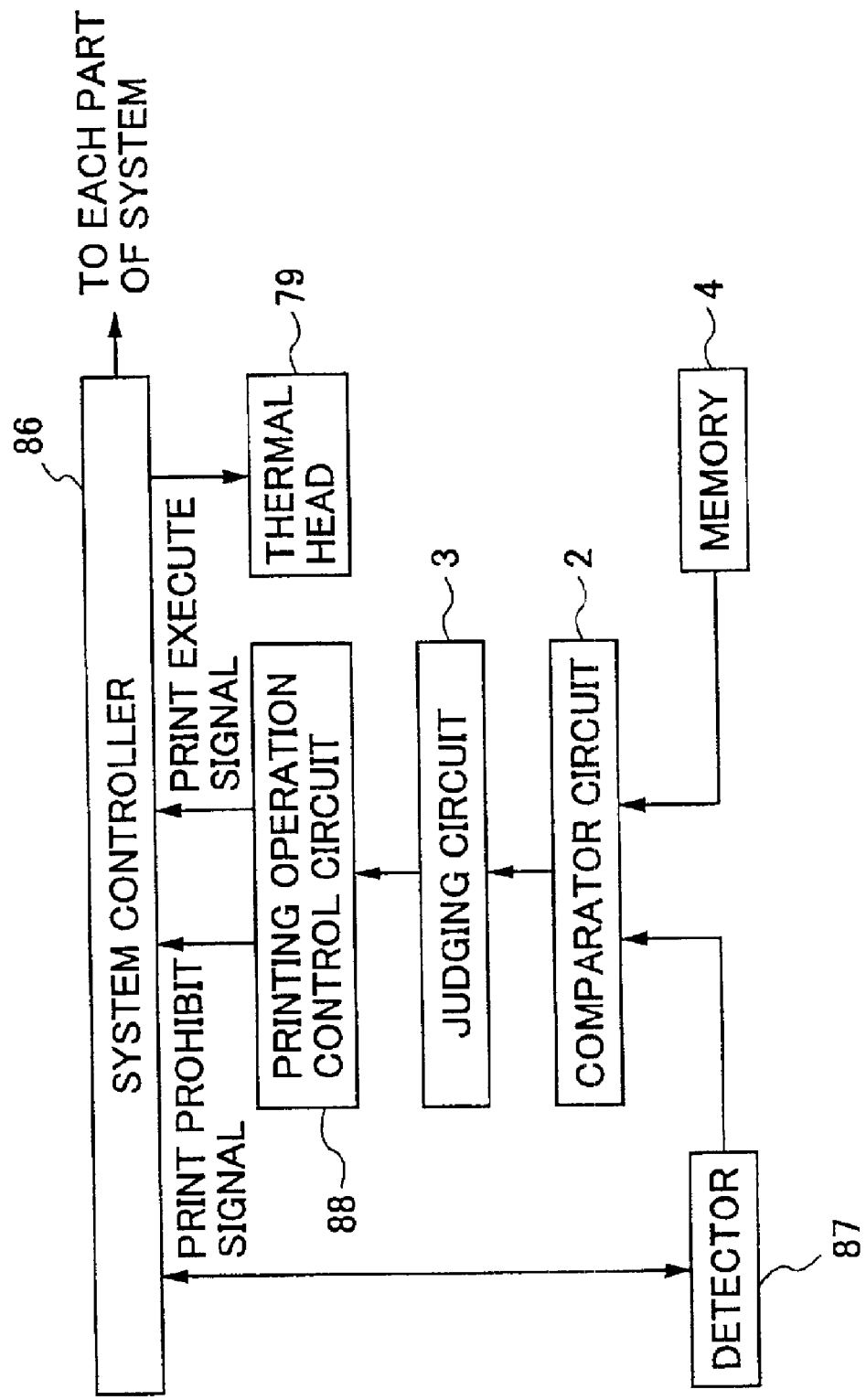
FIG. 35 is a system block diagram showing a hardware structure of the sixth embodiment of the information processing apparatus.

FIG. 35 is a system block diagram showing a hardware structure the information processing system of this sixth embodiment according to the present invention. As shown in FIG. 35, the information processing system of this sixth embodiment includes a detector 87, a memory 4, a comparator circuit 2, a judging circuit 3, a printing operation control circuit 88, a system controller 86, and a thermal head 79. The comparator circuit 2 is connected to the detector 87 and the memory 4, and the judging circuit 3 is connected to the comparator circuit 2. In addition, the printing operation control circuit 88 is connected to the judging circuit 3, and the system controller 86 is connected to the detector 87 and the printing operation control circuit 88. Furthermore, the thermal head 79 is connected to the system controller 86. The system controller 86 is connected to each part forming the information processing system of this embodiment.

Figure 37B:
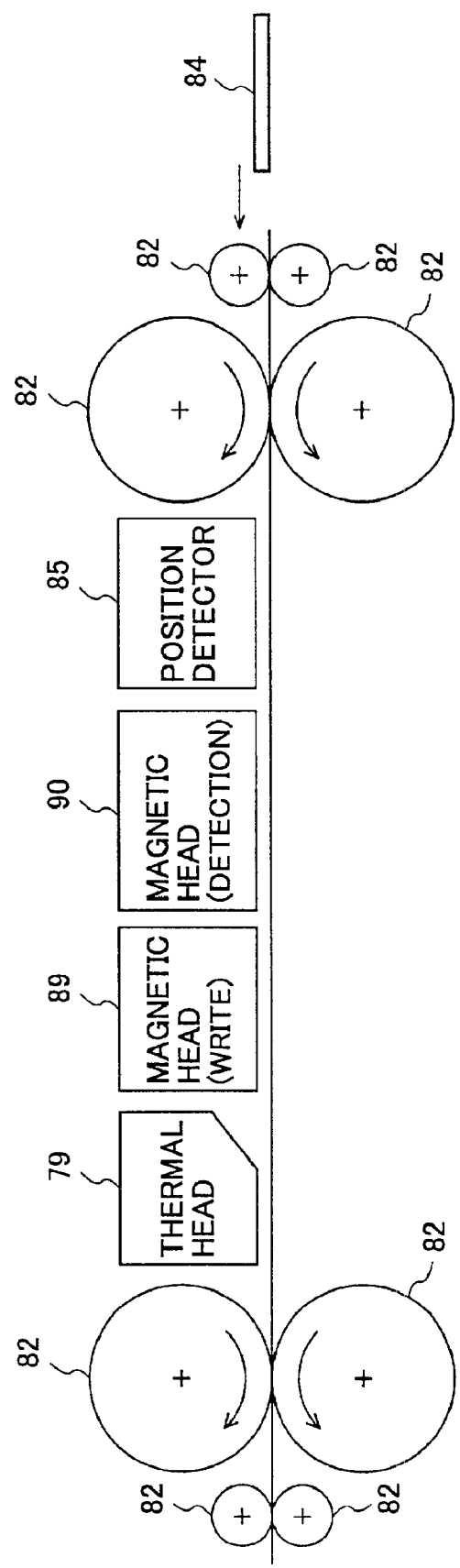

FIGS. 37A and 37B respectively are diagrams showing structures of a printer included in the information processing system of this embodiment. As shown in FIGS. 37A and 37B, the printer has structures similar to the printer shown in FIG. 32. In the information processing system of this embodiment, the printer is provided with a bar code reader 33 as shown in FIG. 37A when the personal identification number information is indicated by a bar code, and is provided with a write magnetic head 89 and a detection magnetic head 90 as shown in FIG. 37B when the personal identification number information is indicated by a magnetic code.

In the printers shown in FIG. 37A and FIG. 37B, the document information and the identification information are written by a thermal head 79, but the personal identification number is recorded by the thermal head 79 and is detected by the bar code reader 33 in the case of the printer shown in FIG. 37A. On the other hand, the personal identification number is recorded by the write magnetic head 89 and is detected by the detection magnetic head 90 in the case of the printer shown in FIG. 37B.

Accordingly, since the document information, the personal identification number and the identification information are printed by the thermal head 79 in the case of the printer shown in FIG. 37A, it is possible to use the same head as the write head and reduce the cost of the printer shown in FIG. 37A.

Figure 36:
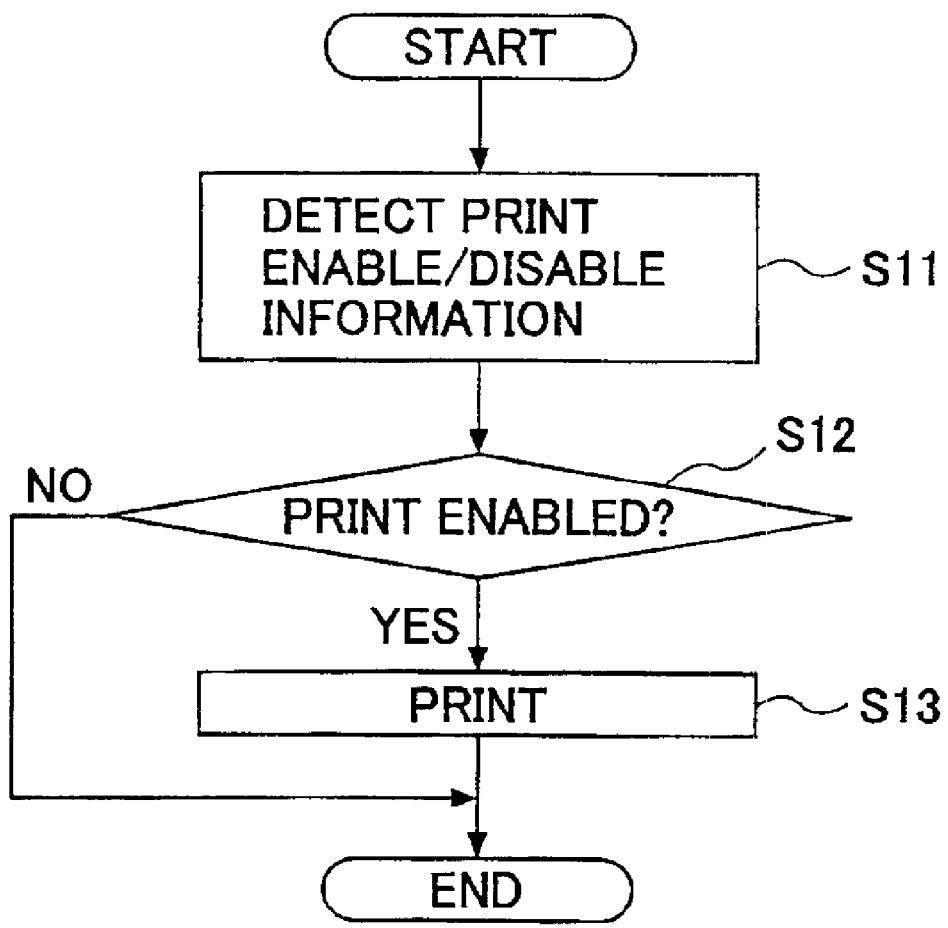
FIG. 36 is a flow chart for explaining a printing operation of sixth embodiment of the information processing apparatus.

A description will be given of a printing operation of the information processing system having the structure described above, by referring to a flow chart shown in FIG. 36. First, in a step S11, the detector 87 which is formed by the bar code reader 33 or the detection magnetic head 90 detects the print enable/disable information 74 together with the personal identification number. Then, in a step S12, the system controller 86 decides whether or not a printing can be carried out, based on the detected print enable/disable information 74. If the decision result in the step S12 is YES, the operation advances to a step S13 to carry out the printing, and the operation ends. On the other hand, the operation ends if the decision result in the step S12 is NO.

When the personal identification number is detected in the step S11, the comparator circuit 2 compares the detected personal identification number and the personal identification number prestored in the memory 4. A print execute signal is supplied from the printing operation control circuit 88 to the system controller 86 only when the judging circuit 3 judges that the two compared personal identification numbers match, and in this case, a print instruction is supplied from the system controller 86 to the write head. On the other hand, when the judging circuit 3 judges that the two compared personal identification numbers do not match, a print prohibit signal is supplied to the system controller 85 so as to prohibit a printing operation in all cases.

When the personal identification number can be set for the printing operation of the information processing system of this embodiment, it is possible to selectively carry out an overwrite printing. Hence, by prestoring the user's own personal identification number in the memory 4 of the printer, for example, it is possible to enable the overwrite printing only with respect to the information recording medium which is used by the user, and to disable the overwrite printing with respect to information recording media used by people other than the user.

In addition, when not specifying the user who is permitted to carry out the overwrite printing, a binary data similar to the overwrite enable/disable information 69 shown in FIG. 28 may be recorded on the information recording medium. In this case, the system controller 86 can judge whether the overwrite printing is to be enabled or disabled, by detecting only the binary data by the detector 87.

Next, a more detailed description will be given of the information recording medium 84 shown in FIG. 33 which is thermally reversible and rewritable. The base film 91 shown in FIG. 33 is made of a white resin which has a good thermal conductivity, and the intermediate layer 93 and the protection layer 94 are made of a colorless resin having a good transparency. The thermally reversible recording layer 92 is made of a color thermo-chromic (CTC) material which is obtained by mixing a leuco dye and a developer. In this embodiment, the CTC material is adjusted to undergo reversible change between a transparent state and a black state in response to heating, and carries out a print-display of the document information, the identification information and the personal identification number information. The thermally reversible recording layer 92 will be described later in more detail.

As shown in FIG. 33, a printing portion 92b of the thermally reversible recording layer 92 is used to print-display the document information, and the printing portion 92a of the thermally reversible recording layer 92 is used to print-display the identification information and the personal identification number information, so that the document information and the identification and personal identification number information are displayed separately. More particularly, the printing portion 92a is located at the peripheral portion of the information recording medium 84.

When using the bar code described above, the bar code is printed by the thermal head 79 at the peripheral portion of the thermally reversible recording layer 92. In addition, a heating resistor is provided in the electromagnetic pen 13 to give a heating function. By taking measures notify the electromagnetic pen 13 by a wireless or radio communication when the detection circuit 6 is activated, it is possible to provide a double security. Furthermore, because the printed characters and the like on the information recording medium 84 can be erased by heat, it is possible to repeatedly use the information recording medium 84 a plurality of times, to thereby prevent waste of paper.

A more detailed description will now be given of the thermally reversible recording layer 92. The heat sensitive system, magnetic recording system, photochromic recording system, electrochromic recording system and the like may be used with respect to the thermally reversible recording layer 92. In this embodiment, it is assumed for the sake of convenience that the heat sensitive recording system is employed, and that the thermally reversible recording layer 92 has an optical characteristic which changes reversibly depending on a thermal energy, and the visual information can be recorded on and erased from the thermally reversible recording layer 92.

In addition, the writing by the thermal energy can easily be realized by a thermal printer, for example, and the same thermal head used for the writing may be used for the erasure by changing conditions such as the heating temperature and the time. Because the identification information and the personal identification number information can be printed by the printer in this case, it is not essential to initially embed fixed information in the information recording medium, and the identification information and the personal identification number information can be appropriately set by the user at the time of the printing.

In this embodiment of the present invention, it is desirable that the information recording medium capable of reversible recording using the thermal energy is provided with a reversible recording layer which is formed by a recording layer including at least a leuco dye and a developer or, a resin layer including an organic low-molecular compound grains or, a recording layer including a low-molecular liquid crystal compound or polymer liquid crystal compound.

The recording layer including at least the leuco dye and the developer is formed by dispersing the leuco dye and the developer in a resin binder. The leuco dye is made of a dye precursor such as phthalide-based compound, azaphthalide-based compound, fluorane-based compound, phenothiazine-based compound and leuco auramine-based compound.

On the other hand, the developer used for the thermally reversible recording layer 92 has a developer structure for causing the leuco dye to develop (generate color) within the molecules. For example, the developer is formed by a compound including phenol hydroxyl group, carboxylic acid radical, phosphoric acid radical or the like, and having a structure for controlling cohesion of the molecules, such as a structure connected with a long-chain hydrocarbon group. An aromatic hycrocarbon group or dihydric group including hetero atoms may be included at the connecting portion.

For example, the resin forming the thermally reversible recording layer 92 made be selected from polyvinyl chloride, polyvinyl acetate, vinyl chloride-vinyl acetate copolymer, polyvinyl acetal, polyvinyl butyral, polycarbonate, polyarylate, polysulfone, polyester sulfone, polyphenylene oxide, fluoroplastic, polyimide, polyamide, polyamide-imide, polybenziimidazole, polystyrene, styrene-based copolymer, phenoxy resin, polyester, aromatic group polyester, polyurethane, polyacryl acrylate, polyester methacrylate, (meta) acrylic ester-based copolymer, maleic acid-based copolymer, epoxy resin, alkyd resin, silicone resin, phenolic resin, polyvinyl alcohol, denatured polyvinyl alcohol, polyvinyl pyrrolidone, polyethylene oxide, polypropylene oxide, methyl cellulose, ethyl cellulose, carboxymethyl cellulose, hydroxyethyl cellulose, starch, gelatin, and caseins.

It is also possible to add various curing agents and/or crosslinking agents for the purposes of increasing the film strength of the thermally reversible recording layer 92. For example, compounds having an isocyanate group, polyamide epichlorohydrin resin, compounds having an epoxy group, glyoxal and zirconium compounds may be used for the curing agents and/or the crosslinking agents.

Furthermore, the thermally reversible recording layer 92 may be formed by use of an electron beam curing binder or an ultraviolet ray curing binder. Compounds having an ethylene unsaturated bond may be used for such binders. For example, such compounds include poly(meta)acrylates of polyalkylene glycol and polyhydric alcohol of aliphatic, alicyclic or aromatic group, poly(meta)acrylates of polyhydric alcohol obtained by adding polyalkylene oxide to the polyhydric alcohol of aliphatic, alicyclic or aromatic group, polyurethane poly(meta)acrylate, polyester poly(meta) acrylate, polyamide poly(meta)acrylate, poly(meta) acryloiloxyalkylene phosphate ester, vinyl-based or diene-based compound having (meta) acryloil group at the side chain or terminal, compounds of single functional (meta) acrylate, vinyl pyrrolidone or (meta) acryloil, cyano compounds having ethylene unsaturated bond, mono or polycarbonates having ethylene unsaturated bond or alkali metal salt, ammonium salt or amine salt, ethylene unsaturated (meta) acrylamide or alkyl substitution (meta) acrylamide or macros thereof, compounds of vinyl lactam or polyvinyl lactam, mono or polyether having ethylene unsaturated bond or ester thereof, ester of alcohol having ethylene unsaturated bond, polyalcohol having ethylene unsaturated bond or ester thereof, aromatic compounds having one or more ethylene unsaturated bond such as styrene or divinylbenzene, polyorganosiloxane-based compounds having (meta) acryloiloxy group at the side chain or terminal, silicone compound having ethylene unsaturated bond, macros of the above described compounds, and oligoester (meta) acrylate denatured materials.

In addition, a photopolymerization initiator is mixed when forming the thermally reversible recording layer 92 by use of the ultraviolet ray curing binder. For example, the photopolymerization initiator is made of acetophenones such as dichloroacetophenone and trichloroacetophenone, 1-hydroxycyclohexylphenylketone, benzophenone, Michler's ketone, benzoin, benzoinalkylether, benzildimethylketal, tetramethylthiurammonosulfine, thioxanethones, azo compounds, diallyliodonium salt, triallylsulfonium salt, bis(trichloromethyl)triazine compounds.

Figure 38:
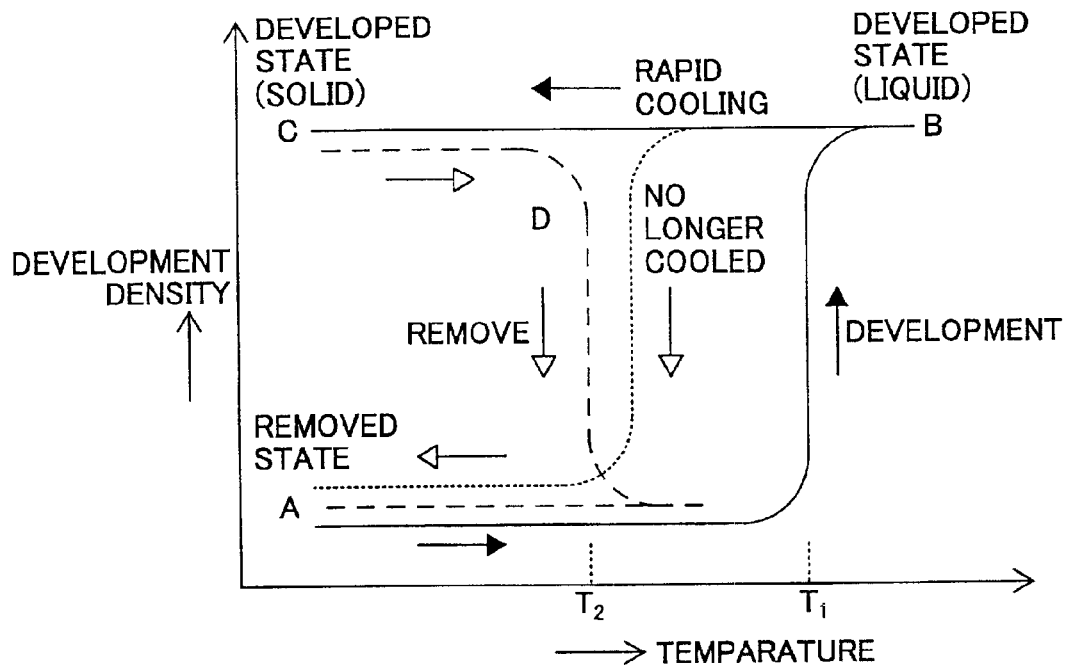
FIG. 38 is a graph showing a temperature change of an emitting color density in a thermally reversible recording layer shown in FIG. 33.

Next, a description will be given of the developing (color generation) and removal (color erasure) processes of the thermally reversible recording layer 92 which includes the leuco dye and the developer, by referring to FIG. 38. When the thermally reversible recording layer 92 which is initially in a removed (color erased) state (A) is heated, the leuco dye and the developer are melted and mixed to develop (generate color) at a temperature T1 or higher to assume a developed state (B). Thereafter, when the thermally reversible recording layer 92 is rapidly cooled, a solid developed state (C) is reached and the developed state becomes fixed. When the thermally reversible recording layer 92 in the developed state (B) is no longer cooled, the removed state (A) is reached. In addition, when the thermally reversible recording layer 92 is further heated from this removed state (A), a removed state (D) is reached at a temperature T2 which is lower than the temperature T1, and the state returns to the removed state (A) by again cooling the thermally reversible recording medium 92.

On the other hand, in a case where the thermally reversible recording layer 92 is made of a resin layer including organic low-molecular compound grains, light scattering of the resin layer undergoes a reversible change depending on the temperature, and it is thus possible to utilize the reversibly changing nature of the transparency. The resin layer is formed by the organic low-molecular material which is uniformly dispersed and maintained, and affects a maximum transparency. Accordingly, it is desirable that the resin base material has a good transparency, is mechanically stable, and is easy to form or grow.

For example, the resin base material includes polyvinyl chloride, vinyl chloride-based copolymers such as vinyl chloride-vinyl acetate copolymer, vinyl chloride-vinyl acetate-vinyl alcohol copolymer, vinyl chloride-vinyl acetate-maleic acid copolymer and vinyl chloride-acrylate copolymer, polyvinylidene chloride, vinylidene chloride-based copolymers such as vinylidene chloride-vinyl chloride copolymer and vinylidene chloride-acrylonitrile copolymer, polyester, polyamide, polyacrylate or polymethacrylate or acrylate-methacrylate copolymer, and silicone resin. Of course, these materials may be used independently or, a mixture of two or more of these materials may be used for the resin base material.

Generally, the organic low-molecular compound used for the thermally reversible recording layer 92 has a melting point of approximately 30 to 200° C. or, preferably approximately 50 to 150° C. More particularly, the low-molecular compound includes alkanol, alkane diol, halogen alkanol, halogen alkane diol, alkylamine, alkane, alkene, alkyne, halogen alkane, halogen alkene, halogen alkyne, cycloalkane, cycloalkene, cycloalkyne, saturated or unsaturated mono or dicarboxylic acid or ester, amide or ammonium salt thereof, saturated or unsaturated halogen aliphatic or ester, amide or ammonium salt thereof, allylcarboxylic acid or ester, amide or ammonium salt thereof, halogen allylcarboxylic acid or ester, amide or ammonium salt thereof, thioalcohol, thiocarboxylic acid or ester, amide or ammonium salt thereof, and carboxylic acid ester of thioalcohol. Of course, these materials may be used independently or, a mixture of two or more of these materials may be used for the organic low-molecular compound.

The carbon number of the above described compounds is in a range of 10 to 60, and preferably in a range of 10 to 38, and particularly desirable in a range of 10 to 30. The alcohol group portion within the ester may be saturated or unsaturated, and halogen substitution may or may not be made. In any case, it is desirable that the organic low-molecular compound includes at least one of oxygen, nitrogen, sulfur and halogen within the molecules, that is, elements such as —OH, —COOH, —CONH—, —COOR, —NH—, —NH$_2$, —S—, —S—S—, —O— and halogen. Furthermore, in order to increase the range of the temperature T2 at which the transparency is achieved, the above described organic low-molecular compounds may be appropriately combined or, the organic low-molecular compound may be combined with another material having a melting point different from that of the organic low-molecular compound.

Figure 39:
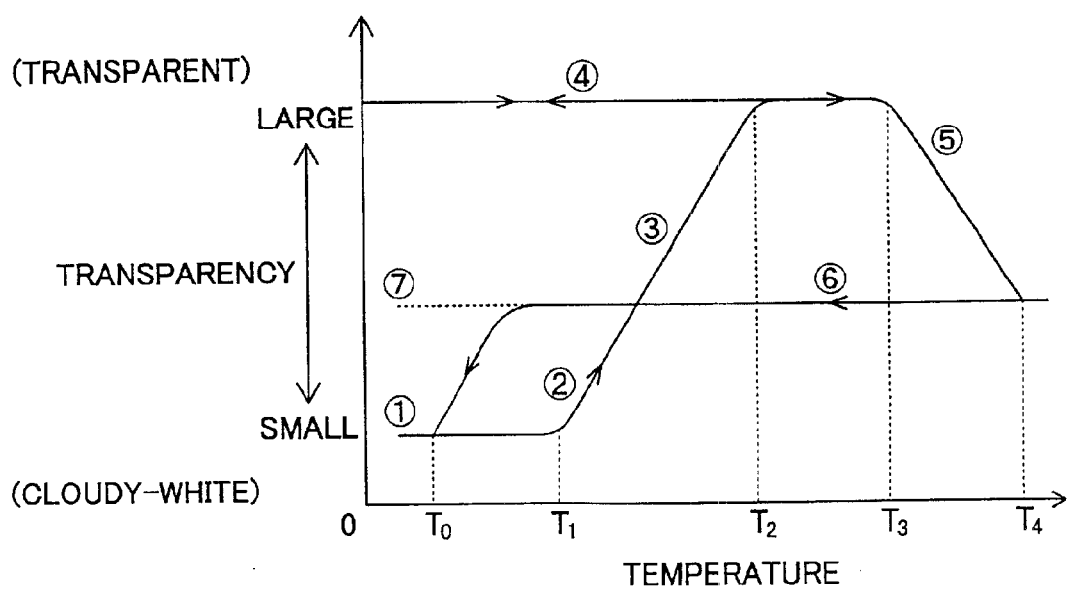
FIG. 39 is a graph showing a temperature change of a transparency of the thermally reversible recording layer shown in FIG. 33.

Next, a description will be given of a change in the transparency of the thermally reversible recording layer 92 which is made of an organic low-molecular compound and a resin, by referring to FIG. 16. As shown in FIG. 39, it is assumed that the thermally reversible recording layer 92 which includes the resin and the organic low-molecular compound which is dispersed within the resin as main components, is initially in a cloudy-white non-transparent state (state ①) at room temperature which is less than or equal to a temperature T0. When heated to a temperature T2, the thermally reversible recording layer 92 becomes transparent via states ② and ③, and remains transparent (state ④) even when returned again to the room temperature which is less than or equal to the temperature T0. In addition, when the thermally reversible recording layer 92 is further heated to a temperature T3 or higher, a semi-transparent state between a maximum transparency and a maximum non-transparency is reached via a state ⑤.

Then, when the temperature is reduced, the state returns to the initial cloudy-white non-transparent state (state ①) via a state ⑥ without again assuming the transparent state. When the thermally reversible recording layer 92 which is in this non-transparent state is heated to a temperature between the temperatures T1 and T2 and is thereafter cooled to the room temperature which is less than or equal to the temperature T0, the state changes from the state ② to a semi-transparent state ⑦. In addition, when the thermally reversible recording layer 92 which is in the state ④ is heated to the temperature T3 or higher and thereafter returned to the room temperature, the state returns to the initial cloudy-white non-transparent state (state ①) via the states ⑤ and ⑥.

As described above, the thermally reversible recording layer 92 may include the low-molecular liquid crystal or polymer liquid crystal. Backbone chain type and side chain type molecular liquid crystals or the like having mesogen (molecule indicating liquid crystal nature) connected to the backbone chain or side chain is used as the polymer liquid crystal. Normally the polymer liquid crystal can be fabricated by polymerizing a polymerizable mesogenic compound (called mesogenic monomer) or, by adding a mesogenic compound which can make an addition reaction to a reactive polymer such as polysilicon hydride. Such a fabrication method is proposed in Makromol. Chem., 179, p.273 (1978), Eur. Poly. J., 18, p.651 (1982) and Mol. Cryst. Liq. Cryst., 169, p.167 (1989), for example.

Typical mesogenic compounds include compounds having an acrylic ester group, methacrylate group or a vinyl group connected to biphenyl-based, phenyl benzoate-based, cylcohexylbezene-based, azoxybenzene-based, azobenzene-based, azomethine-based, phenylpyrimidine-based, diphenylacetyrene-based, biphenylbenzoate-based, cyclohexylbiphenyl-based or terphenyl-based upright molecules (mesogen), preferably via an alkyl spacer having a predetermined length.

The present invention is not limited to these embodiments, and is widely applicable to document processing systems which can make a mutual conversion between the electronic document and the information which is recorded on the information recording medium such as paper.

Of course, any of the fourth through sixth embodiments may be appropriately combined with any of the first through third embodiments described above.

Therefore, according to the fourth through sixth embodiments of the present invention, it is possible to improve the security with respect to modification of the document because the people having the right to edit can be restricted, by storing the data corresponding to the characters written on the information recording medium only when the first personal identification number matches the second personal identification number which is preset.

By storing the data in the region within the storing means written on the information recording medium, it is possible to store the data at a desired location, and the data can be overwritten and stored to easily realize additional writing and correction of the document.

When the reading means reads the first personal identification number which is written in the second portion of the peripheral portion of the information recording medium different from the first part of the information recording medium, it is possible to carry out an appropriate data processing for each page, even in a case where the additional writing is made with respect to a plurality of information recording media which are stacked, thereby improving the ease with which the writing operation can be carried out.

In addition, by updating the data corresponding to the document stored in the externally connected storage means in response to the writing on the information recording medium, it is possible to improve the general usage.

Moreover, by recording the additional writing enable/disable information on the information recording medium and storing the data in the storing means under the control of the control means only when the reading means reads the additional writing enable/disable information which indicates that the additional writing is enabled, it is possible to restrict the right to carry out the additional writing with respect to the document, to thereby further improve the security of the document.

It is possible to carry out a selective printing by using the information recording medium which is recorded with the print enable/disable information. In this case, it is possible to provide security of the printing with respect to the information recording medium.

By employing the information recording medium which is provided with the recording layer which includes at least the leuco dye and the developer or the resin layer including the organic compound grains or the liquid crystal compound, and is recorded with the first personal identification number, it is possible to easily rewrite the first personal identification number and the written characters. For this reason, the information recording medium which is the target of the writing can be repeatedly used, to thereby prevent waste of resources and to reduce the cost.

Further, the present invention is not limited to these embodiments, but various variations and modifications may be made without departing from the scope of the present invention.

What is claimed is:

1. An information processing apparatus comprising:
   a plurality of information recording media respectively having a generally paper shape with an image display surface for displaying various information, said image display surface of each of the information recording media having peripheral portions including a holding portion and recorded with identification information in one of the peripheral portions other than the holding portion, said identification information recorded on each of the information recording media indicating a storage location of one page of display image information written on the information recording medium and prestored in storage means;
   a holding part which holds the holding portion of each of the information recording media which are stacked;
   information input means for accepting an input of various information by handwriting on an arbitrary one of the information recording media which is used as a writing target;
   identification information recognizing means for recognizing the identification information recorded on the arbitrary information recording medium which is used as the writing target;
   information storing means for storing the various information accepted by said information input means and the identification information recognized by said identification information recognizing means in an information storage medium by linking corresponding various information and identification information; and
   information output means for outputting the various information stored in the information storage medium with respect to said storage means which stores various information at storage locations specified in advance depending on the identification information.

2. The information processing apparatus as claimed in claim 1, wherein:
   said storage means is formed by an externally connected computer;

said information storing means links the various information input by handwriting on the arbitrary information recording medium to the identification information and stores the various information and the identification information in the information storage medium after recognizing from the arbitrary information recording medium by said identification information recognizing means the identification information which corresponds one-to-one to one page of a document stored within the computer; and said information output means transfers the various information stored in the information storage medium to the computer to overwrite the various information on display image information of one page of the document which corresponds one-to-one, based on the linked identification information.

3. The information processing apparatus as claimed in claim 1, wherein:

said storage means is formed by the information storage medium;

said information storing means links the various information input by handwriting on the arbitrary information recording medium to the identification information and stores the various information and the identification information in the information storage medium after recognizing from the arbitrary information recording medium by said identification information recognizing means the identification information which corresponds one-to-one to one page of a document stored within the information storage medium; and said information output means transfers the various information stored in the information storage medium within the information storage medium to overwrite the various information on display image information of one page of the document which corresponds one-to-one, based on the linked identification information.

4. The information processing apparatus as claimed in claim 1, further comprising:

additional writing detecting means for detecting a handwriting input operation on the arbitrary information recording medium; and an identification information recognizing operation control means for controlling said identification information recognizing means to recognize the identification information based on the handwriting input operation detected by said additional writing detecting means.

5. The information processing apparatus as claimed in claim 1, wherein the identification information of the arbitrary information recording medium is recorded on one of the peripheral portions of the image display surface confronting the holding portion.

6. The information processing apparatus as claimed in claim 1, wherein the identification information of the arbitrary information recording medium is recorded on one of the peripheral portions of the image display surface adjacent to the holding portion.

7. The information processing apparatus as claimed in claim 1, wherein the identification information includes a two-dimensional code, and said identification information recognizing means includes a two-dimensional code reader.

8. The information processing apparatus as claimed in claim 1, wherein the identification information includes a one-dimensional code, and said identification information recognizing means includes a one-dimensional code reader.

9. The information processing apparatus as claimed in claim 1, wherein the identification information is recorded on the arbitrary information recording medium so as to reflect light in a region other than a visible region with respect to incident light having a specific wavelength.

10. The information processing apparatus as claimed in claim 1, further comprising:

power starting means for starting a power supply when said holding part holds the information recording media.

11. An information processing apparatus comprising:

a plurality of information recording media respectively having a generally paper shape with an image display surface for rewritably displaying various information, said image display surface of each of the information recording media having peripheral portions including a holding portion and recorded with identification information in one of the peripheral portions other than the holding portion, said identification information recorded on each of the information recording media indicating a storage location of one page of display image information written on the information recording medium and prestored in storage means;

a holding part which holds the holding portion of each of the information recording media which are stacked;

information input means for accepting an input of various information by handwriting on the information recording media;

additional writing means for additionally inputting desired various information by handwriting on an arbitrary one of the information recording media;

identification information recognizing means for recognizing the identification information recorded on the arbitrary information recording medium which is used as the writing target;

information storing means for storing the various information input by said additional writing means and accepted by said information input means and the identification information recognized by said identification information recognizing means in an information storage medium by linking corresponding various information and identification information; and information output means for outputting the various information stored in the information storage medium with respect to said storage means which stores various information at storage locations specified in advance depending on the identification information.

12. The information processing apparatus as claimed in claim 11, wherein:

said storage means is formed by an externally connected computer;

said information storing means links the various information input by handwriting on the arbitrary information recording medium to the identification information and stores the various information and the identification information in the information storage medium after recognizing from the arbitrary information recording medium by said identification information recognizing means the identification information which corresponds one-to-one to one page of a document stored within the computer; and said information output means transfers the various information stored in the information storage medium to the computer to overwrite the various information on display image information of one page of the document which corresponds one-to-one, based on the linked identification information.

13. The information processing apparatus as claimed in claim 11, wherein:

said storage means is formed by the information storage medium;

said information storing means links the various information input by handwriting on the arbitrary information recording medium to the identification information and stores the various information and the identification information in the information storage medium after recognizing from the arbitrary information recording medium by said identification information recognizing means the identification information which corresponds one-to-one to one page of a document stored within the information storage medium; and said information output means transfers the various information stored in the information storage medium within the information storage medium to overwrite the various information on display image information of one page of the document which corresponds one-to-one, based on the linked identification information.

14. The information processing apparatus as claimed in claim 11, further comprising:

additional writing detecting means for detecting a handwriting input operation on the arbitrary information recording medium; and an identification information recognizing operation control means for controlling said identification information recognizing means to recognize the identification information based on the handwriting input operation detected by said additional writing detecting means.

15. The information processing apparatus as claimed in claim 11, wherein the identification information of the arbitrary information recording medium is recorded on one of the peripheral portions of the image display surface confronting the holding portion.

16. The information processing apparatus as claimed in claim 11, wherein the identification information of the arbitrary information recording medium is recorded on one of the peripheral portions of the image display surface adjacent to the holding portion.

17. The information processing apparatus as claimed in claim 11, wherein the identification information includes a two-dimensional code, and said identification information recognizing means includes a two-dimensional code reader.

18. The information processing apparatus as claimed in claim 11, wherein the identification information includes a one-dimensional code, and said identification information recognizing means includes a one-dimensional code reader.

19. The information processing apparatus as claimed in claim 11, wherein the identification information is recorded on the arbitrary information recording medium so as to reflect light in a region other than a visible region with respect to incident light having a specific wavelength.

20. The information processing apparatus as claimed in claim 11, further comprising:

power starting means for starting a power supply when said holding part holds the information recording media.

21. The information processing apparatus as claimed in claim 1, further comprising:

storing means, formed by the information storage medium, for storing data;

reading means for reading a first personal identification number recorded on the information recording medium;

judging means for judging whether or not the first personal identification number read by said reading means matches a second personal identification number which is set in advance; and control means for storing the data in said storing means when said judging means judges that the first and second personal identification numbers match.

22. The information processing apparatus as claimed in claim 21, wherein said control means stores the data in a region which is within said storing means and is indicated on the information recording medium.

23. The information processing apparatus as claimed in claim 21, further comprising:

fixing means for fixing a first part forming a peripheral portion of the information recording medium, said reading means reading the first personal identification number recorded on a second part of the peripheral portion different from the first part.

24. The information processing apparatus as claimed in claim 1, further comprising:

reading means for reading a first personal identification number recorded on the information recording medium;

judging means for judging whether or not the first personal identification number read by said reading means matches a second personal identification number which is set in advance; and control means for storing the data in the storage means which is externally connected to the information processing apparatus when said judging means judges that the first and second personal identification numbers match.

25. The information processing apparatus as claimed in claim 21, wherein:

said reading means reads from the information recording medium document specifying information which specifies a document stored in the storing means, and said control means overwrites the data with respect to the document which is specified by the document specifying information read by said reading means.

26. The information processing apparatus as claimed in claim 24, wherein:

said reading means reads from the information recording medium document specifying information which specifies a document stored in the storing means, and said control means overwrites the data with respect to the document which is specified by the document specifying information read by said reading means.

27. The information processing apparatus as claimed in claim 1, wherein:

the information recording medium is recorded with additional writing enable/disable information which indicates whether or not an additional writing is possible with respect to a document which is already recorded on the information recording medium, said reading means reads the additional writing enable/disable information, and said control means stores the data in the storing means only when the additional writing enable/disable information read by said reading means indicates that an additional writing is possible.

28. The information processing apparatus as claimed in claim 24, wherein:

the information recording medium is recorded with additional writing enable/disable information which indicates whether or not an additional writing is possible with respect to a document which is already recorded on the information recording medium, said reading means reads the additional writing enable/disable information, and said control means stores the data in the storing means only when the additional writing enable/disable information read by said reading means indicates that an additional writing is possible.

29. The information processing apparatus as claimed in claim 11, further comprising:

storing means, formed by the information storage medium, for storing data;

reading means for reading a first personal identification number recorded on the information recording medium;

judging means for judging whether or not the first personal identification number read by said reading means matches a second personal identification number which is set in advance; and control means for storing the data in said storing means when said judging means judges that the first and second personal identification numbers match.

30. The information processing apparatus as claimed in claim 29, wherein said control means stores the data in a region which is within said storing means and is indicated on the information recording medium.

31. The information processing apparatus as claimed in claim 29, further comprising:

fixing means for fixing a first part forming a peripheral portion of the information recording medium, said reading means reading the first personal identification number recorded on a second part of the peripheral portion different from the first part.

32. The information processing apparatus as claimed in claim 11, further comprising:

reading means for reading a first personal identification number recorded on the information recording medium;

judging means for judging whether or not the first personal identification number read by said reading means matches a second personal identification number which is set in advance; and control means for storing the data in the storage means which is externally connected to the information processing apparatus when said judging means judges that the first and second personal identification numbers match.

33. The information processing apparatus as claimed in claim 29, wherein:

said reading means reads from the information recording medium document specifying information which specifies a document stored in the storing means, and said control means overwrites the data with respect to the document which is specified by the document specifying information read by said reading means.

34. The information processing apparatus as claimed in claim 32, wherein:

said reading means reads from the information recording medium document specifying information which specifies a document stored in the storing means, and said control means overwrites the data with respect to the document which is specified by the document specifying information read by said reading means.

35. The information processing apparatus as claimed in claim 11, wherein:

the information recording medium is recorded with additional writing enable/disable information which indicates whether or not an additional writing is possible with respect to a document which is already recorded on the in formation recording medium, said reading means reads the additional writing enable/disable information, and said control means stores the data in the storing means only when the additional writing enable/disable information read by said reading means indicates that an additional writing is possible.

36. The information processing apparatus as claimed in claim 32, wherein:

the information recording medium is recorded with additional writing enable/disable information which indicates whether or not an additional writing is possible with respect to a document which is already recorded on the information recording medium, said reading means reads the additional writing enable/disable information, and said control means stores the data in the storing means only when the additional writing enable/disable information read by said reading means indicates that an additional writing is possible.

37. An information recording medium stackable on an information processing apparatus including a holding part that is configured to hold a holding portion of each information recording media stacked thereon, said information recording medium comprising:

a member having a generally paper shape and an image display surface for displaying various information; and identification information recorded in one of peripheral portions of the image display surface other than the holding portion, and indicating a storage location of one page of display image information prestored in a storage part.

38. The information recording medium as claimed in claim 37, wherein the identification information reflects light in a region other than a visible region with respect to incident light having a specific wavelength.

39. An information recording medium stackable on an information processing apparatus including a holding part that is configured to hold a holding portion of each information recording media stacked thereon, said information recording medium comprising:

a member having a generally paper shape and an image display surface for rewritably displaying and maintaining various information; and identification information recorded in one of peripheral portions of the image display surface other than the holding portion, and indicating a storage location of one page of display image information prestored in a storage part.

40. The information recording medium as claimed in claim 39, wherein the identification information reflects light in a region other than a visible region with respect to incident light having a specific wavelength.

41. An information recording medium comprising:

a member having a generally paper shape and an image display surface for displaying various information;

identification information recorded in one of peripheral portions of the image display surface other than a holding portion, and indicating a storage location of one page of display image information prestored in a storage part; and a recording layer at least including a leuco dye and a developer and recorded with a first personal identification number, said first personal identification number being read by a reading part, and characters being recorded with respect to said recording layer when the first personal identification number matches a second personal identification number which is set in advance.

42. The information recording medium as claimed in claim 41, wherein the first personal identification number is rewritable with respect to said recording layer.

43. An information recording medium comprising:
a member having a generally paper shape and an image display surface for displaying various information;
identification information recorded in one of peripheral portions of the image display surface other than a holding portion, and indicating a storage location of one page of display image information prestored in a storage part; and
a recording layer made of a resin layer including organic compound grains and recorded with a first personal identification number,
said first personal identification number being read by a reading part, and characters being recorded with respect to said recording layer when the first personal identification number matches a second personal identification number which is set in advance.

44. The information recording medium as claimed in claim 43, wherein the first personal identification number is rewritable with respect to said recording layer.

45. An information recording medium comprising:
a member having a generally paper shape and an image display surface for displaying various information;
identification information recorded in one of peripheral portions of the image display surface other than a holding portion, and indicating a storage location of one page of display image information prestored in a storage part; and
a recording layer including a liquid crystal compound and recorded with a first personal identification number,
said first personal identification number being read by a reading part, and characters being recorded with respect to said recording layer when the first personal identification number matches a second personal identification number which is set in advance.

46. The information recording medium as claimed in claim 45, wherein the first personal identification number is rewritable with respect to said recording layer.

47. An information recording medium comprising:
a member having a generally paper shape and an image display surface for displaying various information;
identification information recorded in one of peripheral portions of the image display surface other than a holding portion, and indicating a storage location of one page of display image information prestored in a storage part; and
a recording layer at least including a leuco dye and a developer and recorded with a first personal identification number,
said first personal identification number being read by a reading part, and characters being recorded with respect to said recording layer when the first personal identification number matches a second personal identification number which is set in advance.

48. The information recording medium as claimed in claim 47, wherein the first personal identification number is rewritable with respect to said recording layer.

49. An information recording medium comprising:
a member having a generally paper shape and an image display surface for displaying various information;
identification information recorded in one of peripheral portions of the image display surface other than a holding portion, and indicating a storage location of one page of display image information prestored in a storage part; and
a recording layer made of a resin layer including organic compound grains and recorded with a first personal identification number,
said first personal identification number being read by a reading part, and characters being recorded with respect to said recording layer when the first personal identification number matches a second personal identification number which is set in advance.

50. The information recording medium as claimed in claim 49, wherein the first personal identification number is rewritable with respect to said recording layer.

51. An information recording medium comprising:
a member having a generally paper shape and an image display surface for displaying various information;
identification information recorded in one of peripheral portions of the image display surface other than a holding portion, and indicating a storage location of one page of display image information prestored in a storage part; and
a recording layer including a liquid crystal compound and recorded with a first personal identification number,
said first personal identification number being read by a reading part, and characters being recorded with respect to said recording layer when the first personal identification number matches a second personal identification number which is set in advance.

52. The information recording medium as claimed in claim 51, wherein the first personal identification number is rewritable with respect to said recording layer.

53. An information processing apparatus for generating data corresponding to characters written on an information recording medium, comprising:
a storing part configured to store the data;
a reading part configured to read a first personal identification number recorded on the information recording medium;
a judging part configured to judge whether or not the first personal identification number read by said reading part matches a second personal identification number which is set in advance; and
a control part configured to store the data in said storing part when said judging part judges that the first and second personal identification numbers match.

54. The information processing apparatus as claimed in claim 53, wherein said control part stores the data in a region which is within said storing part and is indicated on the information recording medium.

55. The information processing apparatus as claimed in claim 53, further comprising:
a fixing part configured to fix a first part forming a peripheral portion of the information recording medium,
said reading part reading the first personal identification number recorded on a second part of the peripheral portion different from the first part.

56. An information processing apparatus for generating data corresponding to characters written on an information recording medium, comprising:

a reading part configured to read a first personal identification number recorded on the information recording medium;

a judging part configured to judge whether or not the first personal identification number read by said reading part matches a second personal identification number which is set in advance; and a control part configured to store the data in an externally connected storage part when said judging part judges that the first and second personal identification numbers match.

57. The information processing apparatus as claimed in claim 53, wherein:

said reading part reads from the information recording medium document specifying information which specifies a document stored in the storing part, and said control part overwrites the data with respect to the document which is specified by the document specifying information read by said reading part.

58. The information processing apparatus as claimed in claim 56, wherein:

said reading part reads from the information recording medium document specifying information which specifies a document stored in the storing part, and said control part overwrites the data with respect to the document which is specified by the document specifying information read by said reading part.

59. The information processing apparatus as claimed in claim 53, wherein:

the information recording medium is recorded with additional writing enable/disable information which indicates whether or not an additional writing is possible with respect to a document which is already recorded on the information recording medium, said reading part reads the additional writing enable/disable information, and said control part stores the data in the storing part only when the additional writing enable/disable information read by said reading part indicates that an additional writing is possible.

60. The information processing apparatus as claimed in claim 56, wherein:

the information recording medium is recorded with additional writing enable/disable information which indicates whether or not an additional writing is possible with respect to a document which is already recorded on the information recording medium, said reading part reads the additional writing enable/disable information, and said control part stores the data in the storing part only when the additional writing enable/disable information read by said reading part indicates that an additional writing is possible.

61. An information processing system for generating and processing data corresponding to characters written on an information recording medium, comprising:

a storing part configured to store the data;

a recording part configured to record a first personal identification number on the information recording medium;

a reading part configured to read the first personal identification number which is recorded on the information recording medium by said recording part;

a judging part configured to judge whether or not the first personal identification number read by said reading part matches a second personal identification number which is set in advance; and control part configured to store the data in said storing part when said judging part judges that the first and second personal identification numbers match.

62. An information processing system for generating and processing data corresponding to characters recorded on an information recording medium which is recorded with print enable/disable information which indicates whether or not a printing is possible, comprising:

a storing part configured to store the data;

a reading part configured to read a first personal identification number recorded on the information recording medium;

a judging part configured to judge whether or not the first personal identification number read by said reading part matches a second personal identification number which is set in advance;

a control part configured to store the data in said storing part when said judging part judges that the first and second personal identification numbers match;

a recording part configured to record the print enable/disable information on the information recording medium, said reading part being configured to also read the print enable/disable information which is recorded on the information recording medium by said recording part; and a printing part configured to print the characters on the information recording medium depending on the data when the print enable/disable information read by said reading part indicates that the printing is possible.

63. An information recording medium which becomes a writing target when generating data corresponding to written characters, comprising:

a recording layer at least including a leuco dye and a developer and recorded with a first personal identification number, said first personal identification number being read by a reading part, and characters being recorded with respect to said recording layer when the first personal identification number matches a second personal identification number which is set in advance.

64. An information recording medium which becomes a writing target when generating data corresponding to written characters, comprising:

a recording layer made of a resin layer including organic compound grains and recorded with a first personal identification number, said first personal identification number being read by a reading part, and characters being recorded with respect to said recording layer when the first personal identification number matches a second personal identification number which is set in advance.

65. An information recording medium which becomes a writing target when generating data corresponding to written characters, comprising:

a recording layer including a liquid crystal compound and recorded with a first personal identification number, said first personal identification number being read by a reading part, and characters being recorded with respect to said recording layer when the first personal identification number matches a second personal identification number which is set in advance.

66. The information recording medium as claimed in claim 63, wherein the first personal identification number is rewritable with respect to said recording layer.

67. The information recording medium as claimed in claim 66, wherein an optical characteristic of said recording layer changes reversible with respect to temperature.

68. An information processing apparatus comprising:

- a plurality of information recording media respectively having a generally paper shape with an image display surface for displaying various information, said image display surface of each of the information recording media having peripheral portions including a holding portion and recorded with identification information in one of the peripheral portions other than the holding portion, said identification information recorded on each of the information recording media indicating a storage location of one page of display image information written on the information recording medium and prestored in a storage;
- a holding part configured to hold the holding portion of each of the information recording media which are stacked;
- an information input part configured to accept an input of various information by handwriting on an arbitrary one of the information recording media which is used as a writing target;
- an identification information recognizing part configured to recognize the identification information recorded on the arbitrary information recording medium which is used as the writing target;
- an information storing part configured to store the various information accepted by said information input part and the identification information recognized by said identification information recognizing part in an information storage medium by linking corresponding various information and identification information; and
- an information output part configured to output the various information stored in the information storage medium with respect to said storage which stores various information at storage locations specified in advance depending on the identification information.

69. An information processing apparatus comprising:

- a plurality of information recording media respectively having a general paper shape with an image display surface for rewritably displaying various information, said image display surface of each of the information recording media having peripheral portions including a holding portion and recorded with identification information in one of the peripheral portions other than the holding portion, said identification information recorded on each of the information recording media indicating a storage location of one page of display image information written on the information recording medium and prestored in a storage;
- a holding part configured to hold the holding portion of each of the information recording media which are stacked;
- an information input part configured to accept an input of various information by handwriting on the information recording media;
- an additional writing part configured to additionally input desired various information by handwriting on an arbitrary one of the information recording media;
- an identification information recognizing part configured to recognize the identification information recorded on the arbitrary information recording medium which is used as the writing target;
- an information storing part configured to store the various information input by said additional writing part and accepted by said information input part and the identification information recognized by said identification information recognizing part in an information storage medium by linking corresponding various information and identification information; and
- an information output part configured to output the various information stored in the information storage medium with respect to said storage which stores various information at storage locations specified in advance depending on the identification information.

* * * * *